United States Patent [19]

Kralowetz et al.

[11] Patent Number: 5,768,525
[45] Date of Patent: Jun. 16, 1998

[54] TRANSPARENT SUPPORT OF PROTOCOL AND DATA COMPRESSION FEATURES FOR DATA COMMUNICATION

[75] Inventors: Joseph D. Kralowetz, Germantown; Douglas F. Ortega, Laytonsville, both of Md.

[73] Assignee: U.S. Robotics Corp., Skokie, Ill.

[21] Appl. No.: 845,323

[22] Filed: Apr. 25, 1997

Related U.S. Application Data

[63] Continuation of Ser. No. 525,385, Sep. 8, 1995, Pat. No. 5,657,452.

[51] Int. Cl.$^6$ .............................. H04L 9/32; G06F 15/16; G06F 13/38
[52] U.S. Cl. ........................... 395/200.58; 395/200.6; 395/200.32; 370/401
[58] Field of Search ..................... 395/200.57, 200.58, 395/200.32, 200.6; 370/396, 410, 465, 256, 401, 466, 524; 379/93.08; 380/49; 364/DIG. 1, DIG. 2

[56] References Cited

U.S. PATENT DOCUMENTS

| | | | |
|---|---|---|---|
| 4,965,795 | 10/1990 | Coffelt et al. | 370/244 |
| 5,291,479 | 3/1994 | Vaziri et al. | 370/264 |
| 5,293,379 | 3/1994 | Carr | 370/84.1 |
| 5,408,470 | 4/1995 | Rothrock et al. | 370/261 |
| 5,410,671 | 4/1995 | Elgamal et al. | 711/202 |
| 5,414,712 | 5/1995 | Kaplan et al. | 371/201 |
| 5,438,614 | 8/1995 | Rozman et al. | 379/93 |
| 5,444,702 | 8/1995 | Burnett et al. | 370/254 |
| 5,497,463 | 3/1996 | Stein et al. | 395/200.03 |
| 5,537,474 | 7/1996 | Brown et al. | 380/23 |
| 5,539,744 | 7/1996 | Chu et al. | 370/60 |
| 5,586,260 | 12/1996 | Hu | 395/500 |
| 5,657,452 | 8/1997 | Kralowetz et al. | 395/200.57 |

OTHER PUBLICATIONS

RFC 1333 PPP Link Quality Monitoring (May 1992).
RFC 1661 The Point-to-Point Protocol, W. Simpson, ed., (Jul. 1994).
RFC 1662 PPP in HDLC-like framing, W. Simpson, ed., (Jul. 1994).
RFC 1144 Compressing TCP/IP Headers for Low-Speed Serial Links, V. Jacobson (Feb. 1990).
RFC 1323 TCP Extensions for High Performance, V. Jacobson, (May 1992).
RFC 1332 The PPP Internet Protocol Control Protocol (PCP), G. McGregor (May 1992).
RFC 1333 PPP Link Internetwork Packet Exchange Control Protocol (IPXCP), W. Simpson, (Dec. 1993).
RFC 1552 The PPP Internetwork Packet Exchange Control Protocol (IPXCP), W. Simpson, (Dec. 1993).

(List continued on next page.)

*Primary Examiner*—Daniel H. Pan
*Attorney, Agent, or Firm*—McDonnell Boehnen Hulbert & Berghoff

[57] ABSTRACT

A method for efficiently setting up a data transmission session over a communication channel between a local endpoint application and a network endpoint application with a proxy engine in a manner that is transparent to the user. The proxy engine is placed in simultaneous communication sessions with the local endpoint application and the network endpoint application. The proxy engine determines the network control protocols that are supported by both the network endpoint application and the local endpoint application. The proxy engine enables the network control protocols that are supported by both the network endpoint application and the local endpoint application. Optionally, the proxy engine enables data compression techniques that are supported by both the network endpoint application and the proxy engine. After the network control protocols and data compression techniques (if desired) are enabled, the proxy engine transmits data between the local endpoint application and the network endpoint application over the communication channel.

9 Claims, 5 Drawing Sheets

OTHER PUBLICATIONS

RFC 1570 PPP LCP Extensions, W. Simpson, (Jan. 1994).

RFC 1598 PPP in X.25, W. Simpson, (Mar. 1994).

RFC 1618 PPP over ISDN, W. Simpson, (May 1994).

RFC 1638 PPP Bridging Control Protocol (BCP), F. Baker, (Jun. 1994).

RFC 1334 PPP Authentication Protocols, B. Lloyd, (Oct. 1992).

RFC 1717 The PPP Multilink Protocol (MP), K. Sklower, B. Lloyd, G. McGregor, D. Carr, (Nov. 1994).

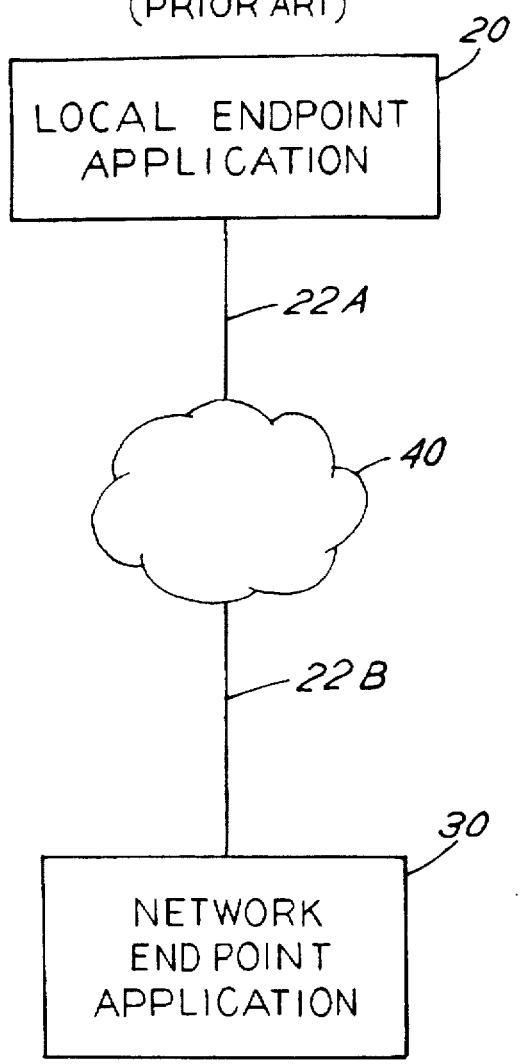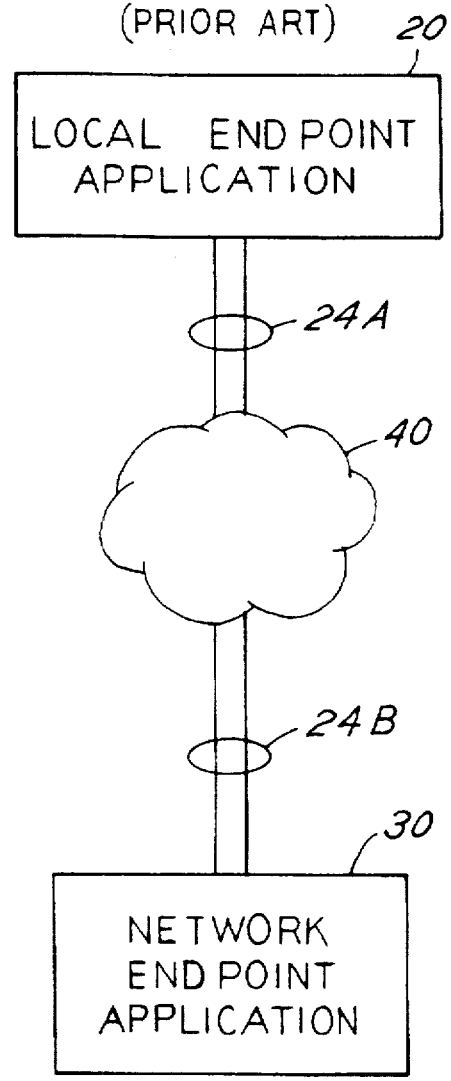

TRANSPARENT SUPPORT OF PROTOCOL AND DATA COMPRESSION FEATURES FOR DATA COMMUNICATION

This is a continuation of application Ser. No. 08/525,385, filed Sep. 8, 1995, now U.S. Pat. No. 5,657,452.

BACKGROUND OF THE INVENTION

A. Field of the Invention

This invention relates generally to the field of telecommunication and the processes by which digital data is transmitted between computer systems over a network or communications link. The invention is particularly suitable for use in devices that support Integrated Service Digital Network (ISDN) digital telephone services or the like, in which the digital data is transmitted via the ISDN or other digital line to a data terminal equipment (DTE), such as a computer.

B. Description of Related Art

In order for digital data to be transmitted from the source of the data (such as a computer) to a destination (such as another computer) over a network or telecommunication line, the data must be formated and presented to the transmission medium and the destination in a form that is compatible to the elements of the system. For example, if the source of the data wishes to compress the data using a particular data compression technique, the source and the destination must support both the chosen data compression algorithms.

It is a well known fact of life that the various computers in a network of computers may not have compatible data transmission and formatting software, due to the differences in technology available when the computers were purchased, the different options and features that may have been built into the computers subsequent to their purchase, or the fact that the owners of the computers on the network (such as the Internet) do not know or care about what features other computers on the network may support. When transmission of data in this situation is attempted, the lowest common denominator in terms of the communications protocols is determined during the call connect process. If the source of the data runs communications software that supports only basic communication protocols, but the destination runs backwardly compatible advanced protocols and compression functions, the call will typically proceed, but only in accordance with the basic communications protocols supported by the source.

The present invention addresses this problem by determining, in the call connect process, the communication protocols and compression techniques that are supported at both ends of the network, and by supporting multiple compression protocols and compression algorithms, so as to facilitate communication between the elements of the system. The invention does this automatically, and in a manner that is transparent to the user. Further, if the telecommunication line between the source and destination supports multiple communication channels (such as an ISDN line), the invention automatically enables the data to be transmitted through multiple communication channels. This has the effect of increasing data throughput, and significantly shortening the call connect time.

In order to better understand these and other advantages and features of the invention, a brief exposition of data communication technology and the Point-To-Point Protocol is set forth here.

The Open Systems Interconnect Reference Model is the standard model for describing the layers of functions and protocols necessary for data communications between computers. This well-known model consists of a hierarchy of seven layers of protocols which control the transmission of data from a source of the data to a destination via a network.

The lowest layer in the model is the physical layer, which manages the physical connection of network elements. The next two higher layers are the link layer and the network layer, respectively. The link layer, also known as the data link layer, manages the flow of data between the user and the network, or between a DTE and Data Communications Equipment (DCE). This layer's responsibility is to assure reliable and efficient data transfer, data formatting, the detection, correction and recovery of errors, data transparency, and some forms of addressing.

The network layer manages the details of transmitting data across the physical network between network elements, as well as between networks. The network layer also has the responsibility to define data call establishment procedures for packet and cell switched networks, and manage the segmentation and assembly of data across the network. The application layer is the top layer of the model, and manages the program or device that generates the data that is to be sent from the source through the network to the intended destination.

The Point-to-Point Protocol (PPP) provides a standard method of encapsulating network layer protocol information over point-to-point links. The PPP also defines an extensible Link Control Protocol (LCP), and proposes a family of Network Control Protocols (NCPs) for establishing and configuring different network-layer protocols. The PPP is described in detail in a series of documents that are available on-line. Persons of skill in the art are familiar with these documents, known as the Request For Comments. The Request For Comments (RFC) 1661, which is incorporated by reference herein, gives an informative overview of the PPP.

The initial deployment of the PPP has been over short local lines, leased lines, and plain-old-telephone-service (POTS) using modems. As new packet services and higher speed lines are introduced, PPP is easily deployed in these environments as well.

As noted above, the PPP has three main components:
1. A procedure for encapsulating datagrams over serial links;
2. A Link Control Protocol (LCP) for establishing, configuring, and testing the data-link connection; and
3. A family of Network Control Protocols (NCPs) for establishing and configuring different network-layer protocols.

In order to establish communications over a point-to-point link, each end of the PPP link must first send LCP packets to configure the data link during the Link Establishment phase. After the link has been established, PPP provides for an optional Authentication phase before proceeding to the Network-Layer Protocol phase.

By default, authentication (i.e., password identification) is not mandatory. If authentication of the link is desired, an implementation must specify the Authentication-Protocol Configuration Option during Link Establishment phase.

These authentication protocols are intended for use primarily by hosts and routers that connect to a PPP network server via switched circuits or dial-up lines, but might be applied to dedicated links as well. The server can use the identification of the connecting host or router in the selection of options for network layer negotiations.

PPP encapsulation of data communications is possible when the data is transmitted over digital communication lines, such as ISDN lines. ISDN lines comprise two data channels (referred to as bearer channels or "B" channels), and a control channel known as the "D" channel. The ISDN D-channel can also be used for sending PPP packets when suitably framed, but is limited in bandwidth and often restricts communication links to a local switch. Since the ISDN B-channel is by definition a point-to-point link, PPP is well suited to use over ISDN lines.

The ISDN Primary Rate Interface may support many concurrent B-channel links. The PPP Link Control Protocol and Network Control Protocol mechanisms are particularly useful in this situation in reducing or eliminating hand configuration, and facilitating ease of communication between diverse implementations.

In order to accommodate ISDN data links over multiple channels simultaneously, a protocol known as PPPML or PPP MultiLink is used. The PPP MultiLink protocol is described in the Request For Comments 1717, which is incorporated by reference herein In our invention, an element of communication equipment we have called a proxy engine is used in establishing a connection between the local endpoint application (i.e., the application running at the source of the data) and the application located at the far end of the network (i.e., the application running at the destination for the data). The application located at the destination is referred to herein as the "network endpoint application". The proxy engine, which in the preferred form constitutes a communication software structure, may be installed at the source, at the destination, or at both the source and destination. The term "proxy" is meant to indicate that the proxy engine is supplying the protocol feature or data compression on behalf of the local endpoint application. The term "engine" stems from the fact that the proxy engine actively provides or supports these protocol and/or compression features in real time during the call connection and data transfer process.

In our invention, the proxy engine conducts simultaneous communications sessions with the local endpoint application and the network endpoint application to determine what protocol features are supported by the endpoint applications. Additionally, the proxy engine supports or enables multiple advanced features available with the Point-To-Point Protocol, such as PPP MultiLink, various data compression techniques over PPP or PPP Multilink, Challenge Handshake Application Protocol (CHAP) MD5, and any Link Control Protocol extensions that are implemented in the proxy engine, such as Link Control Protocol ECHO__REQUEST, ECHO__REPLIES, call back, endpoint identification, etc. Because these features are supported in the proxy engine, the user does not have to independently develop these features. The invention allows an application running above the proxy engine to "leverage", or take advantage of, all the advanced set of features described in the PPP Request For Comments, without supplementing any part of the PPP but the most basic feature of the set described in Request for Comments 1661, and possibly the Password Authentication Protocol and at least one Network Control Protocol.

Computers that implement the present invention will essentially level the playing field for all the endpoint applications, because the proxy engine makes up for and supports the data compression, multiple link, and authentication features that are lacking in the local endpoint application. The benefit to the user of the invention is thus increased throughput and data capacity over their existing equipment, because the proxy engine will provide the necessary protocol or compression features that may be lacking in the endpoint application.

In accordance with the present invention, the proxy engine learns each of the endpoint's particular configuration parameters, such as security information, network addressing, error correction routines and data compression technique, during communication sessions at the outset of the call connect process. To the user and the local endpoint application, it appears as though the local endpoint application is communicating directly with the network endpoint application, but in reality the local endpoint application is interfacing with the proxy engine. Similarly, the network endpoint application appears to be communicating directly with the local endpoint application, but is actually interfacing with the proxy engine. All of this is done in a manner that is transparent to the user at the local endpoint application, i.e. the user does not need to initiate any special configurations or take special action, as it occurs automatically. Thus, the invention provides for "spoofing" for quick determination and implementation of PPP network control protocols over one or more channels, and for data compression techniques, during the call connection process.

SUMMARY OF THE INVENTION

The present invention is implemented in a system comprising a source of data, a receiver of data and a communication channel linking the source and the receiver. In one aspect, the invention is a method for setting up a data transmission session between a local endpoint application at the source and a network endpoint application at the destination with a proxy engine in a transparent manner. The method comprises the steps of:

placing the proxy engine in simultaneous communication sessions with the local endpoint application and the network endpoint application;

determining with the proxy engine at least one of the following: (a) security protocols, (b) multiple channel capabilities, (d) data compression techniques, and/or (d) network control protocols, that are supported by the network endpoint application, determining with the proxy engine the security protocols and/or network control protocols that are supported by the local endpoint application;

enabling the security protocols, multiple channel capabilities, data compression techniques and network protocols that are supported by both (1) the network endpoint application, and (2) the combination of the proxy engine and the local endpoint application, and transmitting data between the local endpoint application and the network endpoint application, whereby data may be transmitted from the source of the data to the receiver of the data over the communication channel. In this manner, to the extent that the network endpoint application requests multiple channel capabilities or data compression techniques that are not supported by the local endpoint application, these features are provided by the proxy engine. Additionally, the proxy engine enables the security protocols and network control protocols that are supported by the local endpoint application.

In general, the local endpoint application communication session ("the local session") may be negotiated as a single link with no data compression. Conversely, the network endpoint application communication session ("the network session") will be negotiated with multiple links and with data compression.

In accordance with the preferred form of the present invention, in order for the network session and the local session to gain each other's configuration information, the two sessions are preferably brought up (or "enabled") in a specific order. Inherently, PPP requires that multiple control layers be established before a session may be brought into service.

Where the proxy engine supports multiple links over the PPP, the preferred embodiment of the invention provides for opening up a second communication channel or multiple communication channels for transmission of the data between the source and the receiver of the data, and transmitting the data over all of the opened channels simultaneously from the source to the receiver. If more than two channels are available (as in ISDN Primary Rate service), then the proxy engine may open up more than two channels and pipe the data to the endpoint application down however many channels may be opened. This feature permits a significant reduction in the overall call connection time and a significant increase in call throughput.

BRIEF DESCRIPTION OF THE DRAWINGS

Presently preferred embodiments of the invention are depicted in the drawings, wherein like reference numerals refer to like elements in the various views, and wherein:

FIG. 1A is an illustration of a prior art local endpoint application that communicates with a network endpoint application via a single channel communication line connected to a network;

FIG. 1B is an illustration of a prior art local endpoint application that communicates with a network endpoint application via a multiple channel communication line connected to a network;

DETAILED DESCRIPTION OF THE PREFERRED EMBODIMENT

Figure 2:
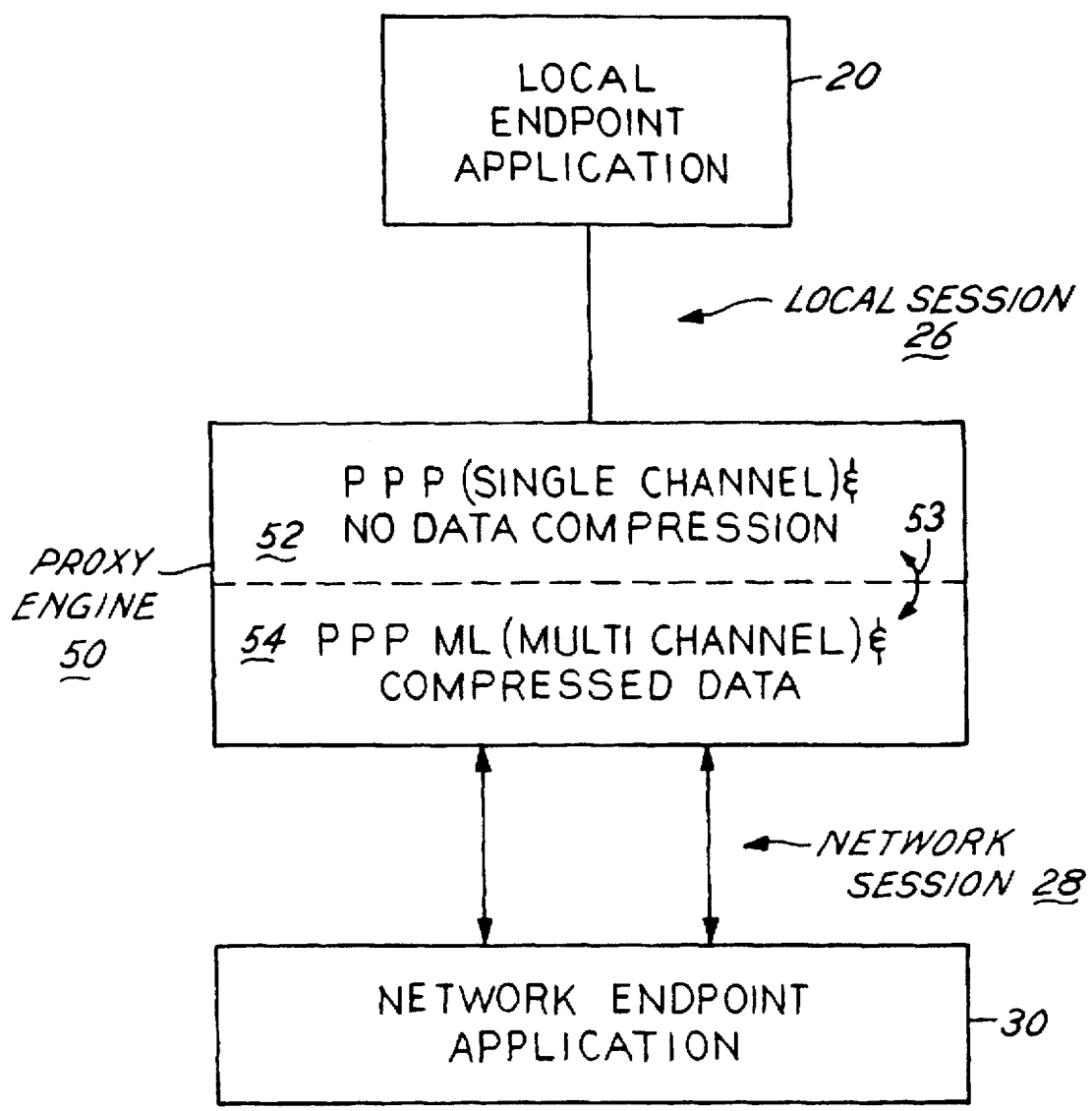
FIG. 2 is an illustration of the interrelationship between a local endpoint application, a proxy engine and a network endpoint application according to a preferred form of the invention.

FIG. 1 shows a prior art data communication system wherein a local endpoint application 20 is in communication with a network endpoint application 30 via a network 40. The local endpoint application 20 is the source of data to be transmitted to the network endpoint application 30. The local endpoint application is linked via communications hardware (not shown) to a communication channel 22A (such as a B-channel of an ISDN line), which is turn routed through the network or communication system 40 to a second ISDN channel 22B. Channel 22B is connected via conventional hardware (not shown) to the computer running the network endpoint application 30. Typically, the channel 22A supports the Point-To-Point Protocol (PPP) with or without the implementation of data compression techniques. In order for advanced PPP protocols to be used by both the local 20 and endpoint 30 applications, both would have to be supported by the respective applications.

FIG. 1B shows a similar prior art arrangement of the local and network endpoint applications 20 and 30 respectively, except that a multiple channel line 24A links the local endpoint application 20 to the network 40. Similarly, a multiple channel line 24B links the network 40 to the network endpoint application 30. The capabilities of the local and network endpoint applications is the lowest common denominator of protocol and compression suites that may be supported by the local and network endpoint applications.

Referring now to FIG. 2, the presently preferred embodiment of the invention uses a proxy engine 50 to facilitate the communication between the local endpoint application 20 and the network endpoint application 30. The proxy engine 50 consists of a software structure that is typically implemented at the source computer (not shown in FIG. 2) running the local endpoint application 20, such as at the ISDN driver for the source computer. The proxy engine 50 consists of a set of routines 52 that communicate with the local endpoint application in a local endpoint application communication session 26, and a set of routines 54 that communicate with the network endpoint application 30 in a network endpoint application communication session 28.

Figure 4:
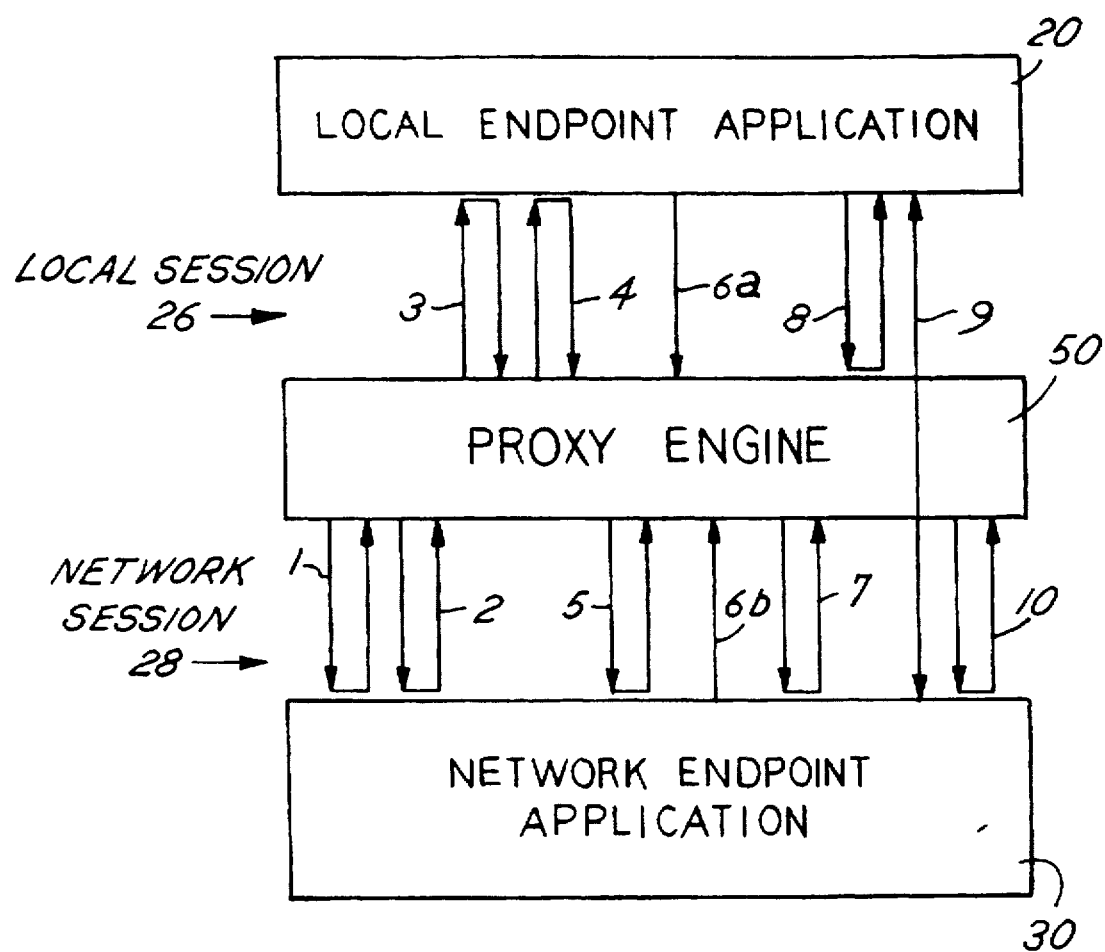
FIG. 4 is an illustration of the sequence of the flow of information between the local endpoint application, the proxy engine, and the network endpoint application of FIGS. 2 and 3, when the data transmission session is established according to a preferred embodiment of the invention.

The routines 52 consist of PPP, single channel, no data compression routines that are described in detail below in conjunction with FIG. 4 and set forth in the appended software listing. The routines 54 consists of multiple channel PPPML routines, with compressed data, and are also described below in conjunction with FIG. 4 and set forth in the appended software listing. The double arrow 53 indicates that the local endpoint application routines 52 pass information learned about the local endpoint application 20 to the routines 54 that communicate with the network endpoint application 30, and vice versa.

Figure 3:
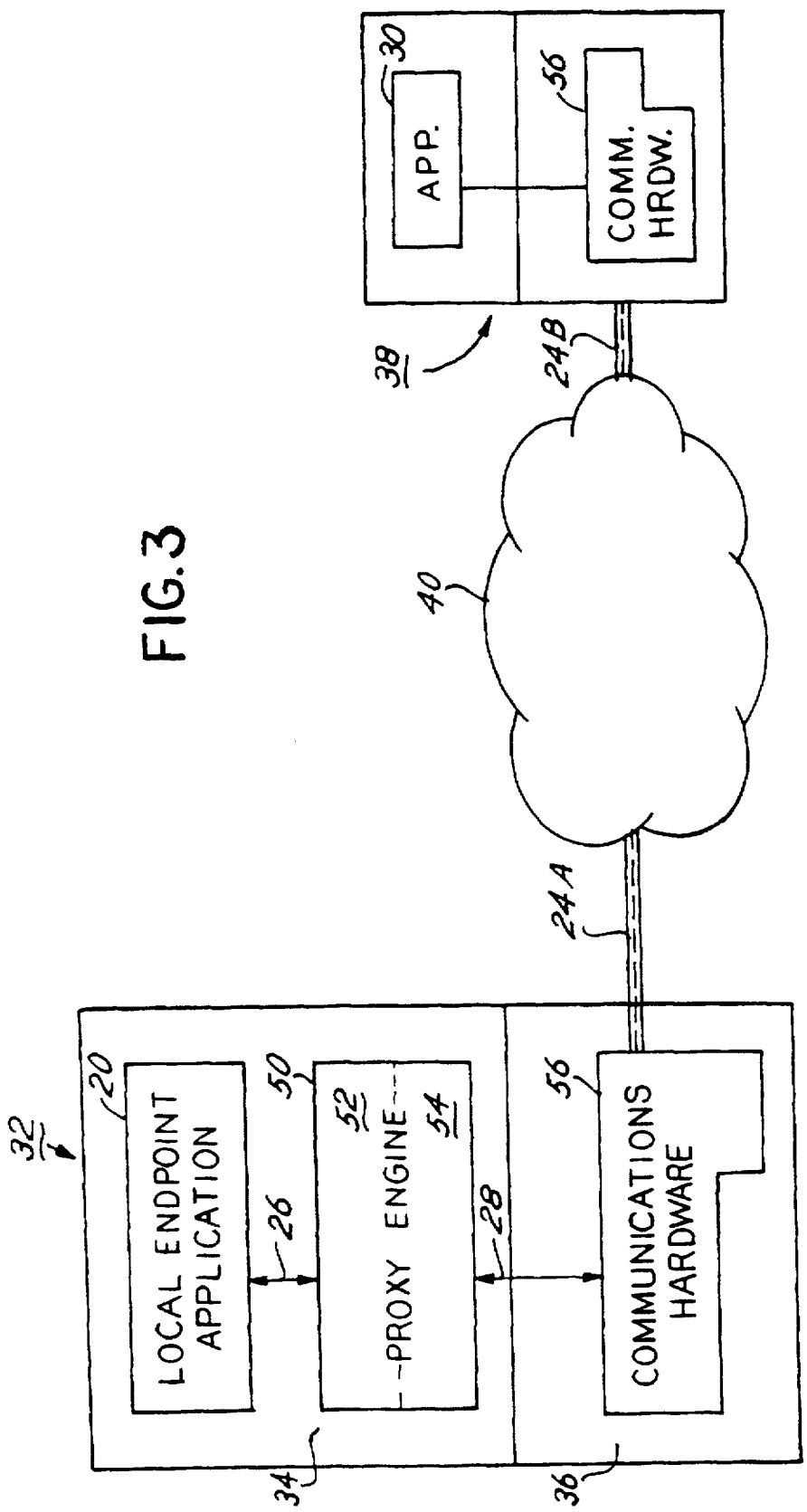
FIG. 3 is a hardware and software diagram of the local endpoint, showing the local endpoint application, proxy engine and communications hardware, in conjunction with the communication channel leading to the network and network endpoint equipment.

FIG. 3 is a hardware and software diagram of a source of data or local endpoint 32, showing the local endpoint application 20 (in software), proxy engine 50 (also in software), in their relationship to the communication hardware 56 that connects the source 32 to the communication channel 24. The communications hardware 56 is, for example, an ISDN basic rate adapter which is installed in a personal computer, and corresponds to the physical layer of the OSIRM model. The communication hardware 56 is controlled by the software 34 that runs at the source 32. The proxy engine 50 is in communication via the line 24A, network 40, and line 24B with the destination or network endpoint 38, which has its own communications hardware 56 controlled by its own application software 30.

The local endpoint application 20 will typically support the Point-to-Point protocol and perhaps some limited subset of the advanced PPP features, and may or may not support particular data compression algorithms. The session 26 negotiates the PPP protocol down to single channel and no data compression. The proxy engine 50 supports single channel non-compressed PPP protocol to the local endpoint application 20 from the routines 52. The proxy engine 50 supports multiple compressed PPP channels to the network endpoint application 30 (which supports PPP or PPPML) and possibly compression of the data packets from routines 54.

The network endpoint or destination 38 contains a network endpoint application 30 which supports PPP or PPPML and possibly compression of data packets. If the network endpoint application 30 supports a particular data compression algorithm, but the local endpoint application 20 does not, the proxy engine 50 provides for the local endpoint application 20 the necessary data compression feature, provided that the proxy engine supports this particular compression feature. It will be apparent that to optimize the usefulness of the proxy engine with a large and diverse set of potential network endpoints, it is preferable to support as large a number of protocol features (such as PPPML, security requirements such PAP) and data compression techniques as possible. It will also be appreciated that the present invention may be used with just support for PPP features such as PPPML or PAP and no data compression, or data compression but no protocol features, or with both protocol features and data compression, the idea being that the proxy engine supplies the missing authentication protocol (i.e., CHAP in the present embodiment), data, compression technique, or multiple link protocol that happens to not be implemented at the local endpoint application.

The data transmission session establishment process is preferably performed in a sequence of steps. In particular, FIG. 4 illustrates the session establishment flow between the network endpoint application 30 and the local endpoint application 20, with the reference numerals 1-10 corresponding to the steps described below. The arrows in FIG. 4 represent the flow of requests and information between the proxy engine 50, the local endpoint application 20 and the network endpoint application 30. As noted in FIG. 4, the proxy engine is placed in simultaneous communication sessions 26, 28 between the proxy network endpoint application 30 and the local endpoint application 20. The routines 52 and 54 (FIG. 3) which are performed in the proxy engine 50 are described in conduction with the ten steps set forth below.

Step 1: Bring up the physical layer of the network session 28.

The process begins by the source DTE 32 placing a call over a communication link (such as an ISDN D-channel) to a remote DTE 38 on the network or communication system 40, thereby allocating an end-to-end circuit through the communication network 40.

Step 2: Bring up the network endpoint application 30 LCP layer.

The proxy engine 50 establishes the link-control-protocol (LCP) layer of the network session 28 prior to responding to any messages from the local endpoint application 20. This step involves a series of handshaking routines (such as configure-request or CFG_REQ messages) to determine that the user at source 32 has called up a PPP entity 38 over the network 40. The Internet Standard for PPP is used for the LCP layer. Two of the items of information that are learned when the LCP layer in brought up in step 2 are (1) whether or not password authentication needs to take place, and (2) whether MultiLink (or PPPML) is supported by the network endpoint application 30.

Step 3: Bring up the local endpoint application 20 LCP layer.

Once the network endpoint application 30 LCP is established, the local endpoint application 20 LCP session is brought up. In the configure-request message, the Password Authentication Protocol (PAP) Authentication is specified if the network endpoint application 30 requires any kind of authentication. PAP is used so that the user name/password is obtained transparently from the local endpoint application 20 without requiring user intervention.

Step 4: Bring up the local endpoint application 20 Authentication Layer (if applicable)

If the network session 28 at step 2 specified that the local endpoint application 20 must authenticate passwords before bringing up the network control protocols (NCP's), the user name/password combination must be obtained from the local endpoint application 20. By requesting to the local endpoint application 20 during the link control protocol negotiations that the local endpoint application 20 must authenticate with the proxy engine 50 (the proxy engine 50 being the Authenticator and the local endpoint application 20 being the Peer), we now bring up the PAP Authentication control protocol with the application session as per the Internet Standard for PPP Authentication Protocols.

Step 5: Bring up the network endpoint application 30 Authentication Layer.

Once the local endpoint application 20 authentication control protocol is open, the network endpoint application 30's authentication control protocol is brought up, with the network endpoint application 30 being the Authenticator and the proxy engine 50 being the Peer. In the preferred embodiment, the proxy engine 50 can support both PAP or CHAP (Challenge Handshake Authentication Protocol). Also, the proxy engine 50 will only be the Peer on the network endpoint side and the Authenticator on the local endpoint side.

Step 6a: Determine which Network Control Protocols (NCP's) the local endpoint application 20 wants to bring up.

At this point, the proxy engine 50 needs to determine which of the network control protocols the local endpoint application 20 supports and wishes to open. In order to determine this, the proxy engine 50 will wait to receive the CFG_REQ message from the local endpoint application 20 for the NCP's that the network endpoint application 20 wishes to open and communicate over. Upon receiving a CFG-REQ message, the proxy engine 50 will first learn any information that is necessary for successful proxy operations.

The learned information for each supported network control protocol is as follows:

(i) BCP (Bridging Control Protocol): None.
(ii) IPCP (Internet Protocol Control Protocol): The local endpoint application 20's internet protocol address, including whether the local endpoint application 20 is asking for an internet protocol address to be assigned from the network endpoint application 30.
(iii) IPXCP (Internet Packet Exchange Control Protocol):
   a) The local endpoint application 20's internet packet exchange network address, including whether the local endpoint application 20 is asking for the IPX network address from the network endpoint application 30; and
   b) The local endpoint application 20's IPX Node Address, including whether the application 20 is asking for an IPX Node Address to be assigned from the network endpoint application 30. If the local endpoint application 20 is asking for one to be assigned, the proxy engine 50 will return the proxy engine's Media Access Control Address as the assigned Node Address (which is stored in an EEPROM memory, not shown) instead of asking the network endpoint application 30 for one.
   c) NBFCP (NetBEUI control protocol): The local endpoint application 20's name in the IBM Network Basic Input/Output System Extended User Interface (NetBEUI) protocol.

Since multiple network control protocols can be opened over a single PPP session, each network control protocol state machine can operate autonomously.

Step 6b: Determine which (if any) Compression Protocols the network endpoint application 30 is trying to bring up. If it is one that the proxy engine supports, bring it up.

Once all of the LCP and Authentication Layers are opened, the network endpoint application 30 is allowed to attempt compression control protocol (CCP) negotiations, that is, opening up a compression session between the proxy engine 50 and the network endpoint application 30. The proxy engine 50 listens for any CCP CFG_REQ messages from the network endpoint application 30. Upon receiving one, the proxy engine 50 determines what compression scheme the network endpoint application 30 is trying to negotiate.

Specificallly, the compression algorithm that the network endpoint application 30 is attempting to negotiate is determined in two steps. The first step is to look at the CCP Option Type Field in the CCP Configuration Request (CFG_REQ) message. If the CCP Option Value indicates Microsoft PPC Compression, the proxy engine does not need to proceed further with the interrogation. If the CCP Option Value indicates STAC Electronics LZS, the proxy engine 50 needs to determine whether it is STAC LZS™ or Ascend™'s version of STAC LZS. Th difference between these two is that the length of the STAC Electronics Configuration Request Message is five (5) bytes long whereas Ascend's length is six (6) bytes long (Ascend has an additional byte for negotiating the dictionary reset mode). If none of the three compression techniques were detected, no compression will be allowed.

Persons of skill in the art will of course appreciate that the above identification technique for presently popular data compression techniques can be readily adapted to other types of data compression techniques that may be developed in the future.

If the compression techniques that the network endpoint application 30 is a compression scheme that is supported by the proxy engine 50, the proxy engine 50 will open the compression layer control protocol with the network endpoint application 30. If it is not one that the proxy engine 50 supports, the proxy engine 50 will reject the request to negotiate the compression layer with a PROTO_REJECT message, thereby disallowing compressed data packets over the network session 28. Thus, even if the local endpoint application does not support the data compression algorithm requested by the network endpoint application 30, the proxy engine 50 provides it for the local endpoint application 20, allowing the data compression technique to be used in the transmission of data from the source to the destination.

Preferably, the proxy engine 50 supports a wide variety of known compression protocols, such as STAC LZS™, Microsoft PPC™, and Ascend™ version of STAC LZS™. Licenses from the proprietors of the compression techniques should be obtained in order for the proxy engine 50 to implement proprietary compression techniques.

Step 7: For each NCP that the local endpoint application 20 has specified (via step 6 (a)), bring up the respective network endpoint application 30 NCP.

After learning the local endpoint application 20 NCP information in step 6(a), the proxy engine 50 will use this information in bringing up the respective network endpoint application 30 NCP's. If any information was dynamically assigned by the network endpoint application 30 (as dictated by the local endpoint application 20) the proxy engine 50 will store the learned information for later use.

Step 8: Once the Network endpoint application 30 NCP are opened, bring up the respective application NCP.

After the network endpoint application 30 NCP is opened, the proxy engine 50 will bring up the respective local endpoint application 20 NCP (passing back to it any dynamically assigned information from either the network endpoint application 30 or the proxy engine 50). Once this step is complete, data packets may flow over the proxy engine 50 logical interface.

Step 9: Once the local endpoint application 20 NCP is open, the proxy engine will now allow data packets to flow through it.

As the proxy engine 50 receives data packets from the local endpoint application 20, it will:

(1) try to compress the packet (if applicable);
(2) split the packet (original or compressed) into multiple fragments; and
(3) transmit the fragments over one or more open data channels to the network endpoint application 30.

As the proxy engine 50 receives data fragments from the network endpoint application 30, it will:

(1) collect all the fragments which constitute a complete data packet;
(2) reassemble the fragments into one contiguous data packet;
(3) uncompress the reassembled data packet (if applicable); and
(4) transmit the uncompressed reassembled data packet to the local endpoint application 20.

Step 10: If the network allows MultiLink to be brought up, bring up a second data channel.

Once the first NCP is opened on the local endpoint application 20 side, the proxy engine 50 will preferably attempt to bring up a second data channel (such as the second B-channel in ISDN basic rate service) over the network session 28. Unlike the first link, the local session 26 is not aware of the second B-channel activity. Once the second B-channel comes up, the data packets are transmitted over both the multiple active B-channels to the network endpoint application 30 running at the destination DTE 38, thereby increasing call throughput and reducing the overall call connect time.

Figure 5:
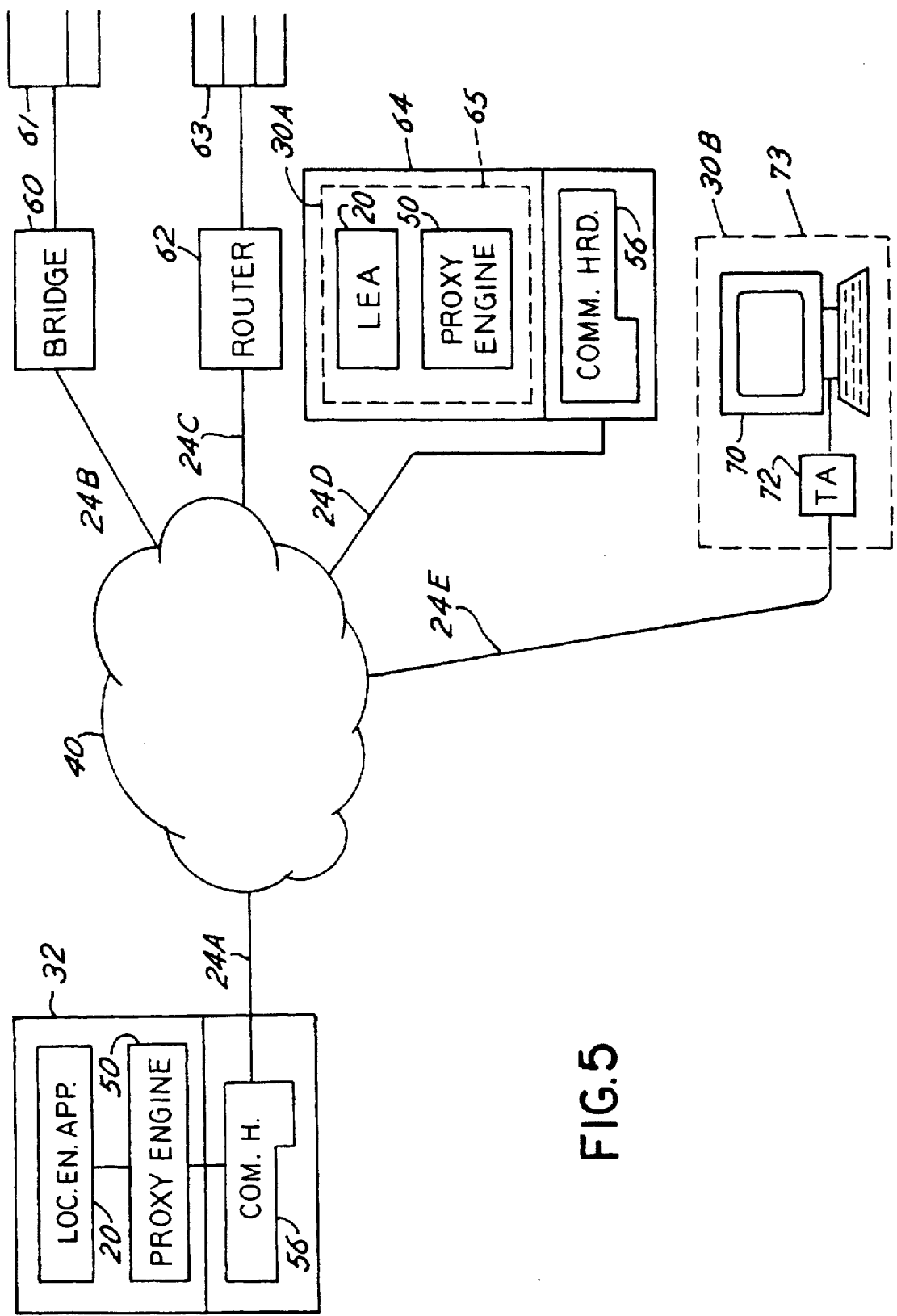
FIG. 5 is a schematic diagram of a source of data which implements the invention in communication with a variety of possible different network endpoint destinations over a network, wherein the proxy engine of FIGS. 2–4 may be implemented in one or more of the network endpoint destinations in addition to the source.

The present invention may be implemented in a variety of situations. Referring to FIG. 5, the source DTE 32 is shown connected via channel 24A to a network 40 (the details of which are not important). The network 40 may supply a line 24B to a bridge 60 connected to a second network 61, a line 24C connected to a router 62 connected to another network 63, a line 24D connected to computer 64, or a line 24E connected to a computer 70.

In FIG. 5, source 32 is shown as having a proxy engine in communication with communication hardware 56 (such as an ISDN basic rate adapter), and running an application software comprising the local endpoint application 20. The source 32 may attempt to transfer data to the bridge 60, which runs its own application and thus is considered herein as a network endpoint application. The same holds true for router 62.

Note that computer 64 has its own proxy engine 50 and application 20. The combination of the proxy engine 50 and the local endpoint application 20 running in the computer 64 constitutes in effect a network endpoint application 65 that may be called by the source 32.

The computer 70 is shown connected to a line 24E via an ISDN terminal adapter 72. The computer 70 does not have a proxy engine of its own. However, the source 32 may transmit data to the computer 70 using its own proxy engine in the manner described above. The combination of the computer 70 running its own application and ISDN TA 72 could also be considered a network endpoint application as that term is used herein.

In all of the above representative examples of FIG. 5, it will be appreciated that the proxy engine 50 in the source 32 facilitates the communication with whatever network endpoint application it may happen to call to transmit data. The description above in conjunction with FIGS. 2–4 would apply to any of these data transmission sessions.

The appended computer software listing (See Appendix) sets forth the source code for a presently preferred embodiment of the invention. The source code is preferably incorporated into the ISDN driver, and runs on the motherboard of a host personal computer. The reader is directed to the Notice Re: Copyright set forth above.

It will be appreciated from the forgoing description of a presently preferred embodiment of the invention that some variation in the above procedure is envisioned depending on the particular features of the data transmission medium, the capabilities of the local and network endpoint applications, and the protocol features that may be supported by the proxy engine. Such variations will apparent to those of skill in the art and are intended to be within the spirit and scope of the invention. As additional protocols are developed (such as authentication protocols and multiple link protocols, some modification to the operation of the proxy engine may be necessary in order to implement the invention, and such modifications are considered to be within the capabilities of persons of ordinary skill in this art. This true spirit and scope is defined by the appended claims, to be interpreted in light of the foregoing specification.

```
/** :ts=4 ****************************************************************
 *
 *          *******   *******   *******
 *             *         *         *
 *             *         *         *
 *             *      *******      *
 *             *         *         *
 *             *         *         *
 *          *******   *******   *******
 *
 *        Copyright ISDN Systems Corp., 1992-1995.
 *
 *              All Rights Reserved.
 *
 *
 *    Filename:    pppdefs.h
 *
 *    Description: This module contains definitions of symbols and
 *                 PPP data structures for the ISDN Program Entity.
 *
 *    Modification Log:
 *
 *    Date       Authors    Notes/Description of Change
 *    02-10-93   Jomama     Genesis
 *
 *****************************************************************/

/****
 * PPP State Machine Definitions
 ****/

/* PPP Connection States */
typedef enum
{
    PPP_STATE_UNDEFINED,       /* PPP ckt conn is undefined   */
    PPP_STATE_CONN_UP,         /* PPP ckt conn is up          */
    PPP_STATE_NCP_UP,          /* PPP NCP's are up            */
    PPP_STATE_MAX              /* Maximum state value         */
} PPP_states_t;

/* PPP Connection Events */
typedef enum
{
    PPP_EVENT_START,           /* Start PPP connection              */
    PPP_EVENT_LINK_UP,         /* Link is up                        */
    PPP_EVENT_LINK_DN,         /* Link is down                      */
    PPP_EVENT_PACKET_TX,       /* Application level packet to tx    */
    PPP_EVENT_FRAME_RX,        /* IPE data frame received           */
    PPP_EVENT_TIMER,           /* Timer timeout                     */
    APPP_EVENT_TIMER,          /* App Timer timeout                 */
    NPPP_EVENT_TIMER,          /* Net Timer timeout                 */
    PPP_EVENT_MAX
} PPP_events_t;

/****
 * PPP Definitions
 ****/ typedef enum PPP_get_pid_code_e
{
    PPP_GET_PID_NULL = 0,
    PPP_GET_PID_QUEUE,
    PPP_GET_PID_SEND,
    NUM_PPP_GET_PID_CODES
} PPP_get_pid_code_t;

typedef enum PPP_layer_e
{
    LCP_LAYER = 0,
    PAP_LAYER,
    CHAP_LAYER,
    BRCP_LAYER,
    IPCP_LAYER,
    IPXCP_LAYER,
    NBFCP_LAYER,
```

```
    CCP_LAYER,
    NUM_PPP_LAYERS
} PPP_layer_t;

typedef enum CP_states_e
{
    CP_INITIAL = 0,
    CP_STARTING,
    CP_CLOSED,
    CP_STOPPED,
    CP_CLOSING,
    CP_STOPPING,
    CP_REQ_SENT,
    CP_ACK_RCVD,
    CP_ACK_SENT,
    CP_OPEN
} CP_states_t;

typedef enum EM_states_e
{
    EM_INITIAL = 0,
    EM_LISTENING,
    EM_NETCP_STARTED,
    EM_NETCP_OPEN,
    EM_APPCP_OPEN
} EM_states_t;

/* PPP Control Protocol control block */
typedef struct s_cpctl
{
    CP_states_t   cpstate;          /* Control Protocol state */
    u8            lastid;           /* ID of last REQ we sent */
    u16           ack_retry;        /* send_req ACK retry counter */
    Timer_t       timer_id1;        /* Identifier of timer 1 */
    Timer_t       timer_id2;        /* Identifier of timer 2 */
} S_CPCTL;

/* Compression control block */
typedef struct _compression_state
{
    BOOL          inited;            /* Compression session inited    */
    BOOL          compressing;       /* TRUE if we are compressing    */
    DWORD         algorithm;         /* which algorithm we are using  */
    u16           mode;              /* N:N or 1:1 mode for the connection */
    u16           performance_mode;  /* LZS performance parameter     */
    u16           performance;       /* LZS performance parameter     */
    u16           flags;             /* LZS compression ONLY flags    */
    u16           cut_off_size;      /* Won't compress less than this size */
    u16           t1_to_large;       /* Ctr for T1 timer: pkts to large */
    u16           t1_pkt_count;      /* Ctr for T1 timer: pkts compressed */
} Compress_t;

#define PPP_TIMER1            1
#define PPP_TIMER2            2
define PPP_TIMER3            3 define SZ_IPX_NODENUM        6
define SZ_NBF_CLUTTER        6
define SZ_NBF_PEERNAME       33 define MPP_WINDOW_SIZE       16
define NUM_PPP_INTERNAL_BUFS  8
#define MAX_QUEUED_PPP_DATA_PKTS 4
define MAX_CALL_RETRIES      5 define PPP_RESTART_TIMEOUT   3
define PPP_MAX_TERM_COUNTER  2
#define PPP_MAX_CFG_COUNTER   10
#define PPP_MAX_FAIL_COUNTER  10
define PPP_CHECKBW_TIMEOUT   45 define M_PPP_NCP_PROTS       (PPP_PROT_CCP | PPP_PROT_NBF | PPP_PROT_IPX | \
                               PPP_PROT_IP  | PPP_PROT_BR  | PPP_PROT_CHAP | \
                               PPP_PROT_PAP)
```

```
/* PPP channel control block. */
typedef struct S_PPP
{
    u16             protocols;              /* Protos supported (BRIDGE, IP) */
    PPP_states_t    ckt_state;              /* Circuit Connection State      */
    PPP_events_t    last_event;             /* Last event processed          */
    u16             neg_mru;                /* LCP:  1=Attempt MRU negotiation */
    u16             lcl_mru;                /* LCP:  Max RX Unit value (Outgoing) */
    u16             rem_mru;                /* LCP:  Max RX Unit value (Incoming) */
    u16             rx_ac_comp;             /* LCP:  RX Addr/Ctrl compression */
    u16             rx_proto_comp;          /* LCP:  RX Protocol compression */
    u16             tx_ac_comp;             /* LCP:  TX Addr/Ctrl compression */
    u16             tx_proto_comp;          /* LCP:  TX Protocol compression */
    BOOL            send_endpt;             /* LCP:  Send Endpt ID */
    u16             auth_flags;             /* LCP:  Authentication Flags    */
#define AF_CHAP_AUTHENTICATOR       0x1
#define AF_CHAP_PEER                0x2
#define AF_PAP_AUTHENTICATOR        0x4
#define AF_PAP_PEER                 0x8
#define AF_COMPLETED                0x10
    u16             auth_compl_flags;       /* LCP:  Auth Complete Flags     */
#define AF_CHAP_AUTH_APPROVED       0x1
#define AF_CHAP_PEER_APPROVED       0x2
#define AF_PAP_AUTH_APPROVED        0x4
define AF_PAP_PEER_APPROVED        0x8 u32             challenge_val;          /* CHAP: Current Challenge Value */
    u16             neg_ip_addrs;           /* IPCP: 1=send a CfgReq w/IP addrs */
    BOOL            peer_negotiated_ip_addr;
    u32             my_ip_addr;             /* IPCP: My IP address */
    u32             peer_ip_addr;           /* IPCP: IP address of remote peer */
    u16             neg_ipx_network;        /* IPXCP: 1=send CfgReq w/IPX net # */
    BOOL            peer_negotiated_ipxnet_addr;
    u32             my_ipx_network;         /* IPXCP: my IPX network address */
    u32             peer_ipx_network;       /* IPXCP: peer IPX network address */
    u16             neg_ipx_node;           /* IPXCP: 1=send CfgReq w/IPX node # */
    BOOL            peer_negotiated_ipxnode_addr;
    u8              my_ipx_node[SZ_IPX_NODENUM];
    u8              peer_ipx_node[SZ_IPX_NODENUM];
    u16             ipx_framing;            /* IPX frame type (as it goes up) */
#define PPP_IPX_FRAME_ETHER_II      0
#define PPP_IPX_FRAME_ETHER_802_2   1
#define PPP_IPX_FRAME_ETHER_802_3   2
#define PPP_IPX_FRAME_ETHER_SNAP    3
    u16             neg_name_proj;          /* NBFCP: 1=send CfgReq w/Name Proj */
    BOOL            peer_negotiated_nbname;
    u16             neg_peer_info;          /* NBFCP: 1=send CfgReq w/Peer Info */
    u16             nb_mac_req;             /* NBFCP: MAC address required flag */
    u8              nb_peer_clutter[SZ_NBF_CLUTTER]; /* NBFCP: Peer Class,Ver */
    u8              nb_peer_name[SZ_NBF_PEERNAME];   /* NBFCP: Peer Name */
    u8              ccp_req_len;            /* CCP:  CCP Cfg Req options length */
#define CCP_STACKER_REQ_LEN         5
#define CCP_MICROSOFT_REQ_LEN       6
#define CCP_ASCEND_REQ_LEN          6
    u8              ccp_num_hists;          /* CCP:  CCP Number of histories */
#define CCP_CV_NONE                 0
#define CCP_CV_LCB                  1
#define CCP_CV_CRC                  2
#define CCP_CV_SEQNUM               3
    u8              stac_check_val;         /* CCP:  STAC Check Value type */
    u8              stac_decomp_paused_id;  /* STAC: Decompress Pause ID */
                                            /*       (non-0 means we are paused) */
    u16             mppc_rx_coherency;      /* MPPC: RX coherency ctr (12 bits) */
    u16             mppc_tx_coherency;      /* MPPC: TX coherency ctr (12 bits) */
#define CCP_A_FLUSHED               0x8000
#define CCP_B_HISTBEG               0x4000
#define CCP_C_PKTCOMPRESSED         0x2000
#define CCP_D_PKTENCRYPTED          0x1000
#define CCP_COHERENCY_BITS          0x0fff
    u8              ascend_reset_mode;      /* CCP:  ASCEND Reset Mode */
#define ASCEND_RESET_SINGLE_HISTORY 0x1
#define ASCEND_RESET_MULTI_HISTORY  0x2
#define ASCEND_RESET_HISTORY_GEN    0x3

/* Ascend CCP request - extra byte value */
```

```
define ASCEND_MAGIC_BYTE        3 u8              pppid;              /* Counter for PPP id field */ u32             mpp_seqnum;         /* MPP: Running sequence number */
    u32             mpp_seq_state;
#define MPP_SEQ_STATE_RESYNC     0
#define MPP_SEQ_STATE_SYNC       1

/** Compression Control Block vars. **/
    Compress_t      compression;

/** Data Control Block variables. **/
    Timer_t         expansion_timer;    /* Link expansion timer              */
    u16             last_tx_link;       /* Last link data was sent out       */
    u16             activity_flag;      /* Data activity flag                */
    u32             tx_packets;         /* # of application packets tx       */
    u32             tx_frames;          /* # of IPE packets tx               */
    u32             tx_bytes;           /* Number of bytes tx                */
    u32             tx_delta_bytes;     /* Number of bytes tx per poll       */
    u32             rx_packets;         /* # of application packets rx       */
    u32             rx_frames;          /* # of IPE packets rx               */
    u32             rx_bytes;           /* # of bytes rx                     */
    u32             rx_delta_bytes;     /* # of bytes rx per poll            */
    u32             frame_expected;     /* Lower edge of rx window           */
    u32             too_far;            /* Upper edge of rx window + 1       */
    u32             call_retry_cnt;     /* Call retry counter                */
    GCAPACKET       *Inbuf[MPP_WINDOW_SIZE];  /* Rx buffers                  */
    u32             arrived[MPP_WINDOW_SIZE]; /* Rx buffer map               */
    LIST_ENTRY      txq;                /* Tx pkt queue                      */
    u16             num_tx_pkts_on_q;   /* Number of Tx pkts on the que      */
} PPP_CB_t;

/* APPP channel control block. */
typedef struct S_APPP
{
    u16             protocols;          /* Protos supported (BRIDGE, IP) */
    PPP_states_t    ckt_state;          /* Circuit Connection State      */
    PPP_events_t    last_event;         /* Last event processed          */
    u16             neg_mru;            /* LCP: 1=Attempt MRU negotiation */
    u16             lcl_mru;            /* LCP: Max RX Unit value (Outgoing) */
    u16             rem_mru;            /* LCP: Max RX Unit value (Incoming) */
    u16             rx_ac_comp;         /* LCP: RX Addr/Ctrl compression */
    u16             rx_proto_comp;      /* LCP: RX Protocol compression  */
    u16             tx_ac_comp;         /* LCP: TX Addr/Ctrl compression */
    u16             tx_proto_comp;      /* LCP: TX Protocol compression  */
    BOOL            send_endpt;         /* LCP: Send Endpt ID            */
    u16             auth_flags;         /* LCP: Authentication Flags     */
#define AF_CHAP_AUTHENTICATOR    0x1
#define AF_CHAP_PEER             0x2
#define AF_PAP_AUTHENTICATOR     0x4
#define AF_PAP_PEER              0x8
#define AF_COMPLETED             0x10
    u16             auth_compl_flags;   /* LCP: Auth Complete Flags      */
#define AF_CHAP_AUTH_APPROVED    0x1
#define AF_CHAP_PEER_APPROVED    0x2
#define AF_PAP_AUTH_APPROVED     0x4
#define AF_PAP_PEER_APPROVED     0x8
    u32             challenge_val;      /* CHAP: Current Challenge Value */
    u16             neg_ip_addrs;       /* IPCP: 1=send a CfgReq w/IP addrs */
    BOOL            peer_negotiated_ip_addr;
    u32             my_ip_addr;         /* IPCP: My IP address */
    u32             peer_ip_addr;       /* IPCP: IP address of remote peer */
    u16             neg_ipx_network;    /* IPXCP: 1=send CfgReq w/IPX net # */
    BOOL            peer_negotiated_ipxnet_addr;
    u32             my_ipx_network;     /* IPXCP: my IPX network address */
    u32             peer_ipx_network;   /* IPXCP: peer IPX network address */
    u16             neg_ipx_node;       /* IPXCP: 1=send CfgReq w/IPX node # */
    BOOL            peer_negotiated_ipxnode_addr;
    u8              my_ipx_node[SZ_IPX_NODENUM];
    u8              peer_ipx_node[SZ_IPX_NODENUM];
    u16             ipx_framing;        /* IPX frame type (as it goes up) */
#define PPP_IPX_FRAME_ETHER_II    0
#define PPP_IPX_FRAME_ETHER_802_2 1
```

```
#define PPP_IPX_FRAME_ETHER_802_3    2
#define PPP_IPX_FRAME_ETHER_SNAP     3
    u16           neg_name_proj;           /* NBFCP: 1=send CfgReq w/Name Proj */
    BOOL          peer_negotiated_nbname;
    u16           neg_peer_info;           /* NBFCP: 1=send CfgReq w/Peer Info */
    u16           nb_mac_req;              /* NBFCP: MAC address required flag */
    u8            nb_peer_clutter[SZ_NBF_CLUTTER];/* NBFCP: Peer Class,Ver */
    u8            nb_peer_name[SZ_NBF_PEERNAME];   /* NBFCP: Peer Name */
    u8            pppid;                   /* Counter for PPP id field */

/** Data Control Block variables. **/
    u32           tx_packets;              /* # of application packets tx   */
    u32           tx_bytes;                /* Number of bytes tx            */
    u32           rx_packets;              /* # of application packets rx   */
    u32           rx_bytes;                /* # of bytes rx                 */
    S_CPCTL       a_cpctl[NUM_PPP_LAYERS];
    EM_states_t   a_emstates[NUM_PPP_LAYERS];  /* Emulation state */
} APPP_CB_t;

typedef struct _callInfo
{
    DWORD              num_links;          /* num active links for this call */
    Link_CB_t          link[MAX_LINKS];
    APPP_CB_t          appp;               /* PPP Emulation State Machine. */
    PPP_CB_t           ppp;                /* PPP State Machine. */
    ISCCALLSPECIFICDATA IscCallData;       /* ISC Call Info params */
} CALLINFO, *PCALLINFO;
```

```
/*******************************************************************
 *
 *      ######   ######   ######
 *      #    #      #     #
 *      #    #      #     #
 *      #           #     ######
 *      #           #          #
 *      #    #      #          #
 *      ######   ######   ######
 *
 *      Copyright ISDN Systems Corp., 1992-1995.
 *
 *              All Rights Reserved.
 *
 *
 *      Filename:       appp.c
 *
 *      Description:    This module contains the Application side for the
 *                              PPP Emulation state machine processes.
 *
 *      Modification Log:
 *
 *      Date            Authors         Notes/Description of Change
 *      02-10-93        Jomama          Genesis
 *
 *******************************************************************/ include "pppdefs.h"

/*
 *      em_ppp_undefined_proc - Process UNDEFINED events
 */ void
em_ppp_undefined_proc(PPP_events_t event, PCALLINFO lpCall,
        void *p_aux1, void *p_aux2, void *p_aux3)
{
        APPP_CB_t       *p_acb = &lpCall->appp;         /* APPP CB */
        PPP_CB_t        *p_ncb = &lpCall->ppp;          /* NPPP CB */
        Link_CB_t       *p_link = (Link_CB_t *)p_aux1;  /* Link CB */

/* p_aux1 is the ptr to the link control block (where appl.) */
        /* p_aux2 is the address of the user data (where applicable) */ p_acb->last_event = event;
        p_ncb->last_event = event;

switch(event)
        {
            case PPP_EVENT_LINK_UP:
                if (lpCall->num_links == 1)
                {
                        appp_initcb(lpCall);
                        nppp_initcb(lpCall, p_link);

p_acb->ckt_state = PPP_STATE_CONN_UP;
                        p_ncb->ckt_state = PPP_STATE_CONN_UP;

/* Establishing PPP connection */

/* beam me up scotty... Net side (STEP 1) */
                        nppp_start(lpCall, p_link, LCP_LAYER, CP_CLOSED);
                }
                /* else   this an expanded link - impossible */
                break;

case PPP_EVENT_LINK_DN:
                /* ignore */
                break;

case PPP_EVENT_FRAME_RX:
                ppp_rls_pkt(p_aux2, 0);     /* drop it */
                break;
```

```
        case PPP_EVENT_PACKET_TX:
            ppp_rls_pkt(p_aux2, 0);      /* we don't queue TX pkts, drop it */
            break;

case APPP_EVENT_TIMER:
            clr_appp_timer(lpCall, (PPP_layer_t)p_aux3, (u32)p_aux2);
            break;

case NPPP_EVENT_TIMER:
            clr_nppp_timer(lpCall, p_link, (PPP_layer_t)p_aux3, (u32)p_aux2);
            break;

/* Event is unrecognized */
        default:
            break;
        }
}

/*
 *    em_ppp_ckt_conn_up - Process CONN_UP events
 */ void
em_ppp_ckt_conn_up_proc(PPP_events_t event, PCALLINFO lpCall,
        void *p_aux1, void *p_aux2, void *p_aux3)
{
    APPP_CB_t    *p_acb  = &(lpCall->appp);       /*   APPP CB  */
    PPP_CB_t     *p_ncb  = &lpCall->ppp;          /*   NPPP CB  */
    Link_CB_t    *p_link = (Link_CB_t *)p_aux1;   /*   Link CB  */
    PPP_layer_t  layer;

/* p_aux1 is the ptr to the link control block (where appl.) */
    /* p_aux2 is the address of the user data (where applicable) */
    /*           or the Timer Index */
    /* p_aux3 is the PPP_layer (for Timer Events) */ p_acb->last_event = event;
    p_ncb->last_event = event;

switch(event)
    {
        case PPP_EVENT_LINK_DN:     /* Connection is down */
            if (lpCall->num_links == 0)
            {
                p_acb->ckt_state = PPP_STATE_UNDEFINED;
                p_ncb->ckt_state = PPP_STATE_UNDEFINED;

appp_cleanup_queues(lpCall);
                nppp_cleanup_queues(lpCall);

appp_initcb(lpCall);
                nppp_initcb(lpCall, p_link);

/* PPP connection down */
            }
            else
            {
                /* Expanded PPP link down */
            }
            break;

case PPP_EVENT_FRAME_RX:     /* pkt from Net level */
            nppp_rx_frame(lpCall, p_link, p_aux2);
            break;

case PPP_EVENT_PACKET_TX:    /* pkt from Application level */
            appp_rx_frame(lpCall, p_aux2);
            break;

case APPP_EVENT_TIMER:
            layer = (PPP_layer_t)p_aux3;
            clr_appp_timer(lpCall, layer, (u32)p_aux2);

if (layer == PAP_LAYER)
                appp_auth_timeout(lpCall, layer, (u32)p_aux2);
```

```
            else
                appp_timeout(lpCall, layer, (u32)p_aux2);
            break;
        case NPPP_EVENT_TIMER:
            layer = (PPP_layer_t)p_aux3;
            clr_nppp_timer(lpCall, p_link, layer, (u32)p_aux2);

if ((u32)p_aux2 == PPP_TIMER3)
            {
                /* the Bandwidth timer */
                nppp_check_bw(lpCall);
            }
            else    /* a CP timer */
            {
                if ((layer == CHAP_LAYER) || (layer == PAP_LAYER))
                    nppp_auth_timeout(lpCall, p_link, layer, (u32)p_aux2);
                else
                    nppp_timeout(lpCall, p_link, layer, (u32)p_aux2);
            }
            break;

case PPP_EVENT_LINK_UP:
            /* This is only valid for an expanded link */
            if (lpCall->num_links == 2)
            {
                /* beam me up scotty... */
                nppp_start(lpCall, p_link, LCP_LAYER, CP_CLOSED);
            }
            break;

/* Unrecognized Event */
        default:
            break;
    }
}

/*
 *    em_ppp_release_conn -  Stop all links for this connection
 */
void
em_ppp_release_conn(PCALLINFO lpCall)
{
    APPP_CB_t    *p_acb = &(lpCall->appp);      /*   APPP CB  */
    PPP_CB_t     *p_ncb = &lpCall->ppp;         /*   NPPP CB  */ p_acb->ckt_state = PPP_STATE_UNDEFINED;
    p_ncb->ckt_state = PPP_STATE_UNDEFINED;

appp_cleanup_queues(lpCall);
    nppp_cleanup_queues(lpCall);

appp_init_all_layers(lpCall, CP_INITIAL);

/* It is Highly Recommended to bring down the Primary Link LAST !! */
    if (IsPrimaryLink(lpCall, &lpCall->link[0]))
    {
        nppp_release_link(lpCall, &lpCall->link[1]);
        nppp_release_link(lpCall, &lpCall->link[0]);
    }
    else
    {
        nppp_release_link(lpCall, &lpCall->link[0]);
        nppp_release_link(lpCall, &lpCall->link[1]);
    }
}

/*
 *    appp_send_pkt - Transmit a frame.
 */
int
appp_send_pkt(PCALLINFO lpCall, GCAPACKET *p_pkt, u16 pid)
{
```

```
APPP_CB_t        *p_acb = &(lpCall->appp);      /*    APPP CB    */
int              adjust_fwd;
u8               *p_byte;
S_PPPHDR         *p_ppphdr;

/* adjust the prim buffer pkt offset */
/* (put in the PPP header) */
PUT_DATA_OFF(p_pkt, (GET_DATA_OFF(p_pkt) - PPP_HDRLEN));

p_ppphdr = (S_PPPHDR *) GET_DATA_PTR(p_pkt);

p_ppphdr->addr = HDLC_ALL_ADDR;
p_ppphdr->control = HDLC_UI;
p_ppphdr->pid = swap16(pid);

p_pkt->uLength += PPP_HDRLEN;

/* now handle AC and/or Proto Compress */
if (pid != PPP_LCP_PID)
{
    adjust_fwd = 0;

/* if AC comp, bump up the ptrs and decrement the ctrs */
    if (p_acb->tx_ac_comp)
        adjust_fwd += 2;

/* if PROTO comp, bump up the ptrs and decrement the ctrs */
    if ((p_acb->tx_proto_comp) && ((pid & 0xff00) == 0))
        adjust_fwd++;

switch(adjust_fwd)
    {
    case 1:         /* Protocol Compression */
        /* adjust the prim buffer pkt offset */
        /* (take out the AC fields) */
        PUT_DATA_OFF(p_pkt, (GET_DATA_OFF(p_pkt) + 1));

p_pkt->uLength -= 1;

/* move Addr/Ctrl up */
        p_byte = (u8 *)GET_DATA_PTR(p_pkt);
        *p_byte = HDLC_ALL_ADDR;
        p_byte++;
        *p_byte = HDLC_UI;
        break;
    case 2:         /* AC Compression */
        /* adjust the prim buffer pkt offset */
        /* (take out the AC fields) */
        PUT_DATA_OFF(p_pkt, (GET_DATA_OFF(p_pkt) + 2));

p_pkt->uLength -= 2;
        break;
    case 3:         /* AC and Protocol Compression */
        /* adjust the prim buffer pkt offset */
        /* (take out the AC fields) */
        PUT_DATA_OFF(p_pkt, (GET_DATA_OFF(p_pkt) + 3));

p_pkt->uLength -= 3;
        break;
    }
}

/*
** Now we have the pkt fully encapsulated, ship it
*/

/* bump stats */
p_acb->tx_packets++;
p_acb->tx_bytes += p_pkt->uLength;

/* Enqueue the frame to the rx (App) data queue */
L4_PlacePacketOnRing(lpCall, (void *)GET_DATA_PTR(p_pkt),
    p_pkt->uLength);
PPP_rls_pkt(p_pkt, 2);
```

```
    return 0;
}

/*
 *    appp_rx_frame - Receive a frame from a link
 */
void
appp_rx_frame(PCALLINFO lpCall, GCAPACKET *p_frame)
{
    APPP_CB_t        *p_acb = &(lpCall->appp);      /*    APPP CB       */
    S_PPPHDR         *p_ppphdr;
    u8               *p_byte;
    int              adjust_back;

p_ppphdr = (S_PPPHDR *)(GET_DATA_PTR(p_frame));

/* bump stats */
    p_acb->rx_bytes += p_frame->uLength;
    p_acb->rx_packets++;

/* if necessary, rebuild the received pkt PPP header.  Influencing */
    /* parameters can be AC_Compression and Protocol_Compression. */
    p_byte = (u8 *)p_ppphdr;
    adjust_back = 0;

/* adjust for AC Compression */
    if ((*p_byte == HDLC_ALL_ADDR) && (*(p_byte+1) == HDLC_UI))
        p_byte += 2;        /* bump past the addr/ctrl fields */
    else
        adjust_back += 2;

/* adjust for Proto Compression */
    if (*p_byte & 1)
        adjust_back++;

PUT_DATA_OFF(p_frame, (GET_DATA_OFF(p_frame) - adjust_back));
    p_frame->uLength += adjust_back;

p_byte = (u8 *)p_ppphdr;
    p_ppphdr = (S_PPPHDR *)(p_byte - adjust_back);

/* at this point, we know how far back to go, so do it.... */
    switch (adjust_back)
    {
    case 2:         /* AC Compression */
        p_ppphdr->addr = HDLC_ALL_ADDR;
        p_ppphdr->control = HDLC_UI;
        break;
    case 1:         /* Protocol Compression */
    case 3:         /* AC and Protocol Compression */
        p_ppphdr->addr = HDLC_ALL_ADDR;
        p_ppphdr->control = HDLC_UI;
        p_byte = (u8 *)&p_ppphdr->pid;
        *p_byte = 0;
        break;
    }

/* Now we have a PPP packet.  Make sure: */
    /*      1) packet is not too short       */
    /*      2) make sure that ADDR=0xff      */
    /*      3) make sure that CTRL=3         */
    /*      4) make sure that PROT is odd    */
    if ((p_frame->uLength <= PPP_HDRLEN) ||
        (p_ppphdr->addr != HDLC_ALL_ADDR) ||
        (p_ppphdr->control != HDLC_UI) ||
        ((swap16(p_ppphdr->pid) & 1) == 0))
    {
        ppp_rls_pkt(p_frame, 0);
        return;
    } appp_rx_pkt(lpCall, p_frame);
}
```

```c
/*
 *   appp_rx_pkt - Process a received packet
 */
void
appp_rx_pkt(PCALLINFO lpCall, GCAPACKET *p_pkt)
{
    APPP_CB_t       *p_acb = &(lpCall->appp);       /* APPP CB  */
    PPP_CB_t        *p_ncb = &(lpCall->ppp);        /* NPPP CB  */
    Link_CB_t       *p_link;
    S_CPCTL         *p_lacp = &lpCall->appp.a_cpctl[LCP_LAYER];
    S_CPCTL         *p_ipacp, *p_ipncp;
    S_CPCTL         *p_ipxacp, *p_ipxncp;
    S_CPCTL         *p_bracp, *p_brncp;
    S_CPCTL         *p_nbfacp, *p_nbfncp;
    S_PPPHDR        *p_ppphdr;
    GCAPACKET       *p_PR_pkt;
    u8              *p_from;
    u8              *p_to;
    u16             i;
    u16             pid;
    s16             numbytes;

p_link = GetPrimaryLink(lpCall);

p_ppphdr = (S_PPPHDR *)(GET_DATA_PTR(p_pkt));

/*
    ** Here we have a contiguous PPP pkt, process it as such.
    */ switch (swap16(p_ppphdr->pid))
    {
    case PPP_BR_PID:    /* Bridge Data Packet */
    case PPP_BPDU_PID:  /* BPDU */
        p_bracp = &lpCall->appp.a_cpctl[BRCP_LAYER];
        p_brncp = &p_link->a_cpctl[BRCP_LAYER];

pid = swap16(p_ppphdr->pid);

if (p_bracp->cpstate != CP_OPEN)
        {
            ppp_rls_pkt(p_pkt, 1);
            break;
        } if (p_brncp->cpstate != CP_OPEN)
        {
            ppp_rls_pkt(p_pkt, 1);
            break;
        }

/* Strip off the PPP header */
        PUT_DATA_OFF(p_pkt, (GET_DATA_OFF(p_pkt)+PPP_HDRLEN));
        p_pkt->uLength -= PPP_HDRLEN;

/* Pass it to NPPP and let him handle it (and release the buffer) */
        nppp_send_pkt(lpCall, NULL, p_pkt, pid);
        break;

case PPP_IP_PID:    /* IP Data Packet */
        p_ipacp = &lpCall->appp.a_cpctl[IPCP_LAYER];
        p_ipncp = &p_link->a_cpctl[IPCP_LAYER];

if (p_ipacp->cpstate != CP_OPEN)
        {
            ppp_rls_pkt(p_pkt, 3);
            break;
        } if (p_ipncp->cpstate != CP_OPEN)
        {
            ppp_rls_pkt(p_pkt, 3);
            break;
        }
```

```
    /* Strip off the PPP header */
    PUT_DATA_OFF(p_pkt, (GET_DATA_OFF(p_pkt)+PPP_HDRLEN));
    p_pkt->uLength -= PPP_HDRLEN;

/* Pass it to NPPP and let him handle it (and release the buffer) */
    nppp_send_pkt(lpCall, NULL, p_pkt, PPP_IP_PID);
    break;

case PPP_IPX_PID:      /* IPX Data Packet */
    p_ipxacp = &lpCall->appp.a_cpctl[IPXCP_LAYER];
    p_ipxncp = &p_link->a_cpctl[IPXCP_LAYER];

if (p_ipxacp->cpstate != CP_OPEN)
    {
        ppp_rls_pkt(p_pkt, 3);
        break;
    } if (p_ipxncp->cpstate != CP_OPEN)
    {
        ppp_rls_pkt(p_pkt, 3);
        break;
    }

/* Strip off the PPP header */
    PUT_DATA_OFF(p_pkt, (GET_DATA_OFF(p_pkt)+PPP_HDRLEN));
    p_pkt->uLength -= PPP_HDRLEN;

/* Pass it to NPPP and let him handle it (and release the buffer) */
    nppp_send_pkt(lpCall, NULL, p_pkt, PPP_IPX_PID);
    break;

case PPP_NBF_PID:      /* Netbios Data Packet */
    p_nbfacp = &lpCall->appp.a_cpctl[NBFCP_LAYER];
    p_nbfncp = &p_link->a_cpctl[NBFCP_LAYER];

if (p_nbfacp->cpstate != CP_OPEN)
    {
        ppp_rls_pkt(p_pkt, 1);
        break;
    } if (p_nbfncp->cpstate != CP_OPEN)
    {
        ppp_rls_pkt(p_pkt, 1);
        break;
    }

/* Strip off the PPP header */
    PUT_DATA_OFF(p_pkt, (GET_DATA_OFF(p_pkt)+PPP_HDRLEN));
    p_pkt->uLength -= PPP_HDRLEN;

/* Pass it to NPPP and let him handle it (and release the buffer) */
    nppp_send_pkt(lpCall, NULL, p_pkt, PPP_NBF_PID);
    break;

case PPP_LCP_PID:      /* Link Control Protocol */
    /* subtract PPP Header from packet length (total bytes in pkt) */
    p_pkt->uLength -= PPP_HDRLEN;

appp_proc(lpCall, LCP_LAYER, p_pkt);
    break;

case PPP_PAP_PID:      /* Password Authentication Protocol */
    if (p_lacp->cpstate != CP_OPEN)
    {
        ppp_rls_pkt(p_pkt, 7);
        break;
    }

/* subtract PPP Header from packet length (total bytes in pkt) */
    p_pkt->uLength -= PPP_HDRLEN;

appp_pap_proc(lpCall, PAP_LAYER, p_pkt);
```

```c
        break;
    case PPP_BRCP_PID:      /* Bridge Control Protocol */

/* do not act on this packet unless the App LCP is Open. */
        if (p_lacp->cpstate != CP_OPEN)
        {
            ppp_rls_pkt(p_pkt, 7);
            break;
        }

/* if we are not configured to support Bridging, but we get a */
        /* request from the App, set it. */
        if (!(p_acb->protocols & PPP_PROT_BR))
        {
            p_acb->protocols |= PPP_PROT_BR;
            p_ncb->protocols |= PPP_PROT_BR;
        }

/* Before we respond to this request, the stat of the combined */
        /* state machines must have advanced to the point that this NCP */
        /* is at least LISTENING. */
        if (p_acb->a_emstates[BRCP_LAYER] < EM_LISTENING)
        {
            ppp_rls_pkt(p_pkt, 7);
            break;
        }

/* subtract PPP Header from packet length (total bytes in pkt) */
        p_pkt->uLength -= PPP_HDRLEN;

appp_proc(lpCall, BRCP_LAYER, p_pkt);
        break;

case PPP_IPCP_PID:      /* IP Control Protocol */

/* do not act on this packet unless the App LCP is Open. */
        if (p_lacp->cpstate != CP_OPEN)
        {
            ppp_rls_pkt(p_pkt, 7);
            break;
        }

/* if we are not configured to support IP, but we get a */
        /* request from the App, set it. */
        if (!(p_acb->protocols & PPP_PROT_IP))
        {
            p_acb->protocols |= PPP_PROT_IP;
            p_ncb->protocols |= PPP_PROT_IP;
        }

/* Before we respond to this request, the stat of the combined */
        /* state machines must have advanced to the point that this NCP */
        /* is at least LISTENING. */
        if (p_acb->a_emstates[IPCP_LAYER] < EM_LISTENING)
        {
            ppp_rls_pkt(p_pkt, 7);
            break;
        }

/* subtract PPP Header from packet length (total bytes in pkt) */
        p_pkt->uLength -= PPP_HDRLEN;

appp_proc(lpCall, IPCP_LAYER, p_pkt);
        break;

case PPP_IPXCP_PID:     /* IPX Control Protocol */

/* do not act on this packet unless the App LCP is Open. */
        if (p_lacp->cpstate != CP_OPEN)
        {
            ppp_rls_pkt(p_pkt, 7);
            break;
        }
```

```c
        /* if we are not configured to support IPX, but we get a */
        /* request from the App, set it. */
        if (!(p_acb->protocols & PPP_PROT_IPX))
        {
            p_acb->protocols |= PPP_PROT_IPX;
            p_ncb->protocols |= PPP_PROT_IPX;
        }

/* Before we respond to this request, the stat of the combined */
        /* state machines must have advanced to the point that this NCP */
        /* is at least LISTENING. */
        if (p_acb->a_emstates[IPXCP_LAYER] < EM_LISTENING)
        {
            ppp_rls_pkt(p_pkt, 7);
            break;
        }

/* subtract PPP Header from packet length (total bytes in pkt) */
        p_pkt->uLength -= PPP_HDRLEN;

appp_proc(lpCall, IPXCP_LAYER, p_pkt);
        break;

case PPP_NBFCP_PID:      /* NetBios Control Protocol */

/* do not act on this packet unless the App LCP is Open. */
        if (p_lacp->cpstate != CP_OPEN)
        {
            ppp_rls_pkt(p_pkt, 7);
            break;
        }

/* if we are not configured to support NetBeui, but we get a */
        /* request from the App, set it. */
        if (!(p_acb->protocols & PPP_PROT_NBF))
        {
            p_acb->protocols |= PPP_PROT_NBF;
            p_ncb->protocols |= PPP_PROT_NBF;
        }

/* Before we respond to this request, the stat of the combined */
        /* state machines must have advanced to the point that this NCP */
        /* is at least LISTENING. */
        if (p_acb->a_emstates[NBFCP_LAYER] < EM_LISTENING)
        {
            ppp_rls_pkt(p_pkt, 7);
            break;
        }

/* subtract PPP Header from packet length (total bytes in pkt) */
        p_pkt->uLength -= PPP_HDRLEN;

appp_proc(lpCall, NBFCP_LAYER, p_pkt);
        break;

default:

rx_send_proto_rej:

/* only send back a PROTO_REJ if LCP is open */
        if (p_lacp->cpstate == CP_OPEN)
        {
            /* subtract PPP Header from packet length (total bytes in pkt) */
            p_pkt->uLength -= PPP_HDRLEN;

/* Get packet for the sending of a PROTOCOL REJECT to peer */
            if ((p_PR_pkt = ppp_get_pkt()) == NULL)
                break;

/* need to copy info field from RX pkt into PROTO_REJ pkt */
            /* make sure it doesn't exceed max negotiated length */
            p_from = ((u8 *)p_ppphdr) + PPP_HDRLEN;
            p_to = ((u8 *)GET_DATA_PTR(p_PR_pkt)) +
                    PPP_HDRLEN + CNF_HDRLEN;
```

```
            if (p_pkt->uLength < p_acb->rem_mru)
                numbytes = p_pkt->uLength;
            else
                numbytes = p_acb->rem_mru;

/* insert rejected-protocol after CNF_HDR */
            *p_to++ = (swap16(p_ppphdr->pid)) >> 8;
            *p_to++ = swap16(p_ppphdr->pid);
            p_PR_pkt->uLength += 2;

/* copy info field */
            for (i = 0; i < numbytes; i++)
                *p_to++ = *p_from++;
            p_PR_pkt->uLength += numbytes;

appp_sendreply(lpCall, LCP_LAYER, p_PR_pkt, PROTO_REJ, 0);
        } ppp_rls_pkt(p_pkt, 7);
        break;
    }
}

/*
 *  appp_get_pid_code - Determine PID code from NCP states and
 *                      packet type (from eft).
 */

PPP_get_pid_code_t
appp_get_pid_code(PCALLINFO lpCall, GCAPACKET *p_pkt, u16 *p_pid)
{
    APPP_CB_t        *p_acb = &(lpCall->appp);    /*   APPP CB    */
    Link_CB_t        *p_link;
    ETHER_HDR_TYPE   *p_ethhdr;

p_link = GetPrimaryLink(lpCall);

/* Check to see if it is an IP Packet */
    if (p_acb->protocols & PPP_PROT_IP)
    {
        p_ethhdr = (ETHER_HDR_TYPE *)(GET_DATA_PTR(p_pkt));

if ((p_ethhdr->e_type == U16_EFT_IP) ||
            (p_ethhdr->e_type == U16_EFT_ARP) ||
            (p_ethhdr->e_type == U16_EFT_RARP))
        {
            /* Is IPCP up? */
            if (p_link->a_cpctl[IPCP_LAYER].cpstate == CP_OPEN)
            {
                *p_pid = PPP_IP_PID;
                return(PPP_GET_PID_SEND);
            }
            else
            {
                /* if we are using ONLY IP, que the packet, */
                /* otherwise we must drop it because we don't */
                /* know which CP this IP pkt will eventually */
                /* go out (IPCP might get negotiated away from */
                /* the peer). */
                if ((p_acb->protocols & M_PPP_NCP_PROTS) == PPP_PROT_IP)
                {
                    /* we need to queue it until IPCP is up */
                    *p_pid = PPP_IP_PID;
                    return(PPP_GET_PID_QUEUE);
                }
                else
                {
                    /* drop it */
                    return(PPP_GET_PID_NULL);
                }
            }
        }
    }

/* Check to see if it is an IPX Packet */
```

```
if (p_acb->protocols & PPP_PROT_IPX)
{
    BOOL novell_pkt;

novell_pkt = FALSE;

p_ethhdr = (ETHER_HDR_TYPE *)(GET_DATA_PTR(p_pkt));

/* are we dealing with an Ethernet or 802.3 packet ? */
    if (swap16((u16)p_ethhdr->e_type) > 1500)
    {
        if ((p_ethhdr->e_type == U16_EFT_NOVELL) ||
            (p_ethhdr->e_type == U16_EFT_NOVELL2))
        {
            p_acb->ipx_framing = PPP_IPX_FRAME_ETHER_II;
            novell_pkt = TRUE;
        }
    }
    else
    {
        u16 *p_novell_id;
        SNAPHDR_P *p_snap;

p_novell_id = (u16 *)(p_ethhdr + 1);

/* check for 802.2 and 802.3 Novell pkt types */
        if (*p_novell_id == NOVELL_802_2)
        {
            p_acb->ipx_framing = PPP_IPX_FRAME_ETHER_802_2;
            novell_pkt = TRUE;
        }
        else if (*p_novell_id == NOVELL_802_3)
        {
            p_acb->ipx_framing = PPP_IPX_FRAME_ETHER_802_3;
            novell_pkt = TRUE;
        }
        /* check for SNAP Novell pkt types */
        else if (*p_novell_id == SNAP_SNAP)
        {
            p_snap = (SNAPHDR_P *) p_novell_id;

if ((p_snap->Type[0] == (EFT_NOVELL >> 8)) &&
                (p_snap->Type[1] == (EFT_NOVELL & 0xff)))
            {
                /****   ETHERNET SNAP (Use frame type field.)
                 ****   Destination Address |__|__|__|__|__|__|
                 ****        Source Address |__|__|__|__|__|__|
                 ****          Frame Length |__|__|
                 ****                  DSAP |AA|
                 ****                  SSAP |AA|
                 ****          Control Byte |03|
                 ****           Vendor Code |00|00|00|
                 ****            Frame Type |81|37|
                 ****/ p_acb->ipx_framing = PPP_IPX_FRAME_ETHER_SNAP;
                novell_pkt = TRUE;
            }
        }
    } if (novell_pkt)
    {
        /* Is IPXCP up? */
        if (p_link->a_cpctl[IPXCP_LAYER].cpstate == CP_OPEN)
        {
            *p_pid = PPP_IPX_PID;
            return(PPP_GET_PID_SEND);
        }
        else
        {
            /* if we are using ONLY IPX, que the packet, */
            /* otherwise we must drop it because we don't */
            /* know which CP this IPX pkt will eventually */
            /* go out (IPXCP might get negotiated away from */
```

```
                    /* the peer). */
                    if ((p_acb->protocols & M_PPP_NCP_PROTS) == PPP_PROT_IPX)
                    {
                        /* we need to queue it until IPCP is up */
                        *p_pid = PPP_IPX_PID;
                        return(PPP_GET_PID_QUEUE);
                    }
                    else
                    {
                        /* drop it */
                        return(PPP_GET_PID_NULL);
                    }
                }
            }
    }
    /* Check to see if it is an NBF Packet */
    if (p_acb->protocols & PPP_PROT_NBF)
    {
        u8 *p_sap;
        BOOL netbios_pkt;

netbios_pkt = FALSE;

p_ethhdr = (ETHER_HDR_TYPE *)(GET_DATA_PTR(p_pkt));
        p_sap = (u8 *)(p_ethhdr + 1);

if (*p_sap == SNAP_NETBIOS)
            netbios_pkt = TRUE;

if (netbios_pkt)
        {
            /* Is NBFCP up? */
            if (p_link->a_cpctl[NBFCP_LAYER].cpstate == CP_OPEN)
            {
                *p_pid = PPP_NBF_PID;
                return(PPP_GET_PID_SEND);
            }
            else
            {
                /* if we are using ONLY NetBios, que the packet, */
                /* otherwise we must drop it because we don't    */
                /* know which CP this NetBios pkt will eventually */
                /* go out (NBFCP might get negotiated away from  */
                /* the peer). */
                if ((p_acb->protocols & M_PPP_NCP_PROTS) == PPP_PROT_NBF)
                {
                    /* we need to queue it until NBFCP is up */
                    *p_pid = PPP_NBF_PID;
                    return(PPP_GET_PID_QUEUE);
                }
                else
                {
                    /* drop it */
                    return(PPP_GET_PID_NULL);
                }
            }
        }
    }
    /* Check to see if it is a BRIDGED Packet */
    if (p_acb->protocols & PPP_PROT_BR)
    {
        /* Is BRCP up? */
        if (p_link->a_cpctl[BRCP_LAYER].cpstate == CP_OPEN)
        {
            *p_pid = PPP_BR_PID;
            return(PPP_GET_PID_SEND);
        }
        else
        {
            /* if we are using ONLY BR, que the packet, */
            /* otherwise we must drop it because we don't */
            /* know which CP this BR pkt will eventually */
            /* go out (BRCP might get negotiated away from */
```

```
                /* the peer). */
                if ((p_acb->protocols & M_PPP_NCP_PROTS) == PPP_PROT_BR)
                {
                    /* we need to queue it until BRCP is up */
                    *p_pid = PPP_BR_PID;
                    return(PPP_GET_PID_QUEUE);
                }
                else
                {
                    /* drop it */
                    return(PPP_GET_PID_NULL);
                }
            }
        }
        else
        {
            /* No protocol specified, drop it */
            return(PPP_GET_PID_NULL);
        }
    }

/*
 *  appp_initcb -    Initialize the PPP control block
 */
void
appp_initcb(PCALLINFO lpCall)
{
    APPP_CB_t       *p_acb = &(lpCall->appp);      /*    APPP CB     */
    u16             idx;

p_acb->ipx_framing = PPP_IPX_FRAME_ETHER_II;

/* Return port to inited stage (this resets */
    /* ctl blk vars and kills outstanding timers). */
    appp_init_all_layers(lpCall, CP_INITIAL);

/* init the data control block associated with this PPP_cb */ p_acb->tx_packets = 0;
    p_acb->tx_bytes = 0;
    p_acb->rx_packets = 0;
    p_acb->rx_bytes = 0;
    p_acb->pppid = 0;
}

/*
 *  appp_cleanup_queues -  Stop all links for this connection
 */
void
appp_cleanup_queues(PCALLINFO lpCall)
{
    /* what remains is a stub.... eventually remove all calls to this func. */
}

/*
 *  appp_init_all_layers -- Initialize all layers for the specified port.
 */
void
appp_init_all_layers(PCALLINFO lpCall, CP_states_t cpstate)
{
    appp_reset(lpCall, LCP_LAYER, cpstate, TRUE);
    appp_reset(lpCall, PAP_LAYER, cpstate, TRUE);
    appp_reset(lpCall, CHAP_LAYER, cpstate, TRUE);
    appp_reset(lpCall, BRCP_LAYER, cpstate, TRUE);
    appp_reset(lpCall, IPCP_LAYER, cpstate, TRUE);
    appp_reset(lpCall, IPXCP_LAYER, cpstate, TRUE);
    appp_reset(lpCall, NBFCP_LAYER, cpstate, TRUE);

/* Even though we don't use this NCP at the app side, init it */
    /* to a down state. */
    appp_reset(lpCall, CCP_LAYER, cpstate, TRUE);
}
```

```
/*
 * appp_reset -- Reset the configuration options for initial request
 *         for the specified port.
 */
void
appp_reset(PCALLINFO lpCall, PPP_layer_t layer,
    CP_states_t cpstate, BOOL reset_emstate)
{
    APPP_CB_t   *p_acb = &(lpCall->appp);         /*   APPP CB   */
    S_CPCTL     *p_acp = &lpCall->appp.a_cpctl[layer];

p_acp->cpstate = cpstate;
    p_acp->ack_retry = 0;

if (p_acp->timer_id1.active)    /* Kill any existing CP timer */
        clr_appp_timer(lpCall, layer, PPP_TIMER1);

if (p_acp->timer_id2.active)    /* Kill any existing CP timer */
        clr_appp_timer(lpCall, layer, PPP_TIMER2);

if (reset_emstate)
    {
        /* initialize the emulation states for each NCP */
        p_acb->a_emstates[layer] = EM_INITIAL;
    } switch (layer)
    {
    case LCP_LAYER:
        /* Reset our config request params to our preferred values */
        p_acb->neg_mru = 1;     /* always try to negotiate MRU */ p_acb->tx_ac_comp = 0;
        p_acb->tx_proto_comp = 0;
        p_acb->rx_ac_comp = TRUE;
        p_acb->rx_proto_comp = TRUE;
        p_acb->send_endpt = 0;

/** DYN_CFG: We will fill this in as we learn it from Net **/
        p_acb->auth_flags = 0;
        p_acb->auth_compl_flags = 0;

/** DYN_CFG: We will fill this in as we learn them from App **/
        p_acb->protocols = 0;

p_acb->rem_mru = DEF_MRU;
        p_acb->lcl_mru = DEF_MRU;

p_acb->send_endpt = FALSE;
        break;

case CHAP_LAYER:
        break;

case PAP_LAYER:
        break;

case BRCP_LAYER:
        break;

case IPCP_LAYER:
        /* Set up for IP addr exchange */
        p_acb->neg_ip_addrs = 1;
        p_acb->peer_negotiated_ip_addr = FALSE;
        break;

case IPXCP_LAYER:
        /* Set up for IPX network and node number exchange; */
        p_acb->neg_ipx_network = 1;
        p_acb->neg_ipx_node = 0;
        p_acb->peer_negotiated_ipxnet_addr = FALSE;
        p_acb->peer_negotiated_ipxnode_addr = FALSE;
```

```
        /** DYN_CFG: We will fill this in as we learn them **/
        p_acb->my_ipx_network = 0;
        p_acb->peer_ipx_network = 0;
        memset(p_acb->my_ipx_node, 0, SZ_IPX_NODENUM);
        memset(p_acb->peer_ipx_node, 0, SZ_IPX_NODENUM);
        break;

case NBFCP_LAYER:
        p_acb->neg_name_proj = 1;
        p_acb->neg_peer_info = 1;
        p_acb->peer_negotiated_nbname = FALSE;

p_acb->nb_peer_name[0] = 0;
        memset(p_acb->nb_peer_clutter, 0, SZ_NBF_CLUTTER);
        break;
    }
}

/*
 *  appp_restart -- Reinitialize layer state machine for config exchange for
 *       the specified port.
 */ void
appp_restart(PCALLINFO lpCall, PPP_layer_t layer)
{
    APPP_CB_t    *p_acb = &(lpCall->appp);       /*  APPP CB   */
    S_CPCTL      *p_acp = &lpCall->appp.a_cpctl[layer];

/* Something went wrong; restart negotiations */
    switch (layer)
    {
    case LCP_LAYER:
        /* Reset CP state machine for configuration negotiation */
        appp_reset(lpCall, LCP_LAYER, CP_CLOSED, TRUE);
        appp_reset(lpCall, BRCP_LAYER, CP_CLOSED, TRUE);
        appp_reset(lpCall, IPCP_LAYER, CP_CLOSED, TRUE);
        appp_reset(lpCall, IPXCP_LAYER, CP_CLOSED, TRUE);
        appp_reset(lpCall, NBFCP_LAYER, CP_CLOSED, TRUE);

/* Even though we don't use this NCP at the app side, init it */
        /* to a down state. */
        appp_reset(lpCall, CCP_LAYER, CP_CLOSED, TRUE);
        break;
    case BRCP_LAYER:
        /* Reset CP state machine for configuration negotiation */
        appp_reset(lpCall, BRCP_LAYER, CP_CLOSED, TRUE);
        break;
    case IPCP_LAYER:
        /* Reset CP state machine for configuration negotiation */
        appp_reset(lpCall, IPCP_LAYER, CP_CLOSED, TRUE);
        break;
    case IPXCP_LAYER:
        /* Reset CP state machine for configuration negotiation */
        appp_reset(lpCall, IPXCP_LAYER, CP_CLOSED, TRUE);
        break;
    case NBFCP_LAYER:
        /* Reset CP state machine for configuration negotiation */
        appp_reset(lpCall, NBFCP_LAYER, CP_CLOSED, TRUE);
        break;
    }

/* Unexpected APPP Connection Down, Restarting Connection. */
}

/*
 *  appp_start -- Initialize layer state machine for config exchange for the
 *                 specified port.
 */ int
appp_start(PCALLINFO lpCall, PPP_layer_t layer, CP_states_t cpstate)
{
    APPP_CB_t    *p_acb = &(lpCall->appp);       /*  APPP CB   */
    PPP_CB_t     *p_ncb = &(lpCall->ppp);        /*  NPPP CB   */
```

```
    S_CPCTL          *p_acp = &lpCall->appp.a_cpctl[layer];

switch (layer)
    {
    case PAP_LAYER:
        if (p_acb->auth_flags & AF_PAP_AUTHENTICATOR)
        {
            /* Start timer against wait for reception of the PAP REQUEST */
            set_appp_timer((PPP_RESTART_TIMEOUT * PPP_MAX_CFG_COUNTER),
                lpCall, (u32)layer, PPP_TIMER2);
        }
        break;

default:
        if (p_acp->cpstate == CP_STOPPED)
        {
            /* Stopped; wait until remote attempts connect */
            /* fall thu to "return 0" */
        }
        else
        {
            if (layer == LCP_LAYER)
            {
                /* set auth flags according to what Net requested. */
                if (p_ncb->auth_flags)
                    p_acb->auth_flags = AF_PAP_AUTHENTICATOR;
            }

/* set new CP state */
            p_acp->cpstate = CP_REQ_SENT;

/* state should = CLOSED, begin CP configuration negotiation */
            return(appp_sendreq(lpCall, layer));
        }
        break;
    } return 0;
}
/*
 *   appp_open -- Transition to OPEN state.
 */
void
appp_open(PCALLINFO lpCall, PPP_layer_t layer)
{
    APPP_CB_t    *p_acb = &(lpCall->appp);       /*   APPP CB   */
    PPP_CB_t     *p_ncb = &lpCall->ppp;          /*  NPPP CB */
    BRI_ADAPTER  *p_adapter;
    Link_CB_t    *p_link;
    char         buf[80];

p_adapter = get_adapter((u16)lpCall->board_number);

switch (layer)
    {
    case LCP_LAYER:
        /* LCP is open; switch to next phase. */
        /* Startup __CP negotiations */
        /* If Authentication is required, start the appropriate CP */
        if (p_acb->auth_flags & AF_PAP_AUTHENTICATOR)
            appp_start(lpCall, PAP_LAYER, CP_CLOSED);
        else
        {
            /****
             * 1) No sense checking whether or not to start the Net AUTH
             *        since we would not be this far if the Net required AUTH
             *        but the App didn't.
             * 2) Launch the beginnings of (step 3), which will listen for
             *        which NCPs the App wants to start (NCP CFG_REQ).
             *        Hold tight until then.
             ****/ p_acb->a_emstates[BRCP_LAYER] = EM_LISTENING;
```

```
        p_acb->a_emstates[IPCP_LAYER] = EM_LISTENING;
        p_acb->a_emstates[IPXCP_LAYER] = EM_LISTENING;
        p_acb->a_emstates[NBFCP_LAYER] = EM_LISTENING;
        p_acb->a_emstates[CCP_LAYER] = EM_LISTENING;

/* Now we can start listening for CCP */
        p_ncb->protocols |= PPP_PROT_CCP;
    }
    break;
case PAP_LAYER:
    /* APPP - Authentication Complete. */

/****
     * Before the NCPs can come up, Authentication needs to OPEN
     *    on the Net side (if applicable).
     ****/ p_link = GetPrimaryLink(lpCall);

if (p_ncb->auth_flags & AF_CHAP_PEER)
    {
        nppp_start(lpCall, p_link, CHAP_LAYER, CP_CLOSED);
    }
    else if (p_ncb->auth_flags & AF_PAP_PEER)
    {
        nppp_start(lpCall, p_link, PAP_LAYER, CP_CLOSED);
    }
    else
    {
        /****
         * This scenario should not happen, but we must carry on....
         *    Launch the beginnings of (step 3), which will listen for
         *    which NCPs the App wants to start (NCP CFG_REQ).
         *    Hold tight until then.
         ****/ p_acb->a_emstates[BRCP_LAYER] = EM_LISTENING;
        p_acb->a_emstates[IPCP_LAYER] = EM_LISTENING;
        p_acb->a_emstates[IPXCP_LAYER] = EM_LISTENING;
        p_acb->a_emstates[NBFCP_LAYER] = EM_LISTENING;
        p_acb->a_emstates[CCP_LAYER] = EM_LISTENING;

/* Now we can start listening for CCP */
        p_ncb->protocols |= PPP_PROT_CCP;
    }
    break;
case BRCP_LAYER:
    /* APPP - Bridging Link UP. */

/****
     * (Step 6 - UP).
     * Now that the App NCP is up, unload all the data queues and go
     * into full service.
     ****/ p_acb->a_emstates[layer] = EM_APPCP_OPEN;

p_acb->ckt_state = PPP_STATE_NCP_UP;
    p_ncb->ckt_state = PPP_STATE_NCP_UP;

/* try to bring up the second channel */
    nppp_check_bw(lpCall);
    break;
case IPCP_LAYER:
    /* APPP - IP Link UP. */

/* set the learned IP address in the CallData structure */
    /* for reporting reasons. */
    lpCall->IscCallData.ipAddress = p_acb->peer_ip_addr;

/****
     * (Step 6 - UP).
     * Now that the App NCP is up, unload all the data queues and go
     * into full service.
     ****/
```

```
            p_acb->a_emstates[layer] = EM_APPCP_OPEN;

p_acb->ckt_state = PPP_STATE_NCP_UP;
            p_ncb->ckt_state = PPP_STATE_NCP_UP;

/* try to bring up the second channel */
            nppp_check_bw(lpCall);
            break;
        case IPXCP_LAYER:
            /* APPP - IPX Link UP. */

/****
             * (Step 6 - UP).
             * Now that the App NCP is up, unload all the data queues and go
             * into full service.
             ****/ p_acb->a_emstates[layer] = EM_APPCP_OPEN;

p_acb->ckt_state = PPP_STATE_NCP_UP;
            p_ncb->ckt_state = PPP_STATE_NCP_UP;

/* try to bring up the second channel */
            nppp_check_bw(lpCall);
            break;
        case NBFCP_LAYER:
            /* APPP - NetBEUI Link UP. */

/****
             * (Step 6 - UP).
             * Now that the App NCP is up, unload all the data queues and go
             * into full service.
             ****/ p_acb->a_emstates[layer] = EM_APPCP_OPEN;

p_acb->ckt_state = PPP_STATE_NCP_UP;
            p_ncb->ckt_state = PPP_STATE_NCP_UP;

/* try to bring up the second channel */
            nppp_check_bw(lpCall);
            break;
        }
}

/*
 *  appp_close -- Close the specified layers interface from the local side
 *                    for the specified port.
 */ int
appp_close(PCALLINFO lpCall, PPP_layer_t layer,
        CP_states_t cpstate, CP_states_t ul_cpstate)
{
    APPP_CB_t       *p_acb = &(lpCall->appp);       /*   APPP CB      */
    S_CPCTL         *p_acp = &(lpCall->appp.a_cpctl[layer]);
    GCAPACKET       *p_pkt;
    int             retcode = 0;

/* if Layer == LCP_LAYER, need to down upper layers */
    if (layer == LCP_LAYER)
    {
        appp_reset(lpCall, BRCP_LAYER, ul_cpstate, TRUE);
        appp_reset(lpCall, IPCP_LAYER, ul_cpstate, TRUE);
        appp_reset(lpCall, IPXCP_LAYER, ul_cpstate, TRUE);
        appp_reset(lpCall, NBFCP_LAYER, ul_cpstate, TRUE);
        appp_reset(lpCall, CCP_LAYER, ul_cpstate, TRUE);

if (p_acp->cpstate == CP_OPEN)
        {
            /* APPP Connection Down. */
        }
    }
```

```
/* state = INITIAL, STARTING, CLOSED, STOPPED */
if (p_acp->cpstate <= CP_STOPPING)
{
    /* in a state which doesn't allow TERM_REQ to be sent. */
    if (cpstate == CP_STOPPING)
        appp_reset(lpCall, layer, CP_STOPPED, TRUE);
    else
        appp_reset(lpCall, layer, CP_CLOSED, TRUE);
    return(-1);
}

/* ask remote host to shutdown */
p_acp->cpstate = cpstate;
p_acp->ack_retry = 0;

if (p_acp->timer_id1.active)
    clr_appp_timer(lpCall, layer, PPP_TIMER1);

if (p_acp->timer_id2.active)
    clr_appp_timer(lpCall, layer, PPP_TIMER2);

/* Set a timer against our request to shutdown */
set_appp_timer(PPP_RESTART_TIMEOUT, lpCall, (u32)layer, PPP_TIMER1);

/* Get packet for TERMINATE_REQ */
if ((p_pkt = ppp_get_pkt()) == NULL)
{
    if (cpstate == CP_STOPPING)
        appp_reset(lpCall, layer, CP_STOPPED, TRUE);
    else
        appp_reset(lpCall, layer, CP_CLOSED, TRUE);
    retcode = -1;
}
else
{
    if (appp_sendreply(lpCall, layer, p_pkt, TERMINATE_REQ, 0) != 0)
    {
        if (cpstate == CP_STOPPING)
            appp_reset(lpCall, layer, CP_STOPPED, TRUE);
        else
            appp_reset(lpCall, layer, CP_CLOSED, TRUE);
        retcode = -1;
    }
} return (retcode);
}

/*
 * appp_sendreq -- Build and send CFG_REQ packet.
 */
int
appp_sendreq(PCALLINFO lpCall, PPP_layer_t layer)
{
    APPP_CB_t     *p_acb = &(lpCall->appp);        /*   APPP CB   */
    S_CPCTL       *p_acp = &lpCall->appp.a_cpctl[layer];
    GCAPACKET     *p_pkt;
    u8            *p_cfgopts;

/* Get packet for configuration request */
    if ((p_pkt = ppp_get_pkt()) == NULL)
        return(-1);

p_cfgopts = ((u8 *)GET_DATA_PTR(p_pkt)) + PPP_HDRLEN + CNF_HDRLEN;

/* load config params into buf (return size of options */
    /* field) PPP_HDRLEN and CNF_HDRLEN will be added to */
    /* data_length as it as it gets closer to being shipped. */
    p_pkt->uLength = appp_makereq(lpCall, layer, p_cfgopts);

/* Start timer against wait for reply to our config request */
    set_appp_timer(PPP_RESTART_TIMEOUT, lpCall, (u32)layer, PPP_TIMER1);

/* Send CP configuration request to remote host */
```

```
    return(appp_sendreply(lpCall, layer, p_pkt, CONFIG_REQ, 0));
}
/*
 * appp_makereq -- Do actual build of CFG_REQ options field.
 */
int
appp_makereq(PCALLINFO lpCall, PPP_layer_t layer, u8 *p_opt_buf)
{
    APPP_CB_t          *p_acb = &(lpCall->appp);        /*   APPP CB    */
    PPP_CB_t           *p_ncb = &(lpCall->ppp);         /*   NPPP CB    */
    u8                 *cp = p_opt_buf;
    u8                 *p_len;
    s16                opt_cnt = 0;
    u16                nb_name_len;
    BRI_ADAPTER        *p_adapter;

p_adapter = get_adapter((u16)lpCall->board_number);

switch (layer)
    {
    case LCP_LAYER:
        /* Maximum Receive Unit */
        if (p_acb->neg_mru)
        {
            *cp++ = MAX_RCV_UNIT;
            *cp++ = 4;
            *cp++ = p_acb->lcl_mru >> 8;
            *cp++ = p_acb->lcl_mru & 0xff;
            opt_cnt += 4;
        }

/* AC Compression */
        if (p_acb->rx_ac_comp)
        {
            *cp++ = AC_COMPRESS;
            *cp++ = 2;
            opt_cnt += 2;
        }

/* Protocol Compression */
        if (p_acb->rx_proto_comp)
        {
            *cp++ = PROT_COMPRESS;
            *cp++ = 2;
            opt_cnt += 2;
        }

/* This is our mechanism for getting the App to give us his */
        /* username, password for NET PAP or CHAP. This will only   */
        /* get turned off if the App REJECTED our initial request   */
        /* for it (indicating that he has no username,password).    */
        if (p_acb->auth_flags & AF_PAP_AUTHENTICATOR)
        {
            *cp++ = AUTH_TYPE;
            *cp++ = 4;
            *cp++ = PPP_PAP_PID >> 8;
            *cp++ = PPP_PAP_PID & 0xff;
            opt_cnt += 4;
        }
        break;

case BRCP_LAYER:
        /* MAC Type */
        *cp++ = BR_MAC_TYPE;
        *cp++ = 3;

*cp++ = BRD_MAC_8023;
        opt_cnt += 3;
        break;

case IPCP_LAYER:
        /* Try to share IP_addr info with Peer ?? */
        if (p_acb->neg_ip_addrs && p_acb->peer_negotiated_ip_addr &&
```

```
            p_ncb->peer_negotiated_ip_addr)
    {
        *cp++ = IP_ADDRS_NEW;
        *cp++ = 6;

/* have to do this in chars or else fields get */
        /* overwritten when they align */
        *cp++ = (p_acb->my_ip_addr >> 24);
        *cp++ = (p_acb->my_ip_addr >> 16);
        *cp++ = (p_acb->my_ip_addr >> 8);
        *cp++ = p_acb->my_ip_addr;
        opt_cnt += 6;
    }
    break;

case IPXCP_LAYER:
    /* Try to share Net IPX_Net_addr info with Peer ?? */
    if (p_acb->neg_ipx_network && p_acb->peer_negotiated_ipxnet_addr &&
        p_ncb->peer_negotiated_ipxnet_addr)
    {
        *cp++ = IPX_NET_NUM;
        *cp++ = 6;

/* have to do this in chars or else fields get */
        /* overwritten when they align */
        *cp++ = (p_acb->my_ipx_network >> 24);
        *cp++ = (p_acb->my_ipx_network >> 16);
        *cp++ = (p_acb->my_ipx_network >> 8);
        *cp++ = p_acb->my_ipx_network;
        opt_cnt += 6;
    }

/* Try to share Net IPX_Node_addr info with Peer ?? */
    if (p_acb->neg_ipx_node && p_acb->peer_negotiated_ipxnode_addr &&
        p_ncb->peer_negotiated_ipxnode_addr)
    {
        *cp++ = IPX_NODE_NUM;
        *cp++ = 8;

memcpy((u8 *)cp, p_acb->my_ipx_node, SZ_IPX_NODENUM);
        opt_cnt += 8;
    }
    break;

case NBFCP_LAYER:
    if (p_acb->neg_name_proj)
    {
        /* project 0 NetBios names to remote peer */
        *cp++ = NBF_NAME_PROJ;
        *cp++ = 2;
        opt_cnt += 2;
    }

/* Try to share Net NBF Name info with Peer ?? */
    if (p_acb->neg_peer_info && p_ncb->peer_negotiated_nbname)
    {
        *cp++ = NBF_PEER_INFO;
        p_len = cp;                    /* remember where the length is */
        *cp++ = 8;

memcpy(cp, p_ncb->nb_peer_clutter, SZ_NBF_CLUTTER);
        cp += SZ_NBF_CLUTTER;
        opt_cnt += 8;

nb_name_len = strlen(p_ncb->nb_peer_name);

if (nb_name_len)
        {
            strcpy(cp, p_ncb->nb_peer_name);
            cp += nb_name_len;
            *cp++ = 0;            /* NULL term the string and include in count */
            *p_len = *p_len + nb_name_len + 1;
            opt_cnt += nb_name_len + 1;
        }
    }
```

```
        break;
    } return(opt_cnt);
}

/*
 *  appp_sendpapresp -- Build and send PAP AUTH_ACK/NAK packet.
 */ int
appp_sendpapresp(PCALLINFO lpCall, u8 code, u8 id)
{
    APPP_CB_t       *p_acb = &(lpCall->appp);      /*    APPP CB    */
    GCAPACKET       *p_pkt;
    u8              *p_cfgopts;

/* Get packet for PAP AUTH_ACK/NAK */
    if ((p_pkt = ppp_get_pkt()) == NULL)
        return(-1);

p_cfgopts = ((u8 *)GET_DATA_PTR(p_pkt)) + PPP_HDRLEN + CNF_HDRLEN;

/* Indicate that there is no message to be sent back. */
    *p_cfgopts++ = 0;

/* The msg len (set to 0) needs to be reflected in the pkt size */
    p_pkt->uLength = 1;

/* Send PAP AUTH_ACK/NAK to authenticator */
    return(appp_sendreply(lpCall, PAP_LAYER, p_pkt, code, id));
}

/*
 *  appp_sendreply -- Send a PPP Control packet to the peer
 */ int
appp_sendreply(PCALLINFO lpCall, PPP_layer_t layer,
        GCAPACKET *p_pkt, u8 code, u8 id)
{
    APPP_CB_t       *p_acb = &(lpCall->appp);      /*    APPP CB    */
    S_CPCTL         *p_acp = &lpCall->appp.a_cpctl[layer];
    S_CNFHDR        *p_cnfhdr;
    u32             *p_magicnum;
    u32             pid;

p_cnfhdr = (S_CNFHDR *)(((u8 *)GET_DATA_PTR(p_pkt)) + PPP_HDRLEN);
    p_magicnum = (u32 *)(((u8 *)p_cnfhdr) + CNF_HDRLEN);

/* Load CP header values */
    p_cnfhdr->code = code;

switch(code)
    {
    case CONFIG_REQ:    /* AKA: CHAP_CHALLENGE & PAP_REQUEST */
    case TERMINATE_REQ:
        /* Save ID field for match against replies from remote host */
        p_acp->lastid = p_acb->pppid;
        p_cnfhdr->id = p_acb->pppid++;
        break;
    case ECHO_REQ:
        if (layer != LCP_LAYER)
            goto reply_default;

/* Save ID field for match against replies from remote host */
        p_acp->lastid = p_acb->pppid;
        p_cnfhdr->id = p_acb->pppid++;
        *p_magicnum = 0;        /* no need to swap32(0) */;
        p_pkt->uLength += sizeof(u32); /* add magicnum to pktlen */
        break;
    case PROTO_REJ:
        if (layer != LCP_LAYER)
            goto reply_default;
        p_cnfhdr->id = p_acb->pppid++;
```

```
        break;
    case DISCARD_REQ:
        p_cnfhdr->id = p_acb->pppid++;
        break;
    case CONFIG_ACK:    /* AKA: CHAP_RESPONSE & PAP_ACK */
    case CONFIG_NAK:    /* AKA: CHAP_SUCCESS & PAP_NAK */
    case CONFIG_REJ:    /* AKA: CHAP_FAILURE */
    case TERMINATE_ACK:
    case CODE_REJ:
        p_cnfhdr->id = id;
        break;
    case ECHO_REPLY:
        if (layer != LCP_LAYER)
            goto reply_default;

p_cnfhdr->id = id;
        *p_magicnum = 0;          /* no need to swap32(0) */;
        p_pkt->uLength += sizeof(u32); /* add magicnum to pktlen */
        break;
    default:
reply_default:
        /* Shouldn't happen */
        ppp_rls_pkt(p_pkt, 13);
        return(-1);
    } if (layer == LCP_LAYER)
        pid = PPP_LCP_PID;
    else if (layer == PAP_LAYER)
        pid = PPP_PAP_PID;
    else if (layer == BRCP_LAYER)
        pid = PPP_BRCP_PID;
    else if (layer == IPCP_LAYER)
        pid = PPP_IPCP_PID;
    else if (layer == IPXCP_LAYER)
        pid = PPP_IPXCP_PID;
    else if (layer == NBFCP_LAYER)
        pid = PPP_NBFCP_PID;
    else    /* must be unsupported protocol */
    {
        ppp_rls_pkt(p_pkt, 14);
        return(-1);
    }

/* framesize = length of options field */
    p_cnfhdr->len = swap16((u16)(CNF_HDRLEN + p_pkt->uLength));

/* update buffer Frame Size (total bytes in pkt) */
    p_pkt->uLength += CNF_HDRLEN;

/* Adjust the packet offsets so that they are aligned with */
    /* all the other methods of getting a packet to appp_send_pkt. */
    /* Specifically, set the app_data_ptr to start of CNFHDR */
    PUT_DATA_OFF(p_pkt, (GET_DATA_OFF(p_pkt)+PPP_HDRLEN));

return(appp_send_pkt(lpCall, p_pkt, (u16)pid));
}
```

```
/*
 *   appp_sendtermack -- Send a TERMINATE ACK to the peer
 */ void
appp_sendtermack(PCALLINFO lpCall, PPP_layer_t layer, CP_states_t cpstate)
{
    APPP_CB_t        *p_acb = &(lpCall->appp);          /*   APPP CB   */
    S_CPCTL          *p_acp = &lpCall->appp.a_cpctl[layer];
    GCAPACKET        *p_tx_pkt;

/* Get packet for terminate ack */
    if ((p_tx_pkt = ppp_get_pkt()) != NULL)
    {
        /* try to send out TERMINATE_ACK pkt */
        appp_sendreply(lpCall, layer, p_tx_pkt, TERMINATE_ACK, 0);
    } p_acp->cpstate = cpstate;
    return;
}

/*
 *   appp_sendcoderej -- Send a CODE REJECT to the peer
 */ void
appp_sendcoderej(PCALLINFO lpCall, PPP_layer_t layer,
    GCAPACKET *p_pkt, CP_states_t cpstate)
{
    APPP_CB_t        *p_acb = &(lpCall->appp);          /*   APPP CB   */
    S_CPCTL          *p_acp = &lpCall->appp.a_cpctl[layer];
    S_PPPHDR         *p_ppphdr;
    GCAPACKET        *p_CR_pkt;
    u8               *p_from;
    u8               *p_to;
    u32              i;
    s32              numbytes;

p_ppphdr = (S_PPPHDR *)(GET_DATA_PTR(p_pkt));

/* Get packet for code reject */
    if ((p_CR_pkt = ppp_get_pkt()) != NULL)
    {
        /* need to copy info field from RX pkt into PROTO_REJ pkt */
        /* make sure it doesn't exceed max negotiated length */
        p_from = (((u8 *)p_ppphdr) + PPP_HDRLEN);
        p_to   = (((u8 *)GET_DATA_PTR(p_CR_pkt)) +
                   PPP_HDRLEN + CNF_HDRLEN);

if (p_pkt->uLength < p_acb->rem_mru)
            numbytes = p_pkt->uLength;
        else
            numbytes = p_acb->rem_mru;

/* insert rejected-protocol after CNF_HDR */
        *p_to++ = p_ppphdr->pid >> 8;
        *p_to++ = p_ppphdr->pid & 0xff;
        p_CR_pkt->uLength += 2;

/* copy info field */
        for (i = 0; i < numbytes; i++)
            *p_to++ = *p_from;
        p_CR_pkt->uLength += numbytes;

appp_sendreply(lpCall, layer, p_CR_pkt, CODE_REJ, 0);
    } p_acp->cpstate = cpstate;
    return;
}

/*
```

```
*   appp_timeout -- Timeout while waiting for reply from peer.
*/ void
appp_timeout(PCALLINFO lpCall, PPP_layer_t layer, u32 timer_idx)
{
    APPP_CB_t       *p_acb = &(lpCall->appp);           /*    APPP CB    */
    S_CPCTL         *p_acp = &lpCall->appp.a_cpctl[layer];
    GCAPACKET       *p_tx_pkt;

/* Attempt to get things going again */
    switch(p_acp->cpstate)
    {
    case CP_INITIAL:    /* Unexpected event */
    case CP_STARTING:
    case CP_CLOSED:
    case CP_STOPPED:
    case CP_OPEN:
        break;

case CP_CLOSING:
        /* Timeout waiting for terminate ACK; send another request */
        if (++p_acp->ack_retry > PPP_MAX_TERM_COUNTER)
        {
            /* No response to our request; give it up */
            appp_reset(lpCall, layer, CP_CLOSED, TRUE);
        }
        else
        {
            /* Request remote host to close data link */
            set_appp_timer(PPP_RESTART_TIMEOUT,
                lpCall, (u32)layer, PPP_TIMER1);

/* Get packet for Terminate Request */
            if ((p_tx_pkt = ppp_get_pkt()) == NULL)
                appp_reset(lpCall, layer, CP_CLOSED, TRUE);
            else
            {
                /* try to send out another TERMINATE_REQ pkt */
                appp_sendreply(lpCall, layer, p_tx_pkt,
                    TERMINATE_REQ, 0);
            }
        }
        break;

case CP_STOPPING:
        /* Timeout waiting for terminate ACK; send another request */
        if (++p_acp->ack_retry > PPP_MAX_TERM_COUNTER)
        {
            /* No response to our request; give it up */
            appp_reset(lpCall, layer, CP_STOPPED, TRUE);
        }
        else
        {
            /* Request remote host to stop data link */
            set_appp_timer(PPP_RESTART_TIMEOUT,
                lpCall, (u32)layer, PPP_TIMER1);

/* Get packet for Terminate Request */
            if ((p_tx_pkt = ppp_get_pkt()) == NULL)
                appp_reset(lpCall, layer, CP_STOPPED, TRUE);
            else
            {
                /* try to send out another TERMINATE_REQ pkt */
                appp_sendreply(lpCall, layer, p_tx_pkt,
                    TERMINATE_REQ, 0);
            }
        }
        break;

case CP_REQ_SENT:
    case CP_ACK_RCVD:
    case CP_ACK_SENT:
        /* Timeout waiting for ACK to our request, */
        /* or timeout waiting for request from remote host */
```

```
        if (++p_acp->ack_retry > PPP_MAX_CFG_COUNTER)
        {
            /* Connection Establish Timeout, PPP Connection down. */

/* terminate connection */
            em_ppp_release_conn(lpCall);
        }
        else
        {
            /* Try to get things going by sending new request */
            appp_sendreq(lpCall, layer);

if (p_acp->cpstate != CP_ACK_SENT)
                p_acp->cpstate = CP_REQ_SENT;
        }
        break;

default:
        /* ignore */
        break;
    } return;
}

/*
 *  appp_auth_timeout -- Timeout while waiting for Authentication.
 */
void
appp_auth_timeout(PCALLINFO lpCall, PPP_layer_t layer, u32 timer_idx)
{
    APPP_CB_t       *p_acb = &(lpCall->appp);          /*  APPP CB   */
    S_CPCTL         *p_acp = &lpCall->appp.a_cpctl[layer];

/* Attempt to get things going again */
    if (layer == PAP_LAYER)
    {
        /* if Auth Request timer has gone off blow off the connection */
        if (timer_idx == PPP_TIMER2)
        {
            /* Peer has not requested Auth, PPP Connection down. */

/* terminate connection */
            em_ppp_release_conn(lpCall);
        }
    }
}

/*
 *  appp_proc -- Process the incoming CP packet
 */
void
appp_proc(PCALLINFO lpCall, PPP_layer_t layer, GCAPACKET *p_pkt)
{
    APPP_CB_t       *p_acb = &(lpCall->appp);          /*  APPP CB   */
    S_CNFHDR        *p_cnfhdr;
    GCAPACKET       *p_tx_pkt;

p_cnfhdr = (S_CNFHDR *)(((u8 *)GET_DATA_PTR(p_pkt)) + PPP_HDRLEN);

/* Process CP packet data */
    switch(p_cnfhdr->code)
    {
    case CONFIG_REQ:              /* Request of remote host */
        appp_rcvreq(lpCall, layer, p_pkt);
        break;
    case CONFIG_ACK:              /* Remote accepted our req */
        appp_rcvack(lpCall, layer, p_pkt);
        break;
    case CONFIG_NAK:              /* Remote adjusted our req */
        appp_rcvnak(lpCall, layer, p_pkt);
        break;
    case CONFIG_REJ:              /* Remote rejected our req */
```

```
        appp_rcvrej(lpCall, layer, p_pkt);
        break;
    case TERMINATE_REQ:            /* Remote request to close */
        appp_rcvtermreq(lpCall, layer);
        break;
    case TERMINATE_ACK:            /* Remote closed on request */
        appp_rcvtermack(lpCall, layer);
        break;
    case CODE_REJ:
        appp_rcvcoderej(lpCall, layer, p_pkt);
        break;
    case PROTO_REJ:
        appp_rcvprotorej(lpCall, layer, p_pkt);
        break;
    case ECHO_REQ:
        if (layer == LCP_LAYER)
        {
            /* Get packet for configuration request */
            if ((p_tx_pkt = ppp_get_pkt()) != NULL)
            {
                /* try to send out ECHO_REPLY pkt */
                appp_sendreply(lpCall, LCP_LAYER, p_tx_pkt, ECHO_REPLY,
                    p_cnfhdr->id);
            }
        }
        break;
    case ECHO_REPLY:
        break;
    case DISCARD_REQ:
        /* As per the RFC, Simply drop this pkt */
        break;
    default:
        appp_rcvunknown(lpCall, layer, p_pkt);
        break;
    } ppp_rls_pkt(p_pkt, 15);
    return;
}
/*
 *  appp_pap_proc -- Process the incoming PAP packet
 */ void
appp_pap_proc(PCALLINFO lpCall, PPP_layer_t layer, GCAPACKET *p_pkt)
{
    APPP_CB_t       *p_acb = &(lpCall->appp);        /*    APPP CB    */
    S_CPCTL         *p_acp = &lpCall->appp.a_cpctl[layer];
    S_CNFHDR        *p_cnfhdr;
    u8              *p_cfgopts;
    u8              *p_buf;
    int             i, len;
    u8              appp_pwd[MAXSLPASSWDSIZE];
    u8              buf[80];

p_cnfhdr = (S_CNFHDR *)(((u8 *)GET_DATA_PTR(p_pkt)) + PPP_HDRLEN);
    p_cfgopts = (((u8 *)p_cnfhdr) + CNF_HDRLEN);

/* Process PAP packet data */
    switch(p_cnfhdr->code)
    {
    case PAP_REQUEST :          /* Request Message */
        if (p_acb->auth_flags & AF_PAP_AUTHENTICATOR)
        {
            /* Stop timer against wait for valid PAP REQ */
            if (p_acp->timer_id2.active)
                clr_appp_timer(lpCall, layer, PPP_TIMER2);

/* get length of APP username */
            len = *p_cfgopts++;

/* is the username too long ? */
            if (len > (MAXSLUSERNAMESIZE-1))
                goto pap_proc_txnak;
```

```
            /*** Nab the App Username ***/
            for (i = 0; i < len; i++)
                lpCall->IscCallData.username[i] = *p_cfgopts++;

lpCall->IscCallData.username[i] = 0;

/* get length of APP password */
            len = *p_cfgopts++;

/* is the password too long ? */
            if (len > (MAXSLPASSWDSIZE-1))
            {
pap_proc_txnak:
                /* APPP Auth Failed, PAP Mismatch. PPP Connection down. */ appp_sendpapresp(lpCall, PAP_NAK, p_cnfhdr->id);

/* terminate connection */
                em_ppp_release_conn(lpCall);
                break;
            }

/*** Nab the App Username ***/
            for (i = 0; i < len; i++)
                lpCall->IscCallData.password[i] = *p_cfgopts++;

lpCall->IscCallData.password[i] = 0;

p_acb->auth_compl_flags |= AF_PAP_AUTH_APPROVED;

appp_sendpapresp(lpCall, PAP_ACK, p_cnfhdr->id);

/* are we all the way up ? */
            if (p_acb->auth_flags == p_acb->auth_compl_flags)
            {
                p_acb->auth_flags      |= AF_COMPLETED;
                p_acb->auth_compl_flags |= AF_COMPLETED;

p_acp->cpstate = CP_OPEN;

/* all authentication complete */
                appp_open(lpCall, layer);
            }
        }
        break;
    default:
        /* Bogus pkt, ignore it. */
        break;
    } ppp_rls_pkt(p_pkt, 17);
    return;
}

/*
 * appp_rcvreq -- Process the received CFG_REQ from the peer.
 */
void
appp_rcvreq(PCALLINFO lpCall, PPP_layer_t layer, GCAPACKET *p_pkt)
{
    APPP_CB_t    *p_acb = &(lpCall->appp);       /*  APPP CB   */
    S_CPCTL      *p_acp = &lpCall->appp.a_cpctl[layer];
    Link_CB_t    *p_link;

switch(p_acp->cpstate)
    {
    case CP_INITIAL:   /* Unexpected event */
        if ((layer != CCP_LAYER) && (p_acb->a_emstates[layer] == EM_LISTENING))
        {
            /****
             * [Step 4].
             * For the NCPs, we are awaiting the CFG_REQ from the App side
             * to fire up the Net side. Make sure the Net side supports
```

```
         * this NCP before responding to the App.
         ****/ appp_learnfromreq(lpCall, layer, p_pkt);
            p_acb->a_emstates[layer] = EM_NETCP_STARTED;
            p_link = GetPrimaryLink(lpCall);
            nppp_start(lpCall, p_link, layer, CP_CLOSED);
            }
            break;

case CP_STARTING:    /* Unexpected event */
            break;

case CP_CLOSED:
            appp_sendtermack(lpCall, layer, CP_CLOSED);
            break;

case CP_STOPPED:
            /* Send our configuration request */
            appp_sendreq(lpCall, layer);
            /* Evaluate configuration request from remote host */
            appp_chkreq(lpCall, layer, p_pkt, CP_ACK_SENT, CP_REQ_SENT);
            break;

case CP_CLOSING:
            /* We are attempting to close connection; wait */
            /* for timeout to resend a Terminate Request   */
            break;

case CP_STOPPING:
            /* We are attempting to stop connection; wait */
            /* for timeout to resend a Terminate Request  */
            break;

case CP_REQ_SENT:
        case CP_ACK_SENT:
            /* Evaluate configuration request from remote host */
            appp_chkreq(lpCall, layer, p_pkt, CP_ACK_SENT, CP_REQ_SENT);
            break;

case CP_ACK_RCVD:
            /* Stop timer against wait for config request */
            if (p_acp->timer_idl.active)
                clr_appp_timer(lpCall, layer, PPP_TIMER1);

/* Evaluate configuration request from remote host */
            appp_chkreq(lpCall, layer, p_pkt, CP_OPEN, CP_ACK_RCVD);
            break;

case CP_OPEN:    /* Unexpected event */
            /* Something went wrong; restart negotiations */
            appp_restart(lpCall, layer);

/* Send our configuration request */
            appp_sendreq(lpCall, layer);

/* Evaluate configuration request from remote host */
            appp_chkreq(lpCall, layer, p_pkt, CP_ACK_SENT, CP_REQ_SENT);
            break;

default:
            /* ignore */
            break;
        } return;
    }

/*
 *  appp_chkreq -- Check link control options requested by the peer.
 */ void
appp_chkreq(PCALLINFO lpCall, PPP_layer_t layer,
    GCAPACKET *p_pkt, u16 ack_cpstate, u16 nak_cpstate)
```

```c
{
APPP_CB_t       *p_acb = &(lpCall->appp);         /*    APPP CB     */
S_CPCTL         *p_acp = &(lpCall->appp.a_cpctl[layer]);
S_CNFHDR        *p_cnfhdr;
S_OPTHDR        *p_opthdr;
u8              *p_optdata;
GCAPACKET       *p_ACK_pkt;
u8              *p_ACK_buf;
s16             i,ilen;
s16             alloptslen;
s16             optdatalen;
s8              opt_accept;                       /* Per option reply */
s8              cnf_accept = CONFIG_ACK;          /* Overall reply to req */
s16             minoptlen;

p_cnfhdr = (S_CNFHDR *)(((u8 *)GET_DATA_PTR(p_pkt)) + PPP_HDRLEN);
p_opthdr = (S_OPTHDR *)(((u8 *)p_cnfhdr) + CNF_HDRLEN);

/* Get CFG_ACK packet */
if ((p_ACK_pkt = ppp_get_pkt()) == NULL)
    return;

/* Set ptr to CFG_ACK buffers option field */
p_ACK_buf = ((u8 *)GET_DATA_PTR(p_ACK_pkt)) + PPP_HDRLEN + CNF_HDRLEN;

/* Make sure length in CP config header is realistic */
if (p_pkt->uLength < (DWORD)swap16(p_cnfhdr->len))
    p_cnfhdr->len = swap16((u16)p_pkt->uLength);

alloptslen = swap16(p_cnfhdr->len) - CNF_HDRLEN;

if (layer == CCP_LAYER)
    minoptlen = 5;
else if (layer == IPCP_LAYER)
    minoptlen = 4;
else
    minoptlen = 2;

/* Process options requested by remote host */
for (; alloptslen >= minoptlen; alloptslen -= p_opthdr->len,
 p_opthdr = (S_OPTHDR *)((u8 *)p_opthdr + p_opthdr->len))
{
    optdatalen = p_opthdr->len - 2; /* Get curr opts data len */
                    /* Set ptr to option data */
    p_optdata = ((u8 *)p_opthdr) + 2;
    opt_accept = CONFIG_ACK;     /* Assume will accept option */ if (layer == LCP_LAYER)
    {
        u16 i16;

switch(p_opthdr->type)
        {
        case MAX_RCV_UNIT:
            /* Max Receive Unit is a 16bit field */
            ilen = 2;
            if (optdatalen < ilen)
            {
                /* Short option data; reject packet */
                opt_accept = CONFIG_REJ;
                break;
            }

/* Get proposed value from packet */
            i16 = (*p_optdata << 8) | *(p_optdata+1);

/* Check if new value is appropriate */
            if (i16 < MIN_MRU)
            {
                /* Too small, ask for minimum instead */
                opt_accept = CONFIG_NAK;
                *p_optdata = MIN_MRU >> 8;
                *(p_optdata + 1) = MIN_MRU & 0xff;
                i16 = MIN_MRU;
            }
```

```c
    else
    {
        /* Value is acceptable */
        opt_accept = CONFIG_ACK;
    } p_acb->rem_mru = i16;
    break;
case ASYNC_CTL_MAP:     /* Async Control Map */
    /* Async control map is a 32bit field */
    ilen = 4;
    if (optdatalen < ilen)
    {
        /* Short option data; reject packet */
        opt_accept = CONFIG_REJ;
        break;
    }

/* OTHERWISE, BLINDLY ACCEPT BECAUSE WE WILL NOT */
    /* DO ANY MAPPING, BUT WE NEED TO ack THEIR OPTION */
    /* REQUEST */
    opt_accept = CONFIG_ACK;
    break;
case AUTH_TYPE:
    /* Get proposed value from packet */
    i16 = (*p_optdata << 8) | *(p_optdata+1);

/* Check to see if CHAP or PAP is requested */
    if (i16 == PPP_CHAP_PID)
    {
        ilen = 3;
        /* blindly smack him down, we will not be an Auth Peer */
        opt_accept = CONFIG_REJ;
    }
    else if (i16 == PPP_PAP_PID)
    {
        ilen = 2;
        /* blindly smack him down, we will not be an Auth Peer */
        opt_accept = CONFIG_REJ;
    }
    else
    {
        /* THIS OPTION IS NOT NEGOTIABLE, REJECT */
        ilen = 0;
        opt_accept = CONFIG_REJ;
    }
    break;
case MAGIC_NUMBER:      /* Magic Number */
    /* Magic Number is a 32bit field */
    ilen = 4;
    if (optdatalen < ilen)
    {
        /* Short option data; reject packet */
        opt_accept = CONFIG_REJ;
        break;
    }

/* OTHERWISE, BLINDLY ACCEPT BECAUSE WE WILL NOT */
    /* DO ANY MAPPING, BUT WE NEED TO ack THEIR OPTION */
    /* REQUEST */
    opt_accept = CONFIG_ACK;
    break;
case PROT_COMPRESS:
    /* should be 0 opt data bytes left */
    ilen = optdatalen;
    if (ilen)
    {
        opt_accept = CONFIG_REJ;
    }
    else
    {
        p_acb->tx_proto_comp = TRUE;
        opt_accept = CONFIG_ACK;
    }
    break;
```

```
    case AC_COMPRESS:
        /* should be 0 opt data bytes left */
        ilen = optdatalen;
        if (ilen)
        {
            opt_accept = CONFIG_REJ;
        }
        else
        {
            p_acb->tx_ac_comp = TRUE;
            opt_accept = CONFIG_ACK;
        }
        break;
    case FCS_32:    /* 32-bit FCS not implemented */
    /*** THIS OPTION IS NOT NEGOTIABLE, REJECT ***/
        ilen = 0;
        opt_accept = CONFIG_REJ;
        break;
    case MPP_MRRU:    /* MPP MRRU */
        ilen = 2;
        opt_accept = CONFIG_REJ;
        break;
    case MPP_SHORTSEQNUM:    /* MPP Short Sequence Numbers */
    /* THIS OPTION IS NOT NEGOTIABLE, REJECT */
        ilen = 0;
        opt_accept = CONFIG_REJ;
        break;
    case MPP_ENDPOINT_ID:    /* MPP Endpoint ID */
    /*** Since we don't support MPP, reject it ***/
        ilen = optdatalen;
        opt_accept = CONFIG_REJ;
        break;

default:        /* Unknown option */
        opt_accept = CONFIG_REJ;

/* protect from bogus packet or buffer overrun */
        if ((p_opthdr->len <= 0) || (alloptslen < p_opthdr->len))
        {
            p_opthdr->len = alloptslen;
            ilen = alloptslen-2;
        }
        else
        {
            ilen = optdatalen;
        }
    break;
    }
}
else if (layer == IPCP_LAYER)
{
    u32 reqpeer_ip;

switch(p_opthdr->type)
    {
    case IP_ADDRS_NEW:        /* IP address */
        /* IP Addr is a 32bit field */
        ilen = 4;
        if (optdatalen < ilen)
        {
            /* Short option data; reject packet */
            opt_accept = CONFIG_REJ;
            break;
        }

/* Get proposed value from packet */
        reqpeer_ip = *p_optdata;
        reqpeer_ip = (reqpeer_ip << 8) | *(p_optdata + 1);
        reqpeer_ip = (reqpeer_ip << 8) | *(p_optdata + 2);
        reqpeer_ip = (reqpeer_ip << 8) | *(p_optdata + 3);

/* If the App side is requesting an IP Addr and the Net */
        /* side gave us one, relay it back to the App. */
        if (reqpeer_ip != p_acb->peer_ip_addr)
        {
```

```
                    opt_accept = CONFIG_NAK;
                    *p_optdata = (p_acb->peer_ip_addr >> 24);
                    *(p_optdata + 1) = (p_acb->peer_ip_addr >> 16);
                    *(p_optdata + 2) = (p_acb->peer_ip_addr >> 8);
                    *(p_optdata + 3) = (p_acb->peer_ip_addr & 0xff);
                }
                else
                {
                    /* Blindly accept because the Net side didn't */
                    /* engage in IP Addr negotiation (for whatever reason). */
                    opt_accept = CONFIG_ACK;
                }
                break;

case IP_COMPR_TYPE:    /* IP header compression */
                /* THIS OPTION IS NOT NEGOTIABLE, REJECT */
                ilen = 2;
                opt_accept = CONFIG_REJ;
                break;

default:        /* Unknown option */
                opt_accept = CONFIG_REJ;

/* protect from bogus packet or buffer overrun */
                if ((p_opthdr->len <= 0) || (alloptslen < p_opthdr->len))
                {
                    p_opthdr->len = alloptslen;
                    ilen = alloptslen-2;
                }
                else
                {
                    ilen = optdatalen;
                }
                break;
        }
    }
    else if (layer == IPXCP_LAYER)
    {
        u32 reqpeer_ipxnet;
        u8  reqpeer_ipxnode[SZ_IPX_NODENUM];

switch(p_opthdr->type)
        {
            case IPX_NET_NUM:           /* IPX Network Number */
                /* IPX Network Addr is a 32bit field */
                ilen = 4;
                if (optdatalen < ilen)
                {
                    /* Short option data; reject packet */
                    opt_accept = CONFIG_REJ;
                    break;
                }

/* Get proposed value from packet */
                reqpeer_ipxnet = *p_optdata;
                reqpeer_ipxnet = (reqpeer_ipxnet << 8) | *(p_optdata + 1);
                reqpeer_ipxnet = (reqpeer_ipxnet << 8) | *(p_optdata + 2);
                reqpeer_ipxnet = (reqpeer_ipxnet << 8) | *(p_optdata + 3);

/* If the App side is requesting an IPX Net Addr and the Net */
                /* side gave us one, relay it back to the App. */
                if (reqpeer_ipxnet != p_acb->peer_ipx_network)
                {
                    opt_accept = CONFIG_NAK;
                    *p_optdata = (p_acb->peer_ipx_network >> 24);
                    *(p_optdata + 1) = (p_acb->peer_ipx_network >> 16);
                    *(p_optdata + 2) = (p_acb->peer_ipx_network >> 8);
                    *(p_optdata + 3) = (p_acb->peer_ipx_network & 0xff);
                }
                else
                {
                    /* Blindly accept because the Net side didn't */
                    /* engage in IP Addr negotiation (for whatever reason). */
                    opt_accept = CONFIG_ACK;
                }
```

```
        break;
    case IPX_NODE_NUM:              /* IPX Node Number */
        /* IPX Node Addr is a MAC Address */
        ilen = SZ_IPX_NODENUM;
        if (optdatalen < ilen)
        {
            /* Short option data; reject packet */
            opt_accept = CONFIG_REJ;
            break;
        }

/* Get proposed value from packet */
        maccpy(reqpeer_ipxnode, p_optdata);

/* If the App side is requesting an IPX Node Addr and the */
        /* Net side gave us one, relay it back to the App. */
        if (!maccmp(reqpeer_ipxnode, (u8 *)p_acb->peer_ipx_node))
        {
            opt_accept = CONFIG_NAK;
            maccpy(p_optdata, p_acb->peer_ipx_node);
        }
        else
        {
            /* Blindly accept because the Net side didn't */
            /* engage in IP Addr negotiation (for whatever reason). */
            opt_accept = CONFIG_ACK;
        }
        break;
    case IPX_CFG_COMPLETE:          /* IPX Configuration Complete */
        ilen = optdatalen;

/* BLINDLY ACCEPT BECAUSE WE WILL NOT DO ANYTHING */
        /* WITH THIS AT THIS TIME */
        opt_accept = CONFIG_ACK;
        break;
    default:        /* Unknown option */
        opt_accept = CONFIG_REJ;

/* protect from bogus packet or buffer overrun */
        if ((p_opthdr->len <= 0) || (alloptslen < p_opthdr->len))
        {
            p_opthdr->len = alloptslen;
            ilen = alloptslen-2;
        }
        else
        {
            ilen = optdatalen;
        }
        break;
    }
}
else if (layer == NBFCP_LAYER)
{
    switch(p_opthdr->type)
    {
    case NBF_NAME_PROJ:             /* NetBios Name Projection */
        ilen = optdatalen;

/* BLINDLY ACCEPT BECAUSE WE WILL NOT DO ANYTHING */
        /* WITH THIS AT THIS TIME */
        opt_accept = CONFIG_ACK;
        break;
    case NBF_PEER_INFO:             /* NetBios Peer Information */
        ilen = optdatalen;

/* Don't need to record the IP address since it was */
        /* picked off in the learnfromreq function. */

/* BLINDLY ACCEPT BECAUSE WE WILL NOT DO ANYTHING */
        /* WITH THIS AT THIS TIME */
        opt_accept = CONFIG_ACK;
        break;
    case NBF_MULTICAST:             /* NetBios Multicast */
        ilen = optdatalen;
```

```
            /* BLINDLY ACCEPT BECAUSE WE WILL NOT DO ANYTHING */
            /* WITH THIS AT THIS TIME */
            opt_accept = CONFIG_ACK;
            break;
        case NBF_MAC_REQUIRED:              /* NetBios MAC Required */
            ilen = optdatalen;

/*** THIS OPTION IS NOT NEGOTIABLE, REJECT ***/
            opt_accept = CONFIG_REJ;
            break;
        default:        /* Unknown option */
            opt_accept = CONFIG_REJ;

/* protect from bogus packet or buffer overrun */
            if ((p_opthdr->len <= 0) || (alloptslen < p_opthdr->len))
            {
                p_opthdr->len = alloptslen;
                ilen = alloptslen-2;
            }
            else
            {
                ilen = optdatalen;
            }
            break;
        }
    }
    else    /* assumed to be BRCP_LAYER */
    {
        switch(p_opthdr->type)
        {
        case BR_MAC_TYPE:       /* MAC Type */
            ilen = 1;
            if (optdatalen < ilen)
            {
                /* Short option data; reject packet */
                opt_accept = CONFIG_REJ;
                break;
            } if (*p_optdata != BRD_MAC_8023)
                opt_accept = CONFIG_REJ;
            else
                opt_accept = CONFIG_ACK;    /* Value is acceptable */
            break;
        case BR_REM_RING_ID:    /* Remote Ring ID */
            /* 802.3 does not use this option, it is bogus.. */
            ilen = 2;
            opt_accept = CONFIG_REJ;
            break;
        case BR_LINE_ID:        /* Line ID */
            /* 802.3 does not use this option, it is bogus.. */
            ilen = 2;
            opt_accept = CONFIG_REJ;
            break;
        case BR_TINY_COMPR:     /* Tinygram Compression */
            /*** THIS OPTION IS NOT NEGOTIABLE, REJECT ***/
            ilen = 1;
            opt_accept = CONFIG_REJ;
            break;
        case BR_LAN_ID:         /* LAN ID */
            /*** THIS OPTION IS NOT NEGOTIABLE, REJECT ***/
            ilen = 1;
            opt_accept = CONFIG_REJ;
            break;
        default:        /* Unknown option */
            opt_accept = CONFIG_REJ;

/* protect from bogus packet or buffer overrun */
            if ((p_opthdr->len <= 0) || (alloptslen < p_opthdr->len))
            {
                p_opthdr->len = alloptslen;
                ilen = alloptslen-2;
            }
            else
            {
```

```
            ilen = optdatalen;
        }
        break;
    }
} if ((opt_accept == CONFIG_ACK) && (cnf_accept != CONFIG_ACK))
{
    /* This option was good, but a previous     */
    /* option was not. Return only those options */
    /* which are being nacked/rejected.         */
    continue;
} if (opt_accept == CONFIG_NAK)
{
    if (cnf_accept == CONFIG_REJ)
    {
        /* Return only those options */
        /* which are being rejected. */
        continue;
    } if (cnf_accept == CONFIG_ACK)
    {
        /* Discard current list of good options */

/* Rest buffer bytecount */
        p_ACK_pkt->uLength = 0;

/* Reinit ptr to CFG_ACK buffers option field */
        p_ACK_buf = ((u8 *)GET_DATA_PTR(p_ACK_pkt)) +
                            PPP_HDRLEN + CNF_HDRLEN;

/* Send a list of nacked options */
        cnf_accept = CONFIG_NAK;
    }
} if (opt_accept == CONFIG_REJ)
{
    if (cnf_accept != CONFIG_REJ)
    {
        /* Discard current list of good options */

/* Rest buffer bytecount */
        p_ACK_pkt->uLength = 0;

/* Reinit ptr to CFG_ACK buffers option field */
        p_ACK_buf = ((u8 *)GET_DATA_PTR(p_ACK_pkt)) +
                            PPP_HDRLEN + CNF_HDRLEN;

/* Send a list of rejected options */
        cnf_accept = CONFIG_REJ;
    }
}

/* Add option response to the return list */
*p_ACK_buf++ = p_opthdr->type;
*p_ACK_buf++ = ilen + OPT_HDRLEN;

for (i = 0; i < ilen; i++)
{
    *p_ACK_buf++ = *p_optdata++;
}

/* Bump buffer bytecount by size of REPLY option */
    p_ACK_pkt->uLength += ilen + OPT_HDRLEN;
}

/* Send ACK/NAK/REJ to remote host */
if (cnf_accept == CONFIG_ACK)
{
    /* Accept configuration requested by remote host */
    appp_sendreply(lpCall, layer, p_ACK_pkt, CONFIG_ACK, p_cnfhdr->id);
```

```
        p_acp->cpstate = ack_cpstate;

/* if we just transitioned to OPEN state */
        if (p_acp->cpstate == CP_OPEN)
        {
            appp_open(lpCall, layer);      /* CP link now open */
        }
    }
    else
    {
        /* NAK/REJ config request made by remote host */
        appp_sendreply(lpCall, layer, p_ACK_pkt,
            cnf_accept, p_cnfhdr->id);

p_acp->cpstate = nak_cpstate;
    }
    return;
}

/*
 *  appp_learnfromreq -- Grab any juicy info from the App CFG_REQ
 */
void
appp_learnfromreq(PCALLINFO lpCall, PPP_layer_t layer, GCAPACKET *p_pkt)
{
    APPP_CB_t       *p_acb = &(lpCall->appp);          /*   APPP CB   */
    PPP_CB_t        *p_ncb = &(lpCall->ppp);           /*   NPPP CB   */
    S_CPCTL         *p_acp = &lpCall->appp.a_cpctl[layer];
    S_CNFHDR        *p_cnfhdr;
    S_OPTHDR        *p_opthdr;
    u8              *p_optdata;
    s16             i,llen;
    s16             alloptslen;
    s16             optdatalen;
    s16             minoptlen;

p_cnfhdr = (S_CNFHDR *)(((u8 *)GET_DATA_PTR(p_pkt)) + PPP_HDRLEN);
    p_opthdr = (S_OPTHDR *)(((u8 *)p_cnfhdr) + CNF_HDRLEN);

/* Make sure length in CP config header is realistic */
    if (p_pkt->uLength < (DWORD)swap16(p_cnfhdr->len))
        p_cnfhdr->len = swap16((u16)p_pkt->uLength);

alloptslen = swap16(p_cnfhdr->len) - CNF_HDRLEN;

if (layer == IPCP_LAYER)
        minoptlen = 4;
    else
        minoptlen = 2;

/* Process options requested by remote host */
    for (; alloptslen >= minoptlen; alloptslen -= p_opthdr->len,
     p_opthdr = (S_OPTHDR *)((u8 *)p_opthdr + p_opthdr->len))
    {
        optdatalen = p_opthdr->len - 2; /* Get curr opts data len */
                        /* Set ptr to option data */
        p_optdata = ((u8 *)p_opthdr) + 2;

if (layer == IPCP_LAYER)
        {
            if (p_opthdr->type == IP_ADDRS_NEW)       /* IP address */
            {
                u32 app_ip;

/* IP Addr is a 32bit field */
                if (optdatalen != 4)
                    continue;          /* Wrong size, ignore */

/* Get proposed value from packet */
                app_ip = *p_optdata;
                app_ip = (app_ip << 8) | *(p_optdata + 1);
                app_ip = (app_ip << 8) | *(p_optdata + 2);
                app_ip = (app_ip << 8) | *(p_optdata + 3);
```

```
        /****
         * If the App is requesting an IP Address to be assigned
         * to him, we need to indicate to the Net side to request
         * an IP Address. If one has been assigned, we need to
         * reflect that as well.
         *****/ p_acb->peer_negotiated_ip_addr = TRUE;
        p_acb->peer_ip_addr = app_ip;

/* set this for the Net side negotiations */
        p_ncb->my_ip_addr = app_ip;
    }
}
else if (layer == IPXCP_LAYER)
{
    if (p_opthdr->type == IPX_NET_NUM)         /* IPX Network Number */
    {
        u32 app_ipxnet;

/* IPX Net Addr is a 32bit field */
        if (optdatalen != 4)
            continue;          /* Wrong size, ignore */

/* Get proposed value from packet */
        app_ipxnet = *p_optdata;
        app_ipxnet = (app_ipxnet << 8) | *(p_optdata + 1);
        app_ipxnet = (app_ipxnet << 8) | *(p_optdata + 2);
        app_ipxnet = (app_ipxnet << 8) | *(p_optdata + 3);

/****
         * If the App is requesting an IPX Net Address to be assigned
         * to him, we need to indicate to the Net side to request
         * the IPX Net Address. If one has been assigned, we need to
         * reflect that as well.
         *****/ p_acb->peer_negotiated_ipxnet_addr = TRUE;
        p_acb->peer_ipx_network = app_ipxnet;

/* set this for the Net side negotiations */
        p_ncb->my_ipx_network = app_ipxnet;
    }
    else if (p_opthdr->type == IPX_NODE_NUM)    /* IPX Node Number */
    {
        /* IPX Net Addr is a 32bit field */
        if (optdatalen != MACADDRESSSIZE)
            continue;          /* Wrong size, ignore */

/****
         * If the App is requesting an IPX Node Address to be assigned
         * to him, we need to indicate to the Net side to request
         * the IPX Net Address. If one has been assigned, we need to
         * reflect that as well.
         *****/ p_acb->peer_negotiated_ipxnode_addr = TRUE;

/* Get proposed value from packet */
        maccpy(p_acb->peer_ipx_node, p_optdata);

/* set this for the Net side negotiations */
        maccpy(p_ncb->my_ipx_node, p_optdata);
    }
}
else if (layer == NBFCP_LAYER)
{
    if (p_opthdr->type == NBF_PEER_INFO)    /* NetBios Peer Info */
    {
        /* copy all the clutter (Class and version) */
        memcpy((u8 *)p_acb->nb_peer_clutter,
            (u8 *)p_optdata, SZ_NBF_CLUTTER);

/* if the far end has supplied a Peer Name, tuck it away */
```

```
                if (optdatalen > 8)
                {
                    /****
                     * The App side is giving us his NBF Name.  Tuck it away
                     * so that we can reflect it back to the Net.
                     *****/ p_acb->peer_negotiated_nbname = TRUE;
                    memcpy((u8 *)p_acb->nb_peer_name,
                        ((u8 *)p_optdata+SZ_NBF_CLUTTER), (optdatalen - 8));
                    p_acb->nb_peer_name[optdatalen - 8] = 0;
                }
            }
        }
        else    /* assumed to be BRCP_LAYER */
        {
            /* Nothing to be learn here... */
        }
    } return;
}

/*
 *  appp_rcvack -- Process the received ACK from the peer.
 */ void
appp_rcvack(PCALLINFO lpCall, PPP_layer_t layer, GCAPACKET *p_pkt)
{
    APPP_CB_t       *p_acb = &(lpCall->apppp);       /*    APPP CB    */
    S_CPCTL         *p_acp = &lpCall->appp.a_cpctl[layer];

if (p_acp->timer_idl.active)
        clr_appp_timer(lpCall, layer, PPP_TIMER1);

switch(p_acp->cpstate)
    {
    case CP_INITIAL:    /* Unexpected event */
    case CP_STARTING:   /* Unexpected event */
        break;

case CP_CLOSED:
        appp_sendtermack(lpCall, layer, CP_CLOSED);
        break;

case CP_STOPPED:
        appp_sendtermack(lpCall, layer, CP_STOPPED);
        break;

case CP_CLOSING:
        /* We are attempting to close connection; wait */
        /* for timeout to resend a Terminate Request   */
        break;

case CP_STOPPING:
        /* We are attempting to stop connection; wait */
        /* for timeout to resend a Terminate Request  */
        break;

case CP_REQ_SENT:
        /* Make sure ACK is proper */
        if (appp_chkack(lpCall, layer, p_pkt) != -1)
            p_acp->cpstate = CP_ACK_RCVD;    /* Remote host accepted our req */

/* Still need to settle request from remote host */
        set_appp_timer(PPP_RESTART_TIMEOUT, lpCall, (u32)layer, PPP_TIMER1);
        break;

case CP_ACK_RCVD:
        appp_sendreq(lpCall, layer);
        p_acp->cpstate = CP_REQ_SENT;
        break;

case CP_ACK_SENT:
```

```c
            /* Make sure ACK is proper */
            if (appp_chkack(lpCall, layer, p_pkt) == -1)
            {
                /* Error in ACK from remote host */
                /* Wait for another ACK, then send another request */
                set_appp_timer(PPP_RESTART_TIMEOUT,
                    lpCall, (u32)layer, PPP_TIMER1);
            }
            else
            {
                p_acp->cpstate = CP_OPEN;

/* CP negotiation complete */
                appp_open(lpCall, layer);
            }
            break;

case CP_OPEN:
            /* Something went wrong; restart negotiations */
            appp_restart(lpCall, layer);

/* Send our configuration request */
            appp_sendreq(lpCall, layer);

p_acp->cpstate = CP_REQ_SENT;
            break;

default:
            /* ignore */
            break;
    } return;
}

/*
 * appp_chkack -- Check the received ACK from the peer.
 */ int
appp_chkack(PCALLINFO lpCall, PPP_layer_t layer, GCAPACKET *p_pkt)
{
    APPP_CB_t       *p_acb = &(lpCall->appp);       /*  APPP CB     */
    S_CPCTL         *p_acp = &lpCall->appp.a_cpctl[layer];
    S_CNFHDR        *p_ACK_cnfhdr;
    S_OPTHDR        *p_ACK_opthdr;
    GCAPACKET       *p_REQ_pkt;
    S_OPTHDR        *p_REQ_opthdr;
    s16             ACK_optslen, REQ_optslen;
    u8              *p_ACK_optdata;
    u8              *p_REQ_optdata;
    s16             ackerr = 0;
    u16             reqi16, acki16;
    u8              reqi8, acki8;
    u32             reqmy_ip, ackmy_ip;
    u32             reqipx_net, ackipx_net;
    s16             minoptlen;
    int             i;

p_ACK_cnfhdr = (S_CNFHDR *)(((u8 *)GET_DATA_PTR(p_pkt)) + PPP_HDRLEN);
    p_ACK_opthdr = (S_OPTHDR *)(((u8 *)p_ACK_cnfhdr) + CNF_HDRLEN);

/* CP ID field must match last request we sent */
    if (p_ACK_cnfhdr->id != p_acp->lastid)
        return -1;

/* Get packet for REQ to ACK comparison check */
    if ((p_REQ_pkt = ppp_get_pkt()) == NULL)
        return(-1);

/* Set ptr to REQ option header */
    p_REQ_opthdr = (S_OPTHDR *)(((u8 *)GET_DATA_PTR(p_REQ_pkt)) +
                    PPP_HDRLEN + CNF_HDRLEN);

/* Get a copy of last request we sent */
```

```
p_REQ_pkt->uLength = appp_makereq(lpCall, layer, (u8 *)p_REQ_opthdr);

/* Get size of REQ and ACK options field */
ACK_optslen = swap16(p_ACK_cnfhdr->len) - CNF_HDRLEN;
REQ_optslen = p_REQ_pkt->uLength;

/* Overall buffer length should match */
if (ACK_optslen != REQ_optslen)
    ackerr = 1;

if (layer == IPCP_LAYER)
    minoptlen = 4;
else
    minoptlen = 2;

/* ACK must echo all options we requested in the order requested */
for (; (REQ_optslen >= minoptlen) && (!ackerr);
 REQ_optslen -= p_REQ_opthdr->len, p_REQ_opthdr =
 (S_OPTHDR *)((u8 *)p_REQ_opthdr + p_REQ_opthdr->len),
 ACK_optslen -= p_ACK_opthdr->len, p_ACK_opthdr =
 (S_OPTHDR *)((u8 *)p_ACK_opthdr + p_ACK_opthdr->len))
{
    /* Must have as many acked options as requested */
    if (ACK_optslen < minoptlen)
    {
        ackerr = 1;
        break;
    }

/* Set ptr to current REQ option data field */
    p_REQ_optdata = ((u8 *)p_REQ_opthdr) + 2;

/* Set ptr to current ACK option data field */
    p_ACK_optdata = ((u8 *)p_ACK_opthdr) + 2;

/* Config option headers must match */
    if ((p_ACK_opthdr->type != p_REQ_opthdr->type) ||
        (p_ACK_opthdr->len != p_REQ_opthdr->len))
    {
        ackerr = 1;
        break;
    } if (layer == LCP_LAYER)
    {
        /* Config option values must match */
        switch(p_REQ_opthdr->type)
        {
        case MAX_RCV_UNIT:    /* Maximum Receive Unit */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
                ackerr = 1;
            break;

case AUTH_TYPE:       /* Auth Protocol Type */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
                ackerr = 1;
            break;

case PROT_COMPRESS:   /* Protocol Compression */
        case AC_COMPRESS:     /* Addr/Control Compression */
            /* its now okay */
            break;

default:              /* Shouldnt happen */
            ackerr = 1;
            break;
        }
    }
    else if (layer == IPCP_LAYER)
    {
        /* Config option values must match */
```

```c
        switch(p_REQ_opthdr->type)
        {
        case IP_ADDRS_NEW:          /* IP address */
            /* Echoed values must match our request */
            reqmy_ip = *p_REQ_optdata++;
            reqmy_ip = (reqmy_ip << 8) | *p_REQ_optdata++;
            reqmy_ip = (reqmy_ip << 8) | *p_REQ_optdata++;
            reqmy_ip = (reqmy_ip << 8) | *p_REQ_optdata++;

ackmy_ip = *p_ACK_optdata++;
            ackmy_ip = (ackmy_ip << 8) | *p_ACK_optdata++;
            ackmy_ip = (ackmy_ip << 8) | *p_ACK_optdata++;
            ackmy_ip = (ackmy_ip << 8) | *p_ACK_optdata++;

if (ackmy_ip != reqmy_ip)
                ackerr = 1;
            break;
        case IP_COMPR_TYPE:       /* IP header compr */
            /* Echoed values must match our request */
            reqi16 = *p_REQ_optdata++;
            reqi16 = (reqi16 << 8) | *p_REQ_optdata;
            acki16 = *p_ACK_optdata++;
            acki16 = (acki16 << 8) | *p_ACK_optdata;

if (reqi16 != acki16)
                ackerr = 1;
            break;
        default:                  /* Shouldnt happen */
            ackerr = 1;
            break;
        }
    }
    else if (layer == IPXCP_LAYER)
    {
        /* Config option values must match */
        switch(p_REQ_opthdr->type)
        {
        case IPX_NET_NUM:          /* IPX Network Number */
            /* Echoed values must match our request */
            reqipx_net = *p_REQ_optdata++;
            reqipx_net = (reqipx_net << 8) | *p_REQ_optdata++;
            reqipx_net = (reqipx_net << 8) | *p_REQ_optdata++;
            reqipx_net = (reqipx_net << 8) | *p_REQ_optdata++;

ackipx_net = *p_ACK_optdata++;
            ackipx_net = (ackipx_net << 8) | *p_ACK_optdata++;
            ackipx_net = (ackipx_net << 8) | *p_ACK_optdata++;
            ackipx_net = (ackipx_net << 8) | *p_ACK_optdata++;

if (ackipx_net != reqipx_net)
                ackerr = 1;
            break;
        case IPX_NODE_NUM:         /* IPX Node Number */
            for (i = 0; i < SZ_IPX_NODENUM; i++)
            {
                if (*p_ACK_optdata++ != *p_REQ_optdata++)
                {
                    ackerr = 1;
                    break;
                }
            }
            break;
        default:        /* We didn't send ANY CFG OPTIONS for IPX */
            ackerr = 1;
            break;
        }
    }
    else if (layer == NBFCP_LAYER)
    {
        /* Config option values must match */
        switch(p_REQ_opthdr->type)
        {
        case NBF_NAME_PROJ:        /* Empty Name Projection */
            /* assume its okay */
            break;
```

```c
            case NBF_PEER_INFO:      /* NetBios Peer Information */
                /* assume its okay */
                break;
            default:      /* We didn't send any other NBF CFG OPTIONS */
                ackerr = 1;
                break;
            }
        }
        else   /* assumed to be BRCP_LAYER */
        {
            /* Config option values must match */
            switch(p_REQ_opthdr->type)
            {
            case BR_MAC_TYPE:        /* MAC Type */
                /* MAC Types MUST match */
                if (*p_ACK_optdata != *p_REQ_optdata)
                    ackerr = 1;
                break;
            default:
                ackerr = 1;
                break;
            }
        }
    } ppp_rls_pkt(p_REQ_pkt, 18);

if (ackerr)
        return -1;

/* ACK matches last request we made */
    return 0;
}

/*
 * appp_rcvnak -- Process the received NAK from the peer.
 */
void
appp_rcvnak(PCALLINFO lpCall, PPP_layer_t layer, GCAPACKET *p_pkt)
{
    APPP_CB_t       *p_acb = &(lpCall->appp);        /*   APPP CB   */
    S_CPCTL         *p_acp = &lpCall->appp.a_cpctl[layer];

if (p_acp->timer_id1.active)
        clr_appp_timer(lpCall, layer, PPP_TIMER1);

switch(p_acp->cpstate)
    {
    case CP_INITIAL:    /* Unexpected event */
    case CP_STARTING:   /* Unexpected event */
        break;

case CP_CLOSED:
        appp_sendtermack(lpCall, layer, CP_CLOSED);
        break;

case CP_STOPPED:
        appp_sendtermack(lpCall, layer, CP_STOPPED);
        break;

case CP_CLOSING:
        /* We are attempting to close connection; wait */
        /* for timeout to resend a Terminate Request   */
        break;

case CP_STOPPING:
        /* We are attempting to stop connection; wait */
        /* for timeout to resend a Terminate Request  */
        break;

case CP_REQ_SENT:
    case CP_ACK_SENT:
        /* Update our config request to reflect NAKed options */
        if (appp_chknak(lpCall, layer, p_pkt) == -1)
```

```c
    {
        /* Bad NAK packet */
        /* Wait for another; resend request on timeout */
        set_appp_timer(PPP_RESTART_TIMEOUT, lpCall,
                (u32)layer, PPP_TIMER1);
    }
    else
    {
        /* Send updated config request */
        appp_sendreq(lpCall, layer);
    }
    break;

case CP_ACK_RCVD:
    /* Send our configuration request */
    appp_sendreq(lpCall, layer);
    p_acp->cpstate = CP_REQ_SENT;
    break;

case CP_OPEN:
    /* Something went wrong; restart negotiations */
    appp_restart(lpCall, layer);

/* Send our configuration request */
    appp_sendreq(lpCall, layer);

p_acp->cpstate = CP_REQ_SENT;
    break;

default:
    break;          /* ignore */
} return;
}

/*
 *  appp_chknak -- Check the received NAK from the peer.
 */ int
appp_chknak(PCALLINFO lpCall, PPP_layer_t layer, GCAPACKET *p_pkt)
{
    APPP_CB_t       *p_acp = &(lpCall->apppp);       /*  APPP CB  */
    S_CPCTL         *p_acp = &lpCall->appp.a_cpctl[layer];
    S_CNFHDR        *p_NAK_cnfhdr;
    S_OPTHDR        *p_NAK_opthdr;
    GCAPACKET       *p_REQ_pkt;
    S_OPTHDR        *p_REQ_opthdr;
    s16             NAK_optslen, REQ_optslen;
    u8              *p_NAK_optdata;
    s16             nakerr = 0;
    u16             naki16;
    u32             nakmy_ip;
    s16             minoptlen;
    u8              ms_cmp_enc;

p_NAK_cnfhdr = (S_CNFHDR *)(((u8 *)GET_DATA_PTR(p_pkt)) + PPP_HDRLEN);
    p_NAK_opthdr = (S_OPTHDR *)(((u8 *)p_NAK_cnfhdr) + CNF_HDRLEN);

/* CP ID field must match last request we sent */
    if (p_NAK_cnfhdr->id != p_acp->lastid)
        return -1;

/* Get packet for REQ to NAK comparison check */
    if ((p_REQ_pkt = ppp_get_pkt()) == NULL)
        return(-1);

/* Set ptr to REQ option header */
    p_REQ_opthdr = (S_OPTHDR *)(((u8 *)GET_DATA_PTR(p_REQ_pkt)) +
                    PPP_HDRLEN + CNF_HDRLEN);

/* Get a copy of last request we sent */
    p_REQ_pkt->uLength = appp_makereq(lpCall, layer, (u8 *)p_REQ_opthdr);
```

```
/* Get size of REQ and NAK options field */
NAK_optslen = swap16(p_NAK_cnfhdr->len) - CNF_HDRLEN;
REQ_optslen = p_REQ_pkt->uLength;

/* Check overall buffer length */
if (NAK_optslen > REQ_optslen)
    nakerr = 1;

if (layer == IPCP_LAYER)
    minoptlen = 4;
else
    minoptlen = 2;

/* NAKed options must be same order as our original request */
for (; (NAK_optslen >= minoptlen) && (!nakerr);
 REQ_optslen -= p_REQ_opthdr->len, p_REQ_opthdr =
 (S_OPTHDR *)((u8 *)p_REQ_opthdr + p_REQ_opthdr->len),
 NAK_optslen -= p_NAK_opthdr->len, p_NAK_opthdr =
 (S_OPTHDR *)((u8 *)p_NAK_opthdr + p_NAK_opthdr->len))
{
    /* Must find match to each NAKed option */
    if (REQ_optslen < minoptlen)
    {
        nakerr = 1;
        break;
    }

/* Maybe not all options were NAKed; look */
    /* for matching option in our request    */
    while (p_REQ_opthdr->type != p_NAK_opthdr->type)
    {
        /* This option not NAKed; eat rest    */
        /* of option from the request packet */
        REQ_optslen -= p_REQ_opthdr->len;
        p_REQ_opthdr = (S_OPTHDR *)((u8 *)p_REQ_opthdr +
          p_REQ_opthdr->len);

/* Must find match to each NAKed option */
        if (REQ_optslen < minoptlen)
        {
            p_REQ_opthdr->type = 0;
            nakerr = 1;
            break;
        }
    }

/* Config option headers must match */
    if ((p_NAK_opthdr->type != p_REQ_opthdr->type) ||
    (p_NAK_opthdr->len != p_REQ_opthdr->len))
    {
        nakerr = 1;
        break;
    }

/* Set ptr to current NAK option field to compare */
    p_NAK_optdata = ((u8 *)p_NAK_opthdr) + 2;

if (layer == LCP_LAYER)
    {
        /* Remote host replaced our request with new suggestion */
        switch(p_REQ_opthdr->type)
        {
        case MAX_RCV_UNIT:    /* Maximum Receive Unit */
            /* Get suggested MRU */
            naki16 = (*p_NAK_optdata << 8) | *(p_NAK_optdata+1);

/* Save new request value */
            p_acb->lcl_mru = naki16;
            break;
        case AUTH_TYPE:    /* Authentication Protocol Type */
            /* We are requesting AUTH because the Net is requesting */
            /* Authentication. We cannot allow the App to negotiate */
            /* it away, so IGNORE IT. */
            nakerr = 1;
            break;
```

```
            default:        /* Shouldnt happen */
                nakerr = 1;
                break;
            }
        }
        else if (layer == IPCP_LAYER)
        {
            /* Remote host replaced our request with new suggestion */
            switch(p_REQ_opthdr->type)
            {
            case IP_ADDRS_NEW:      /* IP address */
                /* App NOT allowed to give me MY IP Address !! */
                nakerr = 1;
                break;
            default:        /* Shouldnt happen */
                nakerr = 1;
                break;
            }
        }
        else if (layer == IPXCP_LAYER)
        {
            /* Config option values must match */
            switch(p_REQ_opthdr->type)
            {
            case IPX_NET_NUM:       /* IPX Network Number */
                /* App NOT allowed to give me MY IPX Net Address !! */
                nakerr = 1;
                break;
            case IPX_NODE_NUM:      /* IPX Node Number */
                /* App NOT allowed to give me MY IPX Node Address !! */
                nakerr = 1;
                break;
            default:        /* We didn't send ANY CFG OPTIONS for IPX */
                nakerr = 1;
                break;
            }
        }
        else if (layer == NBFCP_LAYER)
        {
            /* Remote host replaced our request with new suggestion, */
            /* Except that we didn't send ANY NetBios CFGs THAT CAN BE NAKed */
            switch(p_REQ_opthdr->type)
            {
            default:
                nakerr = 1;
                break;
            }
        }
        else    /* assumed to be BRCP_LAYER */
        {
            /* Remote host replaced our request with new suggestion */
            switch(p_REQ_opthdr->type)
            {
            default:
                nakerr = 1;
                break;
            }
        }
    } ppp_rls_pkt(p_REQ_pkt, 19);

if (nakerr)
        return -1;

/* NAK matches last request we made */
    return 0;
}

/*
 *  appp_rcvrej -- Process the received REJECT from the peer.
 */
void
```

```
appp_rcvrej(PCALLINFO lpCall, PPP_layer_t layer, GCAPACKET *p_pkt)
{
    APPP_CB_t         *p_acp = &(lpCall->appp);        /*   APPP CB   */
    S_CPCTL           *p_acp = &lpCall->appp.a_cpctl[layer];

if (p_acp->timer_idl.active)
        clr_appp_timer(lpCall, layer, PPP_TIMER1);

switch(p_acp->cpstate)
    {
    case CP_INITIAL:    /* Unexpected event */
    case CP_STARTING:   /* Unexpected event */
        break;

case CP_CLOSED:
        appp_sendtermack(lpCall, layer, CP_CLOSED);
        break;

case CP_STOPPED:
        appp_sendtermack(lpCall, layer, CP_STOPPED);
        break;

case CP_CLOSING:
        /* We are attempting to close connection; wait */
        /* for timeout to resend a Terminate Request   */
        break;

case CP_STOPPING:
        /* We are attempting to stop connection; wait */
        /* for timeout to resend a Terminate Request  */
        break;

case CP_REQ_SENT:
    case CP_ACK_SENT:
        /* Update our config request to reflect NAKed options */
        if (appp_chkrej(lpCall, layer, p_pkt) == -1)
        {
            /* Bad reject packet */
            /* Wait for another; resend request on timeout */
            set_appp_timer(PPP_RESTART_TIMEOUT, lpCall,
                    (u32)layer, PPP_TIMER1);
        }
        else
        {
            /* Send updated config request */
            appp_sendreq(lpCall, layer);
        }
        break;

case CP_ACK_RCVD:
        /* Send our configuration request */
        appp_sendreq(lpCall, layer);

p_acp->cpstate = CP_REQ_SENT;
        break;

case CP_OPEN:
        /* Something went wrong; restart negotiations */
        appp_restart(lpCall, layer);

/* Send our configuration request */
        appp_sendreq(lpCall, layer);

p_acp->cpstate = CP_REQ_SENT;
        break;

default:
        /* Ignore */
        break;
    } return;
}
/*
```

```
*   appp_chkrej -- Check the received REJECT from the peer.
*/
int
appp_chkrej(PCALLINFO lpCall, PPP_layer_t layer, GCAPACKET *p_pkt)
{
    APPP_CB_t       *p_acb = &(lpCall->appp);       /*   APPP CB   */
    S_CPCTL         *p_acp = &lpCall->appp.a_cpctl[layer];
    S_CPCTL         *p_ncp;
    S_CNFHDR        *p_REJ_cnfhdr;
    S_OPTHDR        *p_REJ_opthdr;
    GCAPACKET       *p_REQ_pkt;
    S_OPTHDR        *p_REQ_opthdr;
    s16             REJ_optslen, REQ_optslen;
    s16             rejerr = 0;
    s16             minoptlen;

p_REJ_cnfhdr = (S_CNFHDR *)(((u8 *)GET_DATA_PTR(p_pkt)) + PPP_HDRLEN);
    p_REJ_opthdr = (S_OPTHDR *)(((u8 *)p_REJ_cnfhdr) + CNF_HDRLEN);

/* CP ID field must match last request we sent */
    if (p_REJ_cnfhdr->id != p_acp->lastid)
        return -1;

/* Get packet for REQ to REJ comparison check */
    if ((p_REQ_pkt = ppp_get_pkt()) == NULL)
        return(-1);

/* Set ptr to REQ option header */
    p_REQ_opthdr = (S_OPTHDR *)(((u8 *)GET_DATA_PTR(p_REQ_pkt)) +
                    PPP_HDRLEN + CNF_HDRLEN);

/* Get a copy of last request we sent */
    p_REQ_pkt->uLength = appp_makereq(lpCall, layer, (u8 *)p_REQ_opthdr);

/* Get size of REQ and REJ options field */
    REJ_optslen = swap16(p_REJ_cnfhdr->len) - CNF_HDRLEN;
    REQ_optslen = p_REQ_pkt->uLength;

/* Check overall buffer length */
    if (REJ_optslen > REQ_optslen)
        rejerr = 1;

if (layer == IPCP_LAYER)
        minoptlen = 4;
    else
        minoptlen = 2;

/* Rejected options must be same order as our original request */
    for (; (REJ_optslen >= minoptlen) && (!rejerr);
     REQ_optslen -= p_REQ_opthdr->len, p_REQ_opthdr =
     (S_OPTHDR *)((u8 *)p_REQ_opthdr + p_REQ_opthdr->len),
     REJ_optslen -= p_REJ_opthdr->len, p_REJ_opthdr =
     (S_OPTHDR *)((u8 *)p_REJ_opthdr + p_REJ_opthdr->len))
    {
        /* Must find match to each Rejected option */
        if (REQ_optslen < minoptlen)
        {
            rejerr = 1;
            break;
        }

/* Maybe not all options were Rejected; look */
        /* for matching option in our request */
        while (p_REQ_opthdr->type != p_REJ_opthdr->type)
        {
            /* This option not REJed; eat rest   */
            /* of option from the request packet */
            REQ_optslen -= p_REQ_opthdr->len;
            p_REQ_opthdr = (S_OPTHDR *)((u8 *)p_REQ_opthdr +
              p_REQ_opthdr->len);

/* Must find match to each REJed option */
            if (REQ_optslen < minoptlen)
            {
```

```
            p_REQ_opthdr->type = 0;
            rejerr = 1;
            break;
        }
    }

/* Config option headers must match */
    if ((p_REJ_opthdr->type != p_REQ_opthdr->type) ||
        (p_REJ_opthdr->len  != p_REQ_opthdr->len))
    {
        rejerr = 1;
        break;
    } if (layer == LCP_LAYER)
    {
        /* Remote host wont negotiate this option */
        switch(p_REQ_opthdr->type)
        {
        case MAX_RCV_UNIT:    /* Maximum Receive Unit */
            /* Dont attempt to negotiate MRU */
            p_acb->neg_mru = 0;
            p_acb->lcl_mru = MAX_FRAME_LENGTH + sizeof(S_PPPHDR);
            break;
        case PROT_COMPRESS:   /* Protocol Compression */
            p_acb->rx_proto_comp = FALSE;
            break;
        case AC_COMPRESS:     /* Addr/Ctl Compression */
            p_acb->rx_ac_comp = FALSE;
            break;
        case AUTH_TYPE:       /* Authentication Protocol Type */
            /* We are requesting AUTH because the Net is requesting */
            /* Authentication. We cannot allow the App to negotiate */
            /* it away, so IGNORE IT. */
            rejerr = 1;
            break;
        default:              /* Shouldnt happen */
            rejerr = 1;
            break;
        }
    }
    else if (layer == IPCP_LAYER)
    {
        /* Remote host won't negotiate this option */
        switch(p_REQ_opthdr->type)
        {
        case IP_ADDRS_NEW:    /* IP address */
            /* Abandon attempt to negotiate IP addrs */
            p_acb->neg_ip_addrs = 0;

/* Reflect that link is being established */
            /* with NO IP ADDRS assigned */
            break;
        default:              /* Shouldnt happen */
            rejerr = 1;
            break;
        }
    }
    else if (layer == IPXCP_LAYER)
    {
        /* Remote host won't negotiate this option */
        switch(p_REQ_opthdr->type)
        {
        case IPX_NET_NUM:     /* IPX Network number */
            /* Abandon attempt to negotiate IPX Network number */
            p_acb->neg_ipx_network = 0;

/* Reflect that link is being established */
            /* with NO IPX Network number assigned */
            break;
        case IPX_NODE_NUM:    /* IPX Node number */
            /* Abandon attempt to negotiate IPX Node number */
            p_acb->neg_ipx_node = 0;
            break;
        default:              /* We didn't send ANY CFG OPTIONS for IPX */
```

```
                    rejerr = 1;
                    break;
            }
        }
        else if (layer == NBFCP_LAYER)
        {
            /* Remote host replaced our request with new suggestion, */
            /* Except that we didn't send ANY NetBios CFGs THAT CAN BE NAKed */
            switch(p_REQ_opthdr->type)
            {
            case NBF_NAME_PROJ:
                /* Abandon attempt to indicate to far end any name projection */
                p_acb->neg_name_proj = 0;
                break;
            case NBF_PEER_INFO:
                /* Abandon attempt to indicate to far end our peer info */
                p_acb->neg_peer_info = 0;
                break;
            default:
                rejerr = 1;
                break;
            }
        }
        else    /* assumed to be BRCP_LAYER */
        {
            /* Remote host replaced our request with new suggestion */
            switch(p_REQ_opthdr->type)
            {
            default:
                rejerr = 1;
                break;
            }
        }
    } ppp_rls_pkt(p_REQ_pkt, 20);

if (rejerr)
        return -1;

/* Reject matches last request we made */
    return 0;
}

/*
*   appp_rcvtermreq -- Process the received TERMINATE REQUEST from the peer.
*/ void
appp_rcvtermreq(PCALLINFO lpCall, PPP_layer_t layer)
{
    APPP_CB_t       *p_acb = &(lpCall->appp);       /*  APPP CB   */
    S_CPCTL         *p_acp = &lpCall->appp.a_cpctl[layer];

switch(p_acp->cpstate)
    {
    case CP_INITIAL:    /* Unexpected event */
    case CP_STARTING:   /* Unexpected event */
        break;

case CP_CLOSED:
    case CP_STOPPED:
    case CP_CLOSING:
    case CP_STOPPING:
    case CP_REQ_SENT:
        appp_sendtermack(lpCall, layer, p_acp->cpstate);
        break;

case CP_ACK_RCVD:
    case CP_ACK_SENT:
        appp_sendtermack(lpCall, layer, CP_REQ_SENT);
        break;

case CP_OPEN:
        /* Something went wrong; restart negotiations */
```

```
        appp_restart(lpCall, layer);

/* Send terminate ack */
        appp_sendtermack(lpCall, layer, CP_STOPPED);
        break;

default:
        /* ignore */
        break;
    } return;
}
/*
*   appp_rcvtermack -- Process the received TERMINATE ACK from the peer.
*/ void
appp_rcvtermack(PCALLINFO lpCall, PPP_layer_t layer)
{
    APPP_CB_t       *p_acb = &(lpCall->appp);       /*  APPP CB    */
    S_CPCTL         *p_acp = &lpCall->appp.a_cpctl[layer];

switch(p_acp->cpstate)
    {
    case CP_INITIAL:    /* Unexpected event */
    case CP_STARTING:   /* Unexpected event */
        break;

case CP_CLOSED:
    case CP_STOPPED:
    case CP_REQ_SENT:
    case CP_ACK_SENT:
        /* stay in same state */
        break;

case CP_CLOSING:
        /* completes transition to down state, indicate this fact */
        appp_restart(lpCall, layer);
        break;

case CP_STOPPING:
        /* completes transition to down state, indicate this fact */
        appp_restart(lpCall, layer);
        break;

case CP_ACK_RCVD:
        p_acp->cpstate = CP_REQ_SENT;
        break;

case CP_OPEN:
        /* Something went wrong; restart negotiations */
        appp_restart(lpCall, layer);

/* Send our configuration request */
        appp_sendreq(lpCall, layer);

p_acp->cpstate = CP_REQ_SENT;
        break;

default:
        /* ignore */
        break;
    } return;
}

/*
*   appp_rcvcoderej -- Process the received CODE REJ from the peer.
*/ void
appp_rcvcoderej(PCALLINFO lpCall, PPP_layer_t layer, GCAPACKET *p_pkt)
```

```
{
    APPP_CB_t        *p_acb = &(lpCall->appp);        /*    APPP CB    */
    S_CPCTL          *p_acp = &lpCall->appp.a_cpctl[layer];

/* catastrophic code error */
    switch(p_acp->cpstate)
    {
    case CP_INITIAL:    /* Unexpected event */
    case CP_STARTING:   /* Unexpected event */
        break;

case CP_CLOSED:
    case CP_CLOSING:
        p_acp->cpstate = CP_CLOSED;
        break;

case CP_STOPPED:
    case CP_STOPPING:
    case CP_REQ_SENT:
    case CP_ACK_RCVD:
    case CP_ACK_SENT:
        p_acp->cpstate = CP_STOPPED;
        break;

case CP_OPEN:
        appp_close(lpCall, layer, CP_STOPPING, CP_CLOSED);
        break;

default:
        /* ignore */
        break;
    } return;
}
/*
*  appp_rcvprotorej -- Process the received PROTO REJ from the peer.
*/ void
appp_rcvprotorej(PCALLINFO lpCall, PPP_layer_t layer, GCAPACKET *p_pkt)
{
    APPP_CB_t        *p_acb = &(lpCall->appp);        /*    APPP CB    */
    S_CPCTL          *p_acp = &lpCall->appp.a_cpctl[layer];
    S_CNFHDR         *p_cnfhdr;
    u16              rej_proto;

p_cnfhdr = (S_CNFHDR *)(((u8 *)GET_DATA_PTR(p_pkt)) + PPP_HDRLEN);
    rej_proto = *(u16 *)(((u8 *)p_cnfhdr) + CNF_HDRLEN);

/* check the proto the remote chocked on */
    if (rej_proto == swap16(PPP_LCP_PID))
    {
        /* catastrophic code error */
        switch(p_acp->cpstate)
        {
        case CP_INITIAL:    /* Unexpected event */
        case CP_STARTING:   /* Unexpected event */
            break;

case CP_CLOSED:
        case CP_CLOSING:
            p_acp->cpstate = CP_CLOSED;
            break;

case CP_STOPPED:
        case CP_STOPPING:
        case CP_REQ_SENT:
        case CP_ACK_RCVD:
        case CP_ACK_SENT:
            p_acp->cpstate = CP_STOPPED;
            break;

case CP_OPEN:
```

```
            appp_close(lpCall, layer, CP_STOPPING, CP_CLOSED);
            break;

default:
            /* ignore */
            break;
        }
    }
    else if ((rej_proto == PPP_BRCP_PID) || (rej_proto == PPP_BR_PID))
    {
        /* turn down attempting to bring up BRCP */
        p_acb->protocols &= ~PPP_PROT_BR;
        appp_reset(lpCall, BRCP_LAYER, CP_INITIAL, TRUE);

/* Peer APPP Does NOT support Bridging, DISABLING. */
    }
    else if ((rej_proto == swap16(PPP_IPCP_PID)) ||
             (rej_proto == swap16(PPP_IP_PID)))
    {
        /* turn down attempting to bring up IPCP */
        p_acb->protocols &= ~PPP_PROT_IP;
        appp_reset(lpCall, IPCP_LAYER, CP_INITIAL, TRUE);

/* Peer APPP Does NOT support IP, DISABLING. */
    }
    else if ((rej_proto == swap16(PPP_IPXCP_PID)) ||
             (rej_proto == swap16(PPP_IPX_PID)))
    {
        /* turn down attempting to bring up IPXCP */
        p_acb->protocols &= ~PPP_PROT_IPX;
        appp_reset(lpCall, IPXCP_LAYER, CP_INITIAL, TRUE);

/* Peer APPP Does NOT support IPX, DISABLING. */
    }
    else if ((rej_proto == swap16(PPP_NBFCP_PID)) ||
             (rej_proto == swap16(PPP_NBF_PID)))
    {
        /* turn down attempting to bring up NBFCP */
        p_acb->protocols &= ~PPP_PROT_NBF;
        appp_reset(lpCall, NBFCP_LAYER, CP_INITIAL, TRUE);

/* Peer APPP Does NOT support NetBEUI, DISABLING. */
    } return;
}

/*
 *  appp_rcvunknown -- Process the received pkt with an UNKNOWN CODE
 *                     from the peer.
 */
void
appp_rcvunknown(PCALLINFO lpCall, PPP_layer_t layer, GCAPACKET *p_pkt)
{
    APPP_CB_t       *p_acb = &(lpCall->appp);         /*   APPP CB    */
    S_CPCTL         *p_acp = &lpCall->appp.a_cpctl[layer];

switch(p_acp->cpstate)
    {
    case CP_INITIAL:    /* Unexpected event */
    case CP_STARTING:   /* Unexpected event */
        break;

case CP_CLOSED:
    case CP_STOPPED:
    case CP_CLOSING:
    case CP_STOPPING:
    case CP_REQ_SENT:
    case CP_ACK_RCVD:
    case CP_ACK_SENT:
        appp_sendcoderej(lpCall, layer, p_pkt, p_acp->cpstate);
        break;

case CP_OPEN:
```

```
        /* Before declaring down, send out code reject pkt */
        appp_sendcoderej(lpCall, layer, p_pkt, CP_CLOSED);

/* Something went wrong; restart negotiations */
        appp_restart(lpCall, layer);

/* Send our configuration request */
        appp_sendreq(lpCall, layer);

p_acp->cpstate = CP_REQ_SENT;
        break;
    default:
        /* ignore */
        break;
    } return;
}
```

```
/*************************************************************************
 *
 *         ######  #######  #######
 *            #       #     #
 *            #       #     #
 *            #       #######  #
 *            #             #  #
 *            #             #  #
 *         ######  #######  #######
 *
 *         Copyright ISDN Systems Corp., 1992-1995.
 *
 *                 All Rights Reserved.
 *
 *
 *    Filename:     nppp.c
 *
 *    Description:  This module contains the Network side for the
 *                  PPP Emulation state machine processes.
 *
 *    Modification Log:
 *
 *    Date         Authors      Notes/Description of Change
 *    02-10-93     Jomama       Genesis
 *
 *************************************************************************/
#include "pppdefs.h"

BOOL SplitPkts = TRUE;          /* By default, always split pkts */

/****
** NOTE: declaration of MS Data variables goes here. Since the
** Microsoft Compression scheme is not intellectual property of USR,
** we cannot reveal it in this patent application.
****/

/* ... INSERT MICROSOFT COMPRESSION DATA DECLARATIONS HERE ... */

/*
*    nppp_send_pkt - Transmit a frame.
*/ int
nppp_send_pkt(PCALLINFO lpCall, Link_CB_t *p_link,
    GCAPACKET *p_pkt, u16 pid)
{
    if (p_pkt == NULL)
        return -1;

if ((pid == PPP_BR_PID) || (pid == PPP_BPDU_PID))
    {
        /*
        ** Make sure the packet is the minimum Ether Pkt size (60 bytes)
        */
        if (p_pkt->uLength < 60)
            p_pkt->uLength = 60;
    }

/* let this function do the compressing, splitting, and spitting */
    nppp_send_frames(lpCall, p_link, p_pkt, pid);
    return 0;
}

/*
*    nppp_send_frames   - Split the data packet to be sent over PPP
*                         into multiple PPP frames.
*/ void
nppp_send_frames(PCALLINFO lpCall, Link_CB_t *p_link,
    GCAPACKET *p_pkt, u16 pid)
{
    PPP_CB_t        *p_ncb = &(lpCall->pppp);      /*   NPPP CB   */
```

```
GCAPACKET          *p_tx_pkt;
u8                 *p_packet;
u8                 *p_compData;
u8                 *CopyPtr;
u16                *p_coherency;
u16                pkt_len;
unsigned long      compressedLength;
unsigned short     stac_cmp_return;
u8                 ms_cmp_return;
u8                 num_frames, idx;
u16                equal_frame_len, last_frame_len, length;
u8                 *p_shortpid;
u16                *p_longpid;
u32                long_pkt_len;
char               *p_histnum;
u16                min_len;
u16                num_links;
u32                mpp_seqnum;
u8                 flags;
int                adjust_fwd;
u16                original_pid = pid;
u16                original_pkt_len;
u16                pkt_lcb;
int                i;
u8                 *p_byte;
u16                *p_u16;
char               *p_data;
S_PPPHDR           *p_ppphdr;
S_MPPHDR           *p_mpphdr;

/* Set up default packet length */
pkt_len = original_pkt_len = p_pkt->uLength;

/* Point to past end of pkt */
CopyPtr = ((u8 *)GET_DATA_PTR(p_pkt)) + pkt_len;

/*
** Compress the data if capable.
*/

/* If (connection has negotiated compression) and (PID is a datagram) */
if (p_ncb->compression.compressing && ((pid & 0xff00) == 0))
{
    /*
    ** Before we compress, we must prepend the PID to the packet.
    */ switch(p_ncb->compression.algorithm)
    {
    case COMPRESS_STAC:
        p_shortpid = (u8 *) GET_DATA_PTR(p_pkt);
        p_shortpid--;            /* back up getting ready for prepend */

*p_shortpid = pid & 0xff;   /* spec says to ALWAYS compress PID */ p_packet = p_shortpid;
        p_compData = compressed_data;

/****
        ** NOTE: call function to compress pkt for STAC Compression
        ** algorithm.  Since the STAC Compression scheme is not
        ** intellectual property of USR, we cannot reveal information
        ** pertaining to it in this patent application.
        ****/

/* ... INSERT FUNCTION CALL HERE ... */
        /* (stac_cmp_return = compress packet with STAC Compression) */

/* if (we compressed the packet) */
        if (stac_cmp_return == COMPRESS_OKAY)
        {
            pkt_len    = compressedLength;
            CopyPtr    = compressed_data + pkt_len;    /* end of pkt */ pid = PPP_C_PID;    /* reflect that this is a compressed pkt */
```

```
    }
    else
    {
        /*
        ** if we did not compress, copyptr is already initialized.
        ** and len is unchanged.
        */
    }
    break;
case COMPRESS_MICROSOFT:
    p_longpid = (u16 *) GET_DATA_PTR(p_pkt);
    p_longpid--;         /* back up getting ready for prepend */

*p_longpid = swap16(pid);

p_packet = (u8 *)p_longpid;

long_pkt_len = pkt_len + sizeof(u16); /* add pid to compress size */

/****
    ** NOTE: call function to compress pkt for Microsoft Compression
    ** algorithm.  Since the Microsoft Compression scheme is not
    ** intellectual property of USR, we cannot reveal information
    ** pertaining to it in this patent application.
    ****/

/* ... INSERT FUNCTION CALL HERE ... */
    /* (ms_cmp_return = compress packet with Microsoft Compression) */

/* if (we compressed the packet) */
    if ((ms_cmp_return & PACKET_COMPRESSED) == PACKET_COMPRESSED)
    {
        /* adjust the prim buffer pkt offset */
        /* (put in the PPP header) */
        PUT_DATA_OFF(p_pkt, (GET_DATA_OFF(p_pkt) - sizeof(u16)));

pkt_len     = long_pkt_len;
        CopyPtr     = p_packet + pkt_len;   /* end of pkt */ pid = PPP_C_PID;    /* reflect that this is a compressed pkt */
    }
    else
    {
        /*
        ** if we did not compress, copyptr is already initialized.
        ** and len is unchanged.
        */
    }
    break;
case COMPRESS_ASCEND:
    p_packet = (u8 *) GET_DATA_PTR(p_pkt);
    p_compData = compressed_data;

/* before we compress this packet, we need to calculate the */
    /* 2-byte LCB. */
    for (i = 0, pkt_lcb = 0xffff, p_byte = p_packet;
         i < p_pkt->uLength; i++)
    {
        pkt_lcb ^= *p_byte++;
    }

/****
    ** NOTE: call function to compress pkt for STAC Compression
    ** algorithm.  Since the STAC Compression scheme is not
    ** intellectual property of USR, we cannot reveal information
    ** pertaining to it in this patent application.
    ****/

/* ... INSERT FUNCTION CALL HERE ... */
    /* (stac_cmp_return = compress packet with STAC Compression) */

/* if (we compressed the packet) */
    if (stac_cmp_return == COMPRESS_OKAY)
    {
        /* stuff in the 2-byte LCB at the end of the compressed pkt */
```

```
            p_u16 = (u16 *)(compressed_data + compressedLength);
            *p_u16 = pkt_lcb;
            compressedLength += sizeof(u16);

pkt_len         = compressedLength;
            CopyPtr         = compressed_data + pkt_len;     /* end of pkt */ pid = PPP_C_PID;    /* reflect that this is a compressed pkt */
        }
        else
        {
            /*
            ** if we did not compress, copyptr is already initialized.
            ** and len is unchanged.
            */
        }
        break;
    }
} /* if (connection is using compression) */

/*
** At this point, we have a data pkt that is ready to be split up
** into multiple fragments, be framed, then shipped.
**
** Set up the default number of links, then make the various checks
** that might override this default.
*/ if (lpCall->num_links == 0)
    num_links = 1;
else
    num_links = lpCall->num_links;

/* Is this a Control Protocol? If so, do not split it. */
if ((pid & 0xff00) != 0)
    num_links = 1;              /* Not allowed to split packets */

/* Has the user explicitly said no pkt splitting? */ if (!SplitPkts)
{
    num_links = 1;              /* Not allowed to split packets */
}

/* now that we handled any compression, see how many links we can */
/* the data over */
while (num_links)
{
    min_len = num_links * 60;
    if (pkt_len >= min_len)
        break;

num_links--;
} if (num_links > 1)
{
    num_frames = num_links;
    equal_frame_len = pkt_len / num_frames;
    last_frame_len = equal_frame_len + (pkt_len % num_frames);
}
else
{
    num_frames = 1;
    last_frame_len = equal_frame_len = pkt_len;
}

/* Loop through the fragments, building the individual frames */
for (idx = num_frames, mpp_seqnum = p_ncb->mpp_seqnum + idx - 1; idx; idx--)
{
    /* On the first fragment (last sent), re-use the original buffer */
    if (idx == 1)
    {
        /* point to the original buffer */
        p_tx_pkt = p_pkt;
```

```
        length = equal_frame_len;
    }
    else    /* not the last fragment */
    {
        /* if this is the last frame (first to send) */
        if ((idx == num_frames) && (last_frame_len != 0))
            length = last_frame_len;
        else
            length = equal_frame_len;

/* get ASI header */
        p_tx_pkt = ppp_get_pkt();

if (p_tx_pkt == NULL)
        {
            /* dropping this fragment */

/* if this was going over MPP, we need to bump the */
            /* sequence number so that the far end will see a */
            /* hole in the sequencing (representing this dropped pkt) */
            if ((lpCall->IscCallData.dwEncapsulation == PPPML_EMULATION)
                && ((pid & 0xff00) == 0))
            {
                p_ncb->mpp_seqnum++;
                mpp_seqnum--;
            }
            continue;
        }
    }

/* Fill in or update this frames vitals */
    p_data = (char *)GET_DATA_PTR(p_tx_pkt);

/* Adjust ptr of where to copy from */
    CopyPtr -= length;

/* Copy in the data */
    memcpy(p_data, CopyPtr, length);

/* Set or update the length field for this frame */
    p_tx_pkt->uLength = length;

/* before we encapsulate with MPP or PPP header, we need to */
    /* compensate for any additional compression header stuffing. */
    if ((idx == 1) && (pid == PPP_C_PID))
    {
        switch(p_ncb->compression.algorithm)
        {
        case COMPRESS_STAC:
            if (p_ncb->ccp_num_hists)
            {
                /* adjust the prim buffer pkt offset */
                /* (put in the PPP header) */
                PUT_DATA_OFF(p_tx_pkt,
                    (GET_DATA_OFF(p_tx_pkt) - sizeof(u8)));

p_histnum = (u8 *)GET_DATA_PTR(p_tx_pkt);

*p_histnum = p_ncb->ccp_num_hists;

p_tx_pkt->uLength += sizeof(u8);
            }
            break;
        case COMPRESS_MICROSOFT:
            /* adjust the prim buffer pkt offset */
            /* (put in the PPP header) */
            PUT_DATA_OFF(p_tx_pkt,
                (GET_DATA_OFF(p_tx_pkt) - sizeof(u16)));

p_coherency = (u16 *)GET_DATA_PTR(p_tx_pkt);

/* build the MS_COMP Bit field (A:B:C:D) and coherency num */
            *p_coherency =
                swap16((u16)(((u16)ms_cmp_return << 8) |
```

```
                p_ncb->mppc_tx_coherency));

/* increment the 12-bit counter and account for wrap */
        /* NOTE: this also clears any FLUSH indicators that may */
        /* have been set from nppp_rcvresetreq(). */
        p_ncb->mppc_tx_coherency = (p_ncb->mppc_tx_coherency + 1) & 0xfff;

p_tx_pkt->uLength += sizeof(u16);
        break;
    case COMPRESS_ASCEND:
        /* adjust the prim buffer pkt offset */
        /* (put in the PPP header) */
        PUT_DATA_OFF(p_tx_pkt,
            (GET_DATA_OFF(p_tx_pkt) - sizeof(u16) - sizeof(u16)));

p_u16 = (u16 *)GET_DATA_PTR(p_tx_pkt);

*p_u16++ = swap16(original_pid);
        *p_u16 = swap16(original_pkt_len);

p_tx_pkt->uLength += sizeof(u16) + sizeof(u16);
        break;
    }
}

/* should we send this packet out over MPP or just PPP ? */
if (((lpCall->IscCallData.dwEncapsulation == PPPML_EMULATION) &&
    ((pid & 0xff00) == 0)))
{
    /* build the flags field for MPP */
    flags = 0;
    if (idx == num_frames)
        flags |= MPP_END_PKT;
    if (idx == 1)
        flags |= MPP_BEGIN_PKT;

/* now that we know it is MPP, is this the first */
    /* within the packet? If so, prepend a MPP and PPP header */
    /* to it, else just prepend a MPP header to it. */
    if (flags & MPP_BEGIN_PKT)
    {
        /* adjust the prim buffer pkt offset */
        /* (put in the MPP header) */
        PUT_DATA_OFF(p_tx_pkt,
            (GET_DATA_OFF(p_tx_pkt) -
             MPP_HDRLEN - (PPP_HDRLEN - 3)));

p_mpphdr = (S_MPPHDR *) GET_DATA_PTR(p_tx_pkt);

p_mpphdr->addr = HDLC_ALL_ADDR;
        p_mpphdr->control = HDLC_UI;
        p_mpphdr->pid = swap16(PPP_MPP_PID);
        p_mpphdr->flags = flags;
        p_mpphdr->seqhi = (u8)(mpp_seqnum >> 16);
        p_mpphdr->seqlo = swap16((u16)(mpp_seqnum & 0xffff));

/* no need to modulo this since high byte is no care */
        /* trust me, it will take care of itself */
        p_ncb->mpp_seqnum++;
        mpp_seqnum--;

/* Note: we are backing up 1 byte to overlay the PPP */
        /*       header into the MPP header. The 1 byte */
        /*       is due to the fact that the PPP framing */
        /*       is NOT included in the PPP header */
        p_shortpid = (u8 *)(p_mpphdr + 1);

*p_shortpid = pid & 0xff;

p_tx_pkt->uLength += MPP_HDRLEN + (PPP_HDRLEN-3);
    }
    else
    {
        /* adjust the prim buffer pkt offset */
        /* (put in the MPP header) */
```

```
            PUT_DATA_OFF(p_tx_pkt, (GET_DATA_OFF(p_tx_pkt) - MPP_HDRLEN));

p_mpphdr = (S_MPPHDR *) GET_DATA_PTR(p_tx_pkt);

p_mpphdr->addr = HDLC_ALL_ADDR;
            p_mpphdr->control = HDLC_UI;
            p_mpphdr->pid = swap16(PPP_MPP_PID);
            p_mpphdr->flags = flags;
            p_mpphdr->seqhi = (u8)(mpp_seqnum >> 16);
            p_mpphdr->seqlo = swap16((u16)(mpp_seqnum & 0xffff));

/* no need to modulo this since high byte is no care */
            /* trust me, it will take care of itself */
            p_ncb->mpp_seqnum++;
            mpp_seqnum--;

p_tx_pkt->uLength += MPP_HDRLEN;
        }
    }
    else
    {
        /* adjust the prim buffer pkt offset */
        /* (put in the PPP header) */
        PUT_DATA_OFF(p_tx_pkt, (GET_DATA_OFF(p_tx_pkt) - PPP_HDRLEN));

p_ppphdr = (S_PPPHDR *) GET_DATA_PTR(p_tx_pkt);

p_ppphdr->addr = HDLC_ALL_ADDR;
        p_ppphdr->control = HDLC_UI;
        p_ppphdr->pid = swap16(pid);

p_tx_pkt->uLength += PPP_HDRLEN;
    }

/* now handle AC and/or Proto Compress */
    if (pid != PPP_LCP_PID)
    {
        adjust_fwd = 0;

/* if AC comp, bump up the ptrs and decrement the ctrs */
        if (p_ncb->tx_ac_comp)
            adjust_fwd += 2;

/* if PROTO comp, bump up the ptrs and decrement the ctrs */
        if ((p_ncb->tx_proto_comp) && ((pid & 0xff00) == 0))
            adjust_fwd++;

switch(adjust_fwd)
        {
        case 1:         /* Protocol Compression */
            /* adjust the prim buffer pkt offset */
            /* (take out the AC fields) */
            PUT_DATA_OFF(p_tx_pkt, (GET_DATA_OFF(p_tx_pkt) + 1));

p_tx_pkt->uLength -= 1;

/* move Addr/Ctrl up */
            p_byte = (u8 *)GET_DATA_PTR(p_tx_pkt);
            *p_byte = HDLC_ALL_ADDR;
            p_byte++;
            *p_byte = HDLC_UI;
            break;
        case 2:         /* AC Compression */
            /* adjust the prim buffer pkt offset */
            /* (take out the AC fields) */
            PUT_DATA_OFF(p_tx_pkt, (GET_DATA_OFF(p_tx_pkt) + 2));

p_tx_pkt->uLength -= 2;
            break;
        case 3:         /* AC and Protocol Compression */
            /* adjust the prim buffer pkt offset */
            /* (take out the AC fields) */
            PUT_DATA_OFF(p_tx_pkt, (GET_DATA_OFF(p_tx_pkt) + 3));

p_tx_pkt->uLength -= 3;
```

```
            break;
        }
    }

/*
    ** Now we have the fragment fully encapsulated, ship it
    */

/* bump DC stats */
    p_ncb->tx_frames++;
    p_ncb->tx_bytes += p_tx_pkt->uLength;
    p_ncb->tx_delta_bytes += p_tx_pkt->uLength;

/* if it is NULL here, we have a data packet */
    if (p_link == NULL)
        p_link = nppp_get_next_link(lpCall, TRUE);

/* if it still is NULL, we be screwed... */
    if (p_link == NULL)
    {
        /* get rid of the pbf data pkt since it is not going out */
        ppp_rls_pkt(p_tx_pkt, 5);
    }
    else
    {
        /* get out of my yard you miserable dog... */
        L1_TransmitPacket(p_tx_pkt, lpCall, p_link->user_sess_id);

/* This will cause us to cycle thru to the next active link */
        p_link = NULL;
    }
    }
}

/*
*    nppp_rx_frame - Receive a frame from a link
*/
void
nppp_rx_frame(PCALLINFO lpCall, Link_CB_t *p_link, GCAPACKET *p_frame)
{
    PPP_CB_t        *p_ncb = &(lpCall->ppp);       /*    NPPP CB    */
    S_PPPHDR        *p_ppphdr;
    u8              *p_byte;
    int             adjust_back;

p_ppphdr = (S_PPPHDR *)(GET_DATA_PTR(p_frame));

/* bump stats */
    p_ncb->rx_frames++;
    p_ncb->rx_bytes += p_frame->uLength;
    p_ncb->rx_delta_bytes += p_frame->uLength;
    p_ncb->rx_packets++;

/* if necessary, rebuild the received pkt PPP header. Influencing */
    /* parameters can be AC_Compression and Protocol_Compression. */
    p_byte = (u8 *)p_ppphdr;
    adjust_back = 0;

/* adjust for AC Compression */
    if ((*p_byte == HDLC_ALL_ADDR) && (*(p_byte+1) == HDLC_UI))
        p_byte += 2;           /* bump past the addr/ctrl fields */
    else
        adjust_back += 2;

/* adjust for Proto Compression */
    if (*p_byte & 1)
        adjust_back++;

PUT_DATA_OFF(p_frame, (GET_DATA_OFF(p_frame) - adjust_back));
    p_frame->uLength += adjust_back;

p_byte = (u8 *)p_ppphdr;
    p_ppphdr = (S_PPPHDR *)(p_byte - adjust_back);
```

```c
/* at this point, we know how far back to go, so do it.... */
switch (adjust_back)
{
case 2:          /* AC Compression */
    p_ppphdr->addr = HDLC_ALL_ADDR;
    p_ppphdr->control = HDLC_UI;
    break;
case 1:          /* Protocol Compression */
case 3:          /* AC and Protocol Compression */
    p_ppphdr->addr = HDLC_ALL_ADDR;
    p_ppphdr->control = HDLC_UI;
    p_byte = (u8 *)&p_ppphdr->pid;
    *p_byte = 0;
    break;
}

/* Now we have a PPP packet.  Make sure: */
/*       1) packet is not too short      */
/*       2) make sure that ADDR=0xff     */
/*       3) make sure that CTRL=3        */
/*       4) make sure that PROT is odd   */
if ((p_frame->uLength <= PPP_HDRLEN) ||
    (p_ppphdr->addr != HDLC_ALL_ADDR) ||
    (p_ppphdr->control != HDLC_UI) ||
    ((swap16(p_ppphdr->pid) & 1) == 0))
{
    ppp_rls_pkt(p_frame, 0);
    return;
}

/*
** Processing is dependent upon MPP or PPP framing
*/ if (swap16(p_ppphdr->pid) == PPP_MPP_PID)
    nppp_rx_mpp_frame(lpCall, p_link, p_frame);
else
    nppp_rx_pkt(lpCall, p_link, p_frame);
}

/*
*   nppp_rx_pkt - Process a received packet
*/ void
nppp_rx_pkt(PCALLINFO lpCall, Link_CB_t *p_link, GCAPACKET *p_pkt)
{
    PPP_CB_t        *p_ncb = &(lpCall->ppp);      /*  NPPP CB  */
    APPP_CB_t       *p_acb;
    S_CPCTL         *p_lncp = &p_link->a_cpctl[LCP_LAYER];
    S_CPCTL         *p_ipncp, *p_ipacp;
    S_CPCTL         *p_ipxncp, *p_ipxacp;
    S_CPCTL         *p_brncp, *p_bracp;
    S_CPCTL         *p_nbfncp, *p_nbfacp;
    S_PPPHDR        *p_ppphdr;
    GCAPACKET       *p_PR_pkt;
    u8              *p_from;
    u8              *p_to;
    u8              *p_byte;
    u16             pkt_lcb;
    u16             calc_lcb;
    u16             pkt_len;
    u16             i;
    u16             original_pid;
    u16             original_pkt_len;
    u16             coherency;
    u8              adjust_back;
    s16             numbytes;
    unsigned long   destCount;
    unsigned long   length_of_data;
    unsigned short  stac_cmp_return;
    u8              *p_decompBuffer;
    u8              *p_compData;
    u8              *p_data;
```

```
p_ppphdr = (S_PPPHDR *)(GET_DATA_PTR(p_pkt));
/*
** Do we need to decompressing the packet?
*/
if (swap16(p_ppphdr->pid) == PPP_C_PID)
{
    /*
    ** if (connection has negotiated compression)
    */ if (p_ncb->compression.compressing)
    {
        switch(p_ncb->compression.algorithm)
        {
        case COMPRESS_STAC:
            /* If we are paused for a RESET_ACK, send a new RESET_REQ */
            /* with the saved ID and drop the rx'd pkt */
            if (p_ncb->stac_decomp_paused_id)
            {
                nppp_sendresetreq(lpCall, p_link, CCP_LAYER);

ppp_rls_pkt(p_pkt, 1);
                return;
            }

/*
            ** Initialize the decompression variables
            */ p_decompBuffer    = decompression_buffer;
            destCount         = MAX_FRAME_LENGTH;
            length_of_data    = MAX_FRAME_LENGTH;

/*
            ** We now need to determine where the compressed data starts
            */ p_compData        = (u8 *)(p_ppphdr + 1);
            pkt_len           = p_pkt->uLength - PPP_HDRLEN;

if (p_ncb->ccp_num_hists)
            {
                /* gosh, if we are supporting 1:1 compression, the */
                /* history value really should be 1. */
                if (*p_compData != p_ncb->ccp_num_hists)
                {
                    ppp_rls_pkt(p_pkt, 1);
                    return;
                } p_compData++;
                pkt_len--;
            }

/****
            ** NOTE: call function to decompress pkt for STAC
            ** Decompression algorithm.  Since the STAC
            ** Decompression scheme is not intellectual property
            ** of USR, we cannot reveal information pertaining to
            ** it in this patent application.
            ****/

/* decompress packet with STAC Decompression */
            /* (stac_cmp_return = decompress pkt with STAC Compression) */

/*
            ** If we are here, we are either going to use a new set
            ** of buffers or we are going to release the received pkt
            ** buffers.  Do it here in a common place.
            */
            ppp_rls_pkt(p_pkt, 1);

if (stac_cmp_return != COMPRESS_OKAY)
```

```
    {
        nppp_sendresetreq(lpCall, p_link, CCP_LAYER);
        return;
    }
    /*
    ** Copy the decompressed info out of the decomp buffer
    ** so that we can massage it then pass it up to the user.
    */

/*** TAKE HEED: We are about to reuse p_pkt **/

/* Get packet for copying out the decompressed data into */
    if ((p_pkt = ppp_get_pkt()) == NULL)
        return;

p_pkt->uLength = length_of_data;

p_data = (char *)GET_DATA_PTR(p_pkt);

memcpy(p_data, decompression_buffer, length_of_data);

/*
    ** Determine how many bytes we need to back up before prepending
    ** the PPP Header.
    */

/* we know at a minimum that we need to prepend the address */
    /* and control bytes to the PPP header */
    adjust_back = 2;

/*
    ** Prepend framing portion of PPP Header to pkt (back to front).
    ** Take into account that the PID might be compressed (short).
    */

/* LSBit is set if last octet in PID */
    if (*p_data & 1)
        adjust_back++;

/* make this look exactly like a PPP pkt */
    p_ppphdr = (S_PPPHDR *)(p_data - adjust_back);
    p_ppphdr->addr = HDLC_ALL_ADDR;
    p_ppphdr->control = HDLC_UI;
    p_data = (u8 *)(&p_ppphdr->pid);
    *p_data = 0;                /* this doesn't hurt in either case */

PUT_DATA_OFF(p_pkt, (GET_DATA_OFF(p_pkt) - adjust_back));
    p_pkt->uLength += adjust_back;

/* Reset PPP Header Ptr */
    p_ppphdr = (S_PPPHDR *)(GET_DATA_PTR(p_pkt));
    break;
case COMPRESS_MICROSOFT:
    /*
    ** We now need to extract the coherency information from
    ** the start of the packet.
    */ p_compData      = (u8 *)(p_ppphdr + 1);
    pkt_len         = p_pkt->uLength - PPP_HDRLEN;

coherency = swap16(*((u16 *)p_compData));
    p_compData += 2;
    pkt_len -= 2;

/* if the dictionary was flushed, blindly accept the */
    /* TX_coherency count, flush the dictionary, and decompress */
    if (coherency & CCP_A_FLUSHED)
    {
        /* bump the next expected RX_Coherency cnt */
        p_ncb->mppc_rx_coherency =
            (coherency + 1) & CCP_COHERENCY_BITS;
    }
    else    /* the RX and TX coherency counts must match */
```

```
{
    if (p_ncb->mppc_rx_coherency !=
        (coherency & CCP_COHERENCY_BITS))
    {
        /* Release the received pkt buffers. */
        ppp_rls_pkt(p_pkt, 1);

/* send out CCP_ResetReq */
        nppp_sendresetreq(lpCall, p_link, CCP_LAYER);

return;
    }
    else
    {
        /* bump the next expected RX_Coherency cnt */
        p_ncb->mppc_rx_coherency =
            (p_ncb->mppc_rx_coherency + 1) & CCP_COHERENCY_BITS;
    }
}

/*
** since we currently don't supported encrypted pkts, we
** must drop it if we get one.
*/
if (coherency & CCP_D_PKTENCRYPTED)
{
    /* Release the received pkt buffers. */
    ppp_rls_pkt(p_pkt, 1);
    return;
}

/*
** Now make sure that the compress bits indicate that the
** packet has been compressed (this is the most flexible
** way to code it).
*/
if (coherency & CCP_C_PKTCOMPRESSED)
{
    p_decompBuffer   = decompression_buffer;

/****
    ** NOTE: call function to decompress pkt for Microsoft
    ** Decompression algorithm.  Since the Microsoft
    ** Decompression scheme is not intellectual property
    ** of USR, we cannot reveal information pertaining to
    ** it in this patent application.
    ****/

/* decompress packet with Microsoft Decompression */
    /* ... INSERT FUNCTION CALL HERE ... */

/*
    ** If we are here, we are either going to use a new set
    ** of buffers or we are going to release the received pkt
    ** buffers.  Do it here in a common place.
    */
    ppp_rls_pkt(p_pkt, 1);

/** TAKE HEED: We are about to reuse p_pkt **/

/* Get packet for copying out the decompressed data into */
    if ((p_pkt = ppp_get_pkt()) == NULL)
        return;

p_pkt->uLength = length_of_data;

p_data = (char *)GET_DATA_PTR(p_pkt);

memcpy(p_data, p_decompBuffer, length_of_data);
}
else
{
    /*
    ** for some reason, this packet came in under the CCP
    ** PID but neither the compress or encrypted bit was
```

```
         ** set.  Set the variables that will be used by the
         ** common code below.
         **
         ** For common processing, set the current app ptr
         ** to point past the PPP hdr and Coherency cntr and
         ** adjust the data length as well.
         */

PUT_DATA_OFF(p_pkt,
             (GET_DATA_OFF(p_pkt) + (p_pkt->uLength - pkt_len)));

p_pkt->uLength = pkt_len;

p_data = (char *)GET_DATA_PTR(p_pkt);
     }

/*
     ** Determine how many bytes we need to back up before
     ** prepending the PPP Header.
     */

/* we know at a minimum that we need to prepend the */
     /* address and control bytes to the PPP header */
     adjust_back = 2;

/*
     ** Prepend framing portion of PPP Header to pkt (back to
     ** front).  Take into account that the PID might be
     ** compressed (short).
     */

/* LSBit is set if last octet in PID */
     if (*p_data & 1)
         adjust_back++;

/* make this look exactly like a PPP pkt */
     p_ppphdr = (S_PPPHDR *)(p_data - adjust_back);
     p_ppphdr->addr = HDLC_ALL_ADDR;
     p_ppphdr->control = HDLC_UI;
     p_data = (u8 *)(&p_ppphdr->pid);
     *p_data = 0;            /* this doesn't hurt in either case */

PUT_DATA_OFF(p_pkt, (GET_DATA_OFF(p_pkt) - adjust_back));
     p_pkt->uLength += adjust_back;

/* Reset PPP Header Ptr */
     p_ppphdr = (S_PPPHDR *)(GET_DATA_PTR(p_pkt));
     break;
case COMPRESS_ASCEND:
     /*
     ** Initialize the decompression variables
     */ p_decompBuffer     = decompression_buffer;
     destCount          = MAX_FRAME_LENGTH;
     length_of_data     = MAX_FRAME_LENGTH;

/*
     ** We now need to determine where the compressed data starts
     */ p_compData         = (u8 *)(p_ppphdr + 1);
     pkt_len            = p_pkt->uLength - PPP_HDRLEN;

/* get then bump passed the pkt PID */
     original_pid = swap16(*((u16 *)p_compData));
     p_compData += sizeof(u16);
     pkt_len    -= sizeof(u16);

/* get then bump passed the uncompressed packet length */
     original_pkt_len = swap16(*((u16 *)p_compData));
     p_compData += sizeof(u16);
     pkt_len    -= sizeof(u16);

/*
```

```
** Before we decompress the pkt, we need to extract the LCB
** from the end of the received pkt.  In addition, we need
** to adjust the pkt_len so that the LCB bytes (last 2-bytes)
** are not treated as compressed data.
*/ pkt_lcb =
    swap16(*((u16 *)(p_compData + pkt_len - sizeof(u16))));
pkt_len  -= sizeof(u16);

/****
** NOTE: call function to decompress pkt for STAC Decompression
** algorithm.  Since the STAC Decompression scheme is not
** intellectual property of USR, we cannot reveal information
** pertaining to it in this patent application.
****/

/* ... INSERT FUNCTION CALL HERE ... */
/* (stac_cmp_return = decompress pkt with STAC Compression) */

/*
** If we are here, we are either going to use a new set
** of buffers or we are going to release the received pkt
** buffers.  Do it here in a common place.
*/
ppp_rls_pkt(p_pkt, 1);

if (stac_cmp_return != COMPRESS_OKAY)
    return;

/*
** make sure the pkt len passed in front of the compressed
** packet matches the decompressed length.
*/ if (length_of_data != original_pkt_len)
    return;

/*
** Now calculate and compare the LCB to make sure that we match.
*/ for (i = 0, calc_lcb = 0xffff, p_byte = decompression_buffer;
     i < length_of_data; i++)
{
    calc_lcb ^= *p_byte++;
}

/*
** Copy the decompressed info out of the decomp buffer
** so that we can massage it then pass it up to the user.
*/

/** TAKE HEED: We are about to reuse p_pkt **/

/* Get packet for copying out the decompressed data into */
if ((p_pkt = ppp_get_pkt()) == NULL)
    return;

p_pkt->uLength = length_of_data;

p_data = (char *)GET_DATA_PTR(p_pkt);

memcpy(p_data, decompression_buffer, length_of_data);

/*
** Determine how many bytes we need to back up before prepending
** the PPP Header.
*/

/* we know that we need to prepend the PPP header */
adjust_back = PPP_HDRLEN;

/*
** Prepend framing portion of PPP Header to pkt (back to front).
```

```
             ** Take into account that the PID might be compressed (short).
             */

/* make this look exactly like a PPP pkt */
             p_ppphdr = (S_PPPHDR *)(p_data - adjust_back);
             p_ppphdr->addr = HDLC_ALL_ADDR;
             p_ppphdr->control = HDLC_UI;
             p_ppphdr->pid = swap16(original_pid);

PUT_DATA_OFF(p_pkt, (GET_DATA_OFF(p_pkt) - adjust_back));
             p_pkt->uLength += adjust_back;

/* Reset PPP Header Ptr */
             p_ppphdr = (S_PPPHDR *)(GET_DATA_PTR(p_pkt));
             break;
         }
      }
  }

/*
  ** Finally, we are down to a contiguous, non-compressed PPP pkt,
  ** process it as such.
  */ switch (swap16(p_ppphdr->pid))
  {
  case PPP_BR_PID:       /* Bridge Data Packet */
  case PPP_BPDU_PID:     /* BPDU */
      p_brncp = &p_link->a_cpctl[BRCP_LAYER];
      p_bracp = &lpCall->appp.a_cpctl[BRCP_LAYER];

if (p_brncp->cpstate != CP_OPEN)
      {
          ppp_rls_pkt(p_pkt, 1);
          break;
      } if (p_bracp->cpstate != CP_OPEN)
      {
          ppp_rls_pkt(p_pkt, 1);
          break;
      }

/* since the App side is guaranteed to be only talking PPP */
      /* (not PPPML), the packet is ready for delivery.  Isn't it */
      /* nice that we don't have any sequence numbers in the pkt */
      /* to contend with!  We are merely a conduit here. */

/* Enqueue the frame to the rx data queue */
      L4_PlacePacketOnRing(lpCall, (void *)GET_DATA_PTR(p_pkt),
          p_pkt->uLength);
      ppp_rls_pkt(p_pkt, 2);
      break;

case PPP_IP_PID:       /* IP Data Packet */
      p_ipncp = &p_link->a_cpctl[IPCP_LAYER];
      p_ipacp = &lpCall->appp.a_cpctl[IPCP_LAYER];

if (p_ipncp->cpstate != CP_OPEN)
      {
          ppp_rls_pkt(p_pkt, 3);
          break;
      } if (p_ipacp->cpstate != CP_OPEN)
      {
          ppp_rls_pkt(p_pkt, 3);
          break;
      }

/* since the App side is guaranteed to be only talking PPP */
      /* (not PPPML), the packet is ready for delivery.  Isn't it */
      /* nice that we don't have any sequence numbers in the pkt */
      /* to contend with!  We are merely a conduit here. */
```

```
        /* Enqueue the frame to the rx data queue */
        L4_PlacePacketOnRing(lpCall, (void *)GET_DATA_PTR(p_pkt),
            p_pkt->uLength);
        ppp_rls_pkt(p_pkt, 2);
        break;

case PPP_IPX_PID:       /* IPX Data Packet */
        p_ipxncp = &p_link->a_cpctl[IPXCP_LAYER];
        p_ipxacp = &lpCall->appp.a_cpctl[IPXCP_LAYER];

if (p_ipxncp->cpstate != CP_OPEN)
        {
            ppp_rls_pkt(p_pkt, 3);
            break;
        } if (p_ipxacp->cpstate != CP_OPEN)
        {
            ppp_rls_pkt(p_pkt, 3);
            break;
        }

/* since the App side is guaranteed to be only talking PPP */
        /* (not PPPML), the packet is ready for delivery. Isn't it */
        /* nice that we don't have any sequence numbers in the pkt */
        /* to contend with! We are merely a conduit here. */

/* Enqueue the frame to the rx data queue */
        L4_PlacePacketOnRing(lpCall, (void *)GET_DATA_PTR(p_pkt),
            p_pkt->uLength);
        ppp_rls_pkt(p_pkt, 2);
        break;

case PPP_NBF_PID:       /* Netbios Data Packet */
        p_nbfncp = &p_link->a_cpctl[NBFCP_LAYER];
        p_nbfacp = &lpCall->appp.a_cpctl[NBFCP_LAYER];

if (p_nbfncp->cpstate != CP_OPEN)
        {
            ppp_rls_pkt(p_pkt, 1);
            break;
        } if (p_nbfacp->cpstate != CP_OPEN)
        {
            ppp_rls_pkt(p_pkt, 1);
            break;
        }

/* since the App side is guaranteed to be only talking PPP */
        /* (not PPPML), the packet is ready for delivery. Isn't it */
        /* nice that we don't have any sequence numbers in the pkt */
        /* to contend with! We are merely a conduit here. */

/* Enqueue the frame to the rx data queue */
        L4_PlacePacketOnRing(lpCall, (void *)GET_DATA_PTR(p_pkt),
            p_pkt->uLength);
        ppp_rls_pkt(p_pkt, 2);
        break;

case PPP_LCP_PID:       /* Link Control Protocol */
        /* subtract PPP Header from packet length (total bytes in pkt) */
        p_pkt->uLength -= PPP_HDRLEN;

nppp_proc(lpCall, p_link, LCP_LAYER, p_pkt);
        break;

case PPP_CHAP_PID:      /* Challenge Handshake Authentication Protocol */
        if (p_lncp->cpstate != CP_OPEN)
        {
            ppp_rls_pkt(p_pkt, 6);
            break;
        }

/* subtract PPP Header from packet length (total bytes in pkt) */
```

```
        p_pkt->uLength -= PPP_HDRLEN;

nppp_chap_proc(lpCall, p_link, CHAP_LAYER, p_pkt);
        break;

case PPP_PAP_PID:     /* Password Authentication Protocol */
        if (p_lncp->cpstate != CP_OPEN)
        {
            ppp_rls_pkt(p_pkt, 7);
            break;
        }

/* subtract PPP Header from packet length (total bytes in pkt) */
        p_pkt->uLength -= PPP_HDRLEN;

nppp_pap_proc(lpCall, p_link, PAP_LAYER, p_pkt);
        break;

case PPP_BRCP_PID:    /* Bridge Control Protocol */

/* do not act on this packet unless the Net LCP is Open. */
        if (p_lncp->cpstate != CP_OPEN)
        {
            ppp_rls_pkt(p_pkt, 7);
            break;
        }

/* if we are not configured to support Bridging, drop the pkt */
        if (!(p_ncb->protocols & PPP_PROT_BR))
        {
            ppp_rls_pkt(p_pkt, 7);
            break;
        } p_acb = &(lpCall->appp);        /*   APPP CB   */

/* Before we respond to this request, the state of the combined */
        /* state machines must have advanced to the point that this NCP */
        /* is at least NCP_STARTED. */
        if (p_acb->a_emstates[BRCP_LAYER] < EM_NETCP_STARTED)
        {
            ppp_rls_pkt(p_pkt, 7);
            break;
        }

/* subtract PPP Header from packet length (total bytes in pkt) */
        p_pkt->uLength -= PPP_HDRLEN;

nppp_proc(lpCall, p_link, BRCP_LAYER, p_pkt);
        break;

case PPP_IPCP_PID:    /* IP Control Protocol */

/* do not act on this packet unless the Net LCP is Open. */
        if (p_lncp->cpstate != CP_OPEN)
        {
            ppp_rls_pkt(p_pkt, 7);
            break;
        }

/* if we are not configured to support IP, drop the pkt */
        if (!(p_ncb->protocols & PPP_PROT_IP))
        {
            ppp_rls_pkt(p_pkt, 7);
            break;
        } p_acb = &(lpCall->appp);        /*   APPP CB   */

/* Before we respond to this request, the state of the combined */
        /* state machines must have advanced to the point that this NCP */
        /* is at least NCP_STARTED. */
        if (p_acb->a_emstates[IPCP_LAYER] < EM_NETCP_STARTED)
        {
            ppp_rls_pkt(p_pkt, 7);
```

```
            break;
        }

/* subtract PPP Header from packet length (total bytes in pkt) */
        p_pkt->uLength -= PPP_HDRLEN;

nppp_proc(lpCall, p_link, IPCP_LAYER, p_pkt);
        break;

case PPP_IPXCP_PID:    /* IPX Control Protocol */

/* do not act on this packet unless the Net LCP is Open. */
        if (p_lncp->cpstate != CP_OPEN)
        {
            ppp_rls_pkt(p_pkt, 7);
            break;
        }

/* if we are not configured to support IPX, drop the pkt */
        if (!(p_ncb->protocols & PPP_PROT_IPX))
        {
            ppp_rls_pkt(p_pkt, 7);
            break;
        } p_acb = &(lpCall->appp);       /*    APPP CB    */

/* Before we respond to this request, the state of the combined */
        /* state machines must have advanced to the point that this NCP */
        /* is at least NCP_STARTED. */
        if (p_acb->a_emstates[IPXCP_LAYER] < EM_NETCP_STARTED)
        {
            ppp_rls_pkt(p_pkt, 7);
            break;
        }

/* subtract PPP Header from packet length (total bytes in pkt) */
        p_pkt->uLength -= PPP_HDRLEN;

nppp_proc(lpCall, p_link, IPXCP_LAYER, p_pkt);
        break;

case PPP_NBFCP_PID:    /* NetBios Control Protocol */

/* do not act on this packet unless the Net LCP is Open. */
        if (p_lncp->cpstate != CP_OPEN)
        {
            ppp_rls_pkt(p_pkt, 7);
            break;
        }

/* if we are not configured to support NBF, drop the pkt */
        if (!(p_ncb->protocols & PPP_PROT_NBF))
        {
            ppp_rls_pkt(p_pkt, 7);
            break;
        } p_acb = &(lpCall->appp);       /*    APPP CB    */

/* Before we respond to this request, the state of the combined */
        /* state machines must have advanced to the point that this NCP */
        /* is at least NCP_STARTED. */
        if (p_acb->a_emstates[NBFCP_LAYER] < EM_NETCP_STARTED)
        {
            ppp_rls_pkt(p_pkt, 7);
            break;
        }

/* subtract PPP Header from packet length (total bytes in pkt) */
        p_pkt->uLength -= PPP_HDRLEN;

nppp_proc(lpCall, p_link, NBFCP_LAYER, p_pkt);
        break;
```

```
        case PPP_CCP_PID:      /* Compression Control Protocol */

/* do not act on this packet unless the Net LCP is Open. */
            if (p_lncp->cpstate != CP_OPEN)
            {
                ppp_rls_pkt(p_pkt, 9);
                break;
            } p_acb = &(lpCall->appp);        /*    APPP CB    */

/* Before we respond to this request, the state of the CCP */
            /* emulation state machine must have advanced to the point */
            /* that CCP is at least LISTENING. */
            if (p_acb->a_emstates[CCP_LAYER] < EM_LISTENING)
            {
                ppp_rls_pkt(p_pkt, 7);
                break;
            }

/* if we are not configured to support Compression, PROTO REJECT */
            if (!(p_ncb->protocols & PPP_PROT_CCP))
                goto rx_send_proto_rej;

/* subtract PPP Header from packet length (total bytes in pkt) */
            p_pkt->uLength -= PPP_HDRLEN;

nppp_proc(lpCall, p_link, CCP_LAYER, p_pkt);
            break;

default:

rx_send_proto_rej:

/* only send back a PROTO_REJ if LCP is open */
            if (p_lncp->cpstate == CP_OPEN)
            {
                /* subtract PPP Header from packet length (total bytes in pkt) */
                p_pkt->uLength -= PPP_HDRLEN;

/* Get packet for the sending of a PROTOCOL REJECT to peer */
                if ((p_PR_pkt = ppp_get_pkt()) == NULL)
                    break;

/* need to copy info field from RX pkt into PROTO_REJ pkt */
                /* make sure it doesn't exceed max negotiated length */
                p_from = ((u8 *)p_ppphdr) + PPP_HDRLEN;
                p_to = ((u8 *)GET_DATA_PTR(p_PR_pkt)) +
                        PPP_HDRLEN + CNF_HDRLEN;

if (p_pkt->uLength < p_ncb->rem_mru)
                    numbytes = p_pkt->uLength;
                else
                    numbytes = p_ncb->rem_mru;

/* insert rejected-protocol after CNF_HDR */
                *p_to++ = (swap16(p_ppphdr->pid)) >> 8;
                *p_to++ = swap16(p_ppphdr->pid);
                p_PR_pkt->uLength += 2;

/* copy info field */
                for (i = 0; i < numbytes; i++)
                    *p_to++ = *p_from++;
                p_PR_pkt->uLength += numbytes;

nppp_sendreply(lpCall, p_link, LCP_LAYER, p_PR_pkt, PROTO_REJ, 0);
            } ppp_rls_pkt(p_pkt, 10);
            break;
    }
}

/*
 *  nppp_rx_mpp_frame - Process an incoming MPP frame from a link
```

```
*/
void *
nppp_rx_mpp_frame(PCALLINFO lpCall, Link_CB_t *p_link, GCAPACKET *p_frame)
{
    PPP_CB_t        *p_ncb = &(lpCall->ppp);       /*    NPPP CB    */
    S_MPPHDR        *p_mpphdr;
    u16             i, j;
    u32             M;
    u32             tmp_seqnum;
    BOOL            rls_entry;
    GCAPACKET       *p_tmp_frame;
    S_MPPHDR        *p_tmp_mpphdr;
    Link_CB_t       *p_tmplink;
    u16             offset;
    u16             xoffset;

p_mpphdr = (S_MPPHDR *)(GET_DATA_PTR(p_frame));

/* make sure we are capable of receiving MPP packets */
    if (lpCall->IscCallData.dwEncapsulation != PPPML_EMULATION)
    {
        ppp_rls_pkt(p_frame, 1);
        return(NULL);
    }

/****
     * Update most recently received packet for this link.
     ****/ p_link->mrr_seqnum =
        (((u32)p_mpphdr->seqhi) << 16) | ((u32)swap16(p_mpphdr->seqlo));

/****
     * If we are resynchronizing, don't accept anything but a packet begin
     ****/ if (p_ncb->mpp_seq_state == MPP_SEQ_STATE_RESYNC)
    {
        if (p_mpphdr->flags & MPP_BEGIN_PKT)
        {
            p_ncb->mpp_seq_state = MPP_SEQ_STATE_SYNC;
            p_ncb->frame_expected = p_link->mrr_seqnum;
            p_ncb->too_far =
                (p_link->mrr_seqnum + MPP_WINDOW_SIZE) & MPP_MAXSEQ;
        }
        else
        {
            ppp_rls_pkt(p_frame, 1);
            return(NULL);
        }
    }

/****
     * Put packet in the receive window if it'll fit
     ****/ rls_entry = TRUE;

if ((ppp_is_between(p_ncb->frame_expected, p_link->mrr_seqnum,
         p_ncb->too_far))
         && (!p_ncb->arrived[p_link->mrr_seqnum & MPP_WINDOW_SIZE]))
    {
        /* if it could fit in the window, stick it in... */
        offset = p_link->mrr_seqnum & MPP_WINDOW_SIZE;
        p_ncb->arrived[offset] = TRUE;
        p_ncb->Inbuf[offset] = p_frame;         // Save whole message
        rls_entry = FALSE;                      // Don't release it /* perform frame expected alignment to start of packet */
        while(p_ncb->arrived[(offset = p_ncb->frame_expected & MPP_WINDOW_SIZE)])
        {
            p_tmp_frame = p_ncb->Inbuf[offset];
            p_tmp_mpphdr = (S_MPPHDR *)GET_DATA_PTR(p_tmp_frame);
            if (p_tmp_mpphdr->flags & MPP_BEGIN_PKT)
```

```
                break;

/* Release this pretender... */
            ppp_rls_pkt(p_tmp_frame, 1);

p_ncb->Inbuf[offset] = NULL;
            p_ncb->arrived[offset] = FALSE;
            p_ncb->frame_expected = MPP_SEQ_INCR(p_ncb->frame_expected);
            p_ncb->too_far = MPP_SEQ_INCR(p_ncb->too_far);
        }
    }

/* perform M update.  M = min(all most recently rcvd seqnums) */
    for (i = 0, M = MPP_INVALIDSEQ; i < lpCall->num_links; i++)
    {
        p_tmplink = &lpCall->link[i];
        if (p_tmplink->state == LK_STATE_UP)
        {
            if (M == MPP_INVALIDSEQ)
                M = p_tmplink->mrr_seqnum;
            else if ((p_tmplink->mrr_seqnum ^ M) & 0x800000)
            {
                /* wrap case */
                if (M < p_tmplink->mrr_seqnum)
                    M = p_tmplink->mrr_seqnum;
            }
            else
            {
                /* normal case */
                if (p_tmplink->mrr_seqnum < M)
                    M = p_tmplink->mrr_seqnum;
            }
        }
    }

/* perform M cleanup */
    if (M != MPP_INVALIDSEQ)
    {
        /****
         * A lost fragment is detected when M advances PAST the
         * sequence number of a fragment bearing an Ending bit
         * of a packet which has not been completely reassembled (i.e.,
         * not all the sequence numbers between the fragment bearing
         * the Beginning bit and the fragment bearing the Ending bit
         * have been received).  This is because of the increasing
         * sequence number rule over the bundle.
         ****/ for (i = 0, offset = p_ncb->frame_expected % MPP_WINDOW_SIZE;
             i < MPP_WINDOW_SIZE; i++)
        {
            if (!p_ncb->arrived[offset])
            {
                offset = (offset + 1) % MPP_WINDOW_SIZE;
                continue;
            } p_tmp_frame = p_ncb->Inbuf[offset];
            p_tmp_mpphdr = (S_MPPHDR *)GET_DATA_PTR(p_tmp_frame);

offset = (offset + 1) % MPP_WINDOW_SIZE;

if (p_tmp_mpphdr->flags & MPP_END_PKT)
            {
                tmp_seqnum = (((u32)p_tmp_mpphdr->seqhi) << 16) |
                             ((u32)swap16(p_tmp_mpphdr->seqlo));

/* M > tmp_seqnum of first pkt with Ending Bit? */
                if (mpp_is_greater_than(M, tmp_seqnum))
                {
                    /****
                     * Remove all packets from the window up to M.
                     * If M doesn't have its Begin bit on,
                     *    Discard all packets until BEG found.
                     ****/
```

```
xoffset = p_ncb->frame_expected % MPP_WINDOW_SIZE;
for (j = 0; j < MPP_WINDOW_SIZE; j++)
{
    if (!p_ncb->arrived[xoffset])
    {
        xoffset = (xoffset + 1) % MPP_WINDOW_SIZE;
        p_ncb->frame_expected =
            MPP_SEQ_INCR(p_ncb->frame_expected);
        p_ncb->too_far = MPP_SEQ_INCR(p_ncb->too_far);
        continue;
    } p_tmp_frame = p_ncb->Inbuf[xoffset];
    p_tmp_mpphdr = (S_MPPHDR *)GET_DATA_PTR(p_tmp_frame);

tmp_seqnum = (((u32)p_tmp_mpphdr->seqhi) << 16) |
                 ((u32)swap16(p_tmp_mpphdr->seqlo));

if (mpp_is_greater_than(M, tmp_seqnum))
    {
        /* Release buffer at xoffset */
        ppp_rls_pkt(p_tmp_frame, 1);

p_ncb->Inbuf[xoffset] = NULL;
        p_ncb->arrived[xoffset] = FALSE;
        p_ncb->frame_expected =
            MPP_SEQ_INCR(p_ncb->frame_expected);
        p_ncb->too_far = MPP_SEQ_INCR(p_ncb->too_far);
    }
    else
        break;         // found packet containing M xoffset = (xoffset + 1) % MPP_WINDOW_SIZE;
}

/****
 * Starting at M, release any non-BEGs until BEG found
 *    (xoffset and j are set by previous loop).
 ****/ for (; j < MPP_WINDOW_SIZE; j++)
{
    if (!p_ncb->arrived[xoffset])
        break;         // don't know what to do here...

p_tmp_frame = p_ncb->Inbuf[xoffset];
    p_tmp_mpphdr = (S_MPPHDR *)GET_DATA_PTR(p_tmp_frame);

tmp_seqnum = (((u32)p_tmp_mpphdr->seqhi) << 16) |
                 ((u32)swap16(p_tmp_mpphdr->seqlo));

if (p_tmp_mpphdr->flags & MPP_BEGIN_PKT)
        break;         // BEG found, get out of here...
    else
    {
        /* Release buffer at xoffset */
        ppp_rls_pkt(p_tmp_frame, 1);

p_ncb->Inbuf[xoffset] = NULL;
        p_ncb->arrived[xoffset] = FALSE;
        p_ncb->frame_expected =
            MPP_SEQ_INCR(p_ncb->frame_expected);
        p_ncb->too_far =
            MPP_SEQ_INCR(p_ncb->too_far);
    } xoffset = (xoffset + 1) % MPP_WINDOW_SIZE;
}

/****
 * Set state to RESYNC if we couldn't find a
 *    Begin packet in the window.
 ****/
```

```c
                            if (j == MPP_WINDOW_SIZE)
                                p_ncb->mpp_seq_state = MPP_SEQ_STATE_RESYNC;

break;
                        }
                    }
                }
            }

/* Get rid of it if it doesn't belong in window */
            if (rls_entry)
            {
                ppp_rls_pkt(p_frame, 0);
                return(NULL);
            }

/****
             * Check for complete frames:
             *     We have a complete frame if we march from frame expected and
             *     find an END packet without any missing fragments.
             ****/ for (i = 0, offset = p_ncb->frame_expected % MPP_WINDOW_SIZE;
                 i < MPP_WINDOW_SIZE; i++)
            {
                if (!p_ncb->arrived[offset])
                    break;
                p_tmp_frame = p_ncb->Inbuf[offset];
                p_tmp_mpphdr = (S_MPPHDR *)GET_DATA_PTR(p_tmp_frame);

offset = (offset + 1) % MPP_WINDOW_SIZE;

if (p_tmp_mpphdr->flags & MPP_END_PKT)
                {
                    /* give it up */
                    xoffset = p_ncb->frame_expected % MPP_WINDOW_SIZE;
                    while (xoffset != offset)
                    {
                        if (!nppp_assemble_mpp_pkt(lpCall, p_link,
                            p_ncb->Inbuf[xoffset]))
                        {
                            ppp_rls_pkt(p_ncb->Inbuf[xoffset], 1);
                        }
                        p_ncb->Inbuf[xoffset] = NULL;
                        p_ncb->arrived[xoffset] = FALSE;
                        p_ncb->frame_expected =
                            MPP_SEQ_INCR(p_ncb->frame_expected);
                        p_ncb->too_far = MPP_SEQ_INCR(p_ncb->too_far);

xoffset = (xoffset + 1) % MPP_WINDOW_SIZE;
                    }
                }
            }

/* if we got here, we didn't reassemble any pkts */
        return(NULL);
    }

/*
     *  nppp_assemble_mpp_pkt - Reassemble the received MPP packet
     */
    BOOL
    nppp_assemble_mpp_pkt(PCALLINFO lpCall, Link_CB_t *p_link, GCAPACKET *p_frame)
    {
        PPP_CB_t            *p_ncb = &(lpCall->ppp);    /* NPPP CB */
        static GCAPACKET    *p_ass_pkt = 0;
        static u16          nppp_ass_length;
        S_PPPHDR            *p_ppphdr;
        S_MPPHDR            *p_mpphdr;
        u8                  *p_newdata;
        u8                  *p_msgdata;
        u8                  *p_shortpid;
        u8                  flags;
```

```c
p_mpphdr = (S_MPPHDR *) GET_DATA_PTR(p_frame);

flags = p_mpphdr->flags;

/* check for NULL fragment (no payload pkt used for sync purposes) */
if (((flags & (MPP_BEGIN_PKT | MPP_END_PKT)) ==
    (MPP_BEGIN_PKT | MPP_END_PKT)) &&
    (p_frame->uLength == MPP_HDRLEN))
{
    return(FALSE);
} if (flags & MPP_BEGIN_PKT)
{
    /*
    ** Strip off the MPP header then prepend the PPP header to the pkt
    */ p_shortpid = (u8 *)(p_mpphdr + 1);

/* LSBit is set if last octet in PID */
    if (*p_shortpid & 1)
    {
        PUT_DATA_OFF(p_frame, (GET_DATA_OFF(p_frame)+MPP_HDRLEN-3));
        p_frame->uLength -= (MPP_HDRLEN-3);

/* make this look exactly like a PPP pkt */
        p_ppphdr = (S_PPPHDR *)(&p_mpphdr->seqhi);
        p_ppphdr->addr = HDLC_ALL_ADDR;
        p_ppphdr->control = HDLC_UI;
        *(p_shortpid-1) = 0;
    }
    else    /* long pid format */
    {
        PUT_DATA_OFF(p_frame, (GET_DATA_OFF(p_frame)+MPP_HDRLEN-2));
        p_frame->uLength -= (MPP_HDRLEN-2);

/* make this look exactly like a PPP pkt */
        p_ppphdr = (S_PPPHDR *)(&p_mpphdr->seqlo);
        p_ppphdr->addr = HDLC_ALL_ADDR;
        p_ppphdr->control = HDLC_UI;
    }
}
else
{
    /* just strip off MPP header */
    PUT_DATA_OFF(p_frame, (GET_DATA_OFF(p_frame)+MPP_HDRLEN));
    p_frame->uLength -= MPP_HDRLEN;
}

/* copy data pkt into nppp_ass_pbuf */
if ((flags & (MPP_BEGIN_PKT | MPP_END_PKT)) ==
    (MPP_BEGIN_PKT | MPP_END_PKT))
{
    /* let the PPP pkt processing handle (and release) this pkt */
    nppp_rx_pkt(lpCall, p_link, p_frame);
    return(TRUE);
}
else
{
    if (!p_ass_pkt)
    {
        if (!(flags & MPP_BEGIN_PKT))
        {
            /* don't start assembling a new packet if it is */
            /* not the beginning of the whole packet */
            return(FALSE);
        }

/* Get packet for the sending of a PROTOCOL REJECT to peer */
        if ((p_ass_pkt = ppp_get_pkt()) == NULL)
            return(FALSE);

p_ass_pkt->uLength = p_frame->uLength;
```

```
            p_msgdata = (char *)GET_DATA_PTR(p_frame);
            p_newdata = (char *)GET_DATA_PTR(p_ass_pkt);

memcpy(p_newdata, p_msgdata, p_frame->uLength);

nppp_ass_length = p_frame->uLength;
        }
        else
        {
            p_msgdata = (char *)GET_DATA_PTR(p_frame);
            p_newdata = (char *)GET_DATA_PTR(p_ass_pkt);

memcpy((p_newdata + nppp_ass_length), p_msgdata, p_frame->uLength);

nppp_ass_length += p_frame->uLength;

p_ass_pkt->uLength = nppp_ass_length;

if (flags & MPP_END_PKT)
            {
                /* let the PPP pkt processing handle (and release) this pkt */
                nppp_rx_pkt(lpCall, p_link, p_ass_pkt);

/* reset global ptr so that a new pbf is allocated next time */
                p_ass_pkt = NULL;
            }
        }
    } return(FALSE);
}
/*
 *  nppp_initcb -   Initialize the PPP control block
 */
void
nppp_initcb(PCALLINFO lpCall, Link_CB_t *p_link)
{
    PPP_CB_t        *p_ncb = &(lpCall->ppp);    /*   NPPP CB   */
    u16             idx;

p_ncb->mpp_seqnum = 0;
    p_ncb->mpp_seq_state = MPP_SEQ_STATE_SYNC;
    p_ncb->ipx_framing = PPP_IPX_FRAME_ETHER_II;

/* Return port to inited stage (this resets */
    /* ctl blk vars and kills outstanding timers). */
    nppp_init_all_layers(lpCall, p_link, CP_INITIAL);

/* init the data control block associated with this PPP_cb */ p_ncb->last_tx_link = 0;
    p_ncb->activity_flag = 0;
    p_ncb->tx_packets = 0;
    p_ncb->tx_frames = 0;
    p_ncb->tx_bytes = 0;
    p_ncb->tx_delta_bytes = 0;
    p_ncb->rx_packets = 0;
    p_ncb->rx_frames = 0;
    p_ncb->rx_bytes = 0;
    p_ncb->rx_delta_bytes = 0;
    p_ncb->frame_expected = 0;
    p_ncb->too_far = MPP_WINDOW_SIZE;
    p_ncb->call_retry_cnt = 0;
    p_ncb->pppid = 0;

for (idx = 0; idx < MPP_WINDOW_SIZE; idx++)
    {
        p_ncb->Inbuf[idx] = NULL;
        p_ncb->arrived[idx] = FALSE;
    }

InitializeListHead(&p_ncb->txq);
    p_ncb->num_tx_pkts_on_q = 0;
```

```
    p_ncb->compression.inited = FALSE;
    p_ncb->compression.compressing = FALSE;
    /** DYN_CFG: We will fill this in as we learn it **/
    p_ncb->compression.algorithm = 0;
}

/*
*    nppp_get_next_link - Get the next link for tx data
*/

Link_CB_t
*nppp_get_next_link(PCALLINFO lpCall, BOOL incr_flag)
{
    PPP_CB_t           *p_ncb = &(lpCall->ppp);      /*    NPPP CB    */
    Link_CB_t          *p_link;
    u32                num_links;
    u32                link_no;

link_no = p_ncb->last_tx_link;

for (num_links = lpCall->num_links; num_links; num_links--)
    {
        link_no++;
        link_no %= lpCall->num_links;

p_link = &lpCall->link[link_no];
        if (p_link->state == LK_STATE_UP)
        {
            if (incr_flag)
                p_ncb->last_tx_link = link_no;

return(p_link);
        }
    }

/* No link is up. Links are transitioning to down, return NULL */
    return(NULL);
}

/*
*    nppp_cleanup_queues - Stop all links for this connection
*/ void
nppp_cleanup_queues(PCALLINFO lpCall)
{
    PPP_CB_t           *p_ncb = &(lpCall->ppp);      /*    NPPP CB    */
    GCAPACKET          *p_pkt;
    int                i;

for (i = 0; i < MPP_WINDOW_SIZE; i++)
    {
        if (p_ncb->Inbuf[i] != NULL)
        {
            ppp_rls_pkt(p_ncb->Inbuf[i], 0);
            p_ncb->Inbuf[i] = 0;
        }
    }
}

/*
*   nppp_init_all_layers -- Initialize all layers for the specified port.
*/ void
nppp_init_all_layers(PCALLINFO lpCall, Link_CB_t *p_link, CP_states_t cpstate)
{
    PPP_CB_t           *p_ncb = &(lpCall->ppp);      /*    NPPP CB    */ nppp_reset(lpCall, p_link, LCP_LAYER, cpstate);
    nppp_reset(lpCall, p_link, PAP_LAYER, cpstate);
    nppp_reset(lpCall, p_link, CHAP_LAYER, cpstate);
    nppp_reset(lpCall, p_link, BRCP_LAYER, cpstate);
    nppp_reset(lpCall, p_link, IPCP_LAYER, cpstate);
```

```
    nppp_reset(lpCall, p_link, IPXCP_LAYER, cpstate);
    nppp_reset(lpCall, p_link, NBFCP_LAYER, cpstate);
    nppp_reset(lpCall, p_link, CCP_LAYER, cpstate);
}

/*
 * nppp_reset -- Reset the configuration options for initial request
 *         for the specified port.
 */
void
nppp_reset(PCALLINFO lpCall, Link_CB_t *p_link,
    PPP_layer_t layer, CP_states_t cpstate)
{
    PPP_CB_t    *p_ncb = &(lpCall->ppp);        /*    NPPP CB    */
    APPP_CB_t   *p_acb = &(lpCall->appp);       /*    APPP CB    */
    S_CPCTL     *p_ncp = &p_link->a_cpctl[layer];

p_ncp->cpstate = cpstate;
    p_ncp->ack_retry = 0;

if (p_ncp->timer_id1.active)    /* Kill any existing CP timer */
        clr_nppp_timer(lpCall, p_link, layer, PPP_TIMER1);

if (p_ncp->timer_id2.active)    /* Kill any existing CP timer */
        clr_nppp_timer(lpCall, p_link, layer, PPP_TIMER2);

switch (layer)
    {
    case LCP_LAYER:
        /* Reset our config request params to our preferred values */
        p_ncb->neg_mru = 1;     /* always try to negotiate MRU */ p_ncb->tx_ac_comp = 0;
        p_ncb->tx_proto_comp = 0;
        p_ncb->rx_ac_comp = TRUE;
        p_ncb->rx_proto_comp = TRUE;
        p_ncb->send_endpt = FALSE;

/** DYN_CFG: We will fill this in as we learn it from Net **/
        p_ncb->auth_flags = 0;
        p_ncb->auth_compl_flags = 0;

/** DYN_CFG: We will fill this in as we learn it from App **/
        p_acb->protocols = 0;

p_ncb->rem_mru = DEF_MRU;
        p_ncb->lcl_mru = DEF_MRU;

/* set incoming and outgoing MRU max to MAX_FRAME_LENGTH */
        /* plus either PPP header */
        if (lpCall->IscCallData.dwEncapsulation == PPPML_EMULATION)
            p_ncb->send_endpt = TRUE;
        else
            p_ncb->send_endpt = FALSE;
        break;

case CHAP_LAYER:
        break;

case PAP_LAYER:
        break;

case BRCP_LAYER:
        break;

case IPCP_LAYER:
        /* Set up for IP addr exchange */
        p_ncb->neg_ip_addr = 1;
        p_ncb->peer_negotiated_ip_addr = FALSE;

/** DYN_CFG: We will fill this in as we learn it from App **/
        p_ncb->my_ip_addr = 0;
        p_ncb->peer_ip_addr = 0;
        break;
```

```
        case IPXCP_LAYER:
            /* Set up for IPX network and node number exchange; */
            p_ncb->neg_ipx_network = 1;
            p_ncb->neg_ipx_node = 1;
            p_ncb->peer_negotiated_ipxnet_addr = FALSE;
            p_ncb->peer_negotiated_ipxnode_addr = FALSE;

/** DYN_CFG: We will fill this in as we learn them **/
            p_ncb->my_ipx_network = 0;
            p_ncb->peer_ipx_network = 0;
            memset(p_ncb->my_ipx_node, 0, SZ_IPX_NODENUM);
            memset(p_ncb->peer_ipx_node, 0, SZ_IPX_NODENUM);
            break;

case NBFCP_LAYER:
            p_ncb->neg_name_proj = 1;
            p_ncb->neg_peer_info = 1;
            p_ncb->peer_negotiated_nbname = FALSE;

p_ncb->nb_peer_name[0] = 0;
            memset(p_ncb->nb_peer_clutter, 0, SZ_NBF_CLUTTER);
            break;

case CCP_LAYER:
            /** DYN_CFG: We will fill this in as we learn all of these **/
            p_ncb->ccp_req_len = 0;
            p_ncb->ccp_num_hists = 0;
            p_ncb->stac_check_val = 0;
            p_ncb->mppc_rx_coherency = 0;
            p_ncb->mppc_tx_coherency = 0;
            p_ncb->stac_decomp_paused_id = 0;
            p_ncb->ascend_reset_mode = 0;
            break;
    }
}

/*
 *  nppp_restart -- Reinitialize layer state machine for config exchange for
 *         the specified port.
 */ void
nppp_restart(PCALLINFO lpCall, Link_CB_t *p_link, PPP_layer_t layer)
{
    PPP_CB_t    *p_ncb = &(lpCall->ppp);        /*   NPPP CB   */
    S_CPCTL     *p_ncp = &p_link->s_cpctl[layer];

/* Something went wrong; restart negotiations */
    switch (layer)
    {
    case LCP_LAYER:
        /* Reset CP state machine for configuration negotiation */
        nppp_reset(lpCall, p_link, LCP_LAYER, CP_CLOSED);
        nppp_reset(lpCall, p_link, BRCP_LAYER, CP_CLOSED);
        nppp_reset(lpCall, p_link, IPCP_LAYER, CP_CLOSED);
        nppp_reset(lpCall, p_link, IPXCP_LAYER, CP_CLOSED);
        nppp_reset(lpCall, p_link, NBFCP_LAYER, CP_CLOSED);
        nppp_reset(lpCall, p_link, CCP_LAYER, CP_CLOSED);
        break;
    case BRCP_LAYER:
        /* Reset CP state machine for configuration negotiation */
        nppp_reset(lpCall, p_link, BRCP_LAYER, CP_CLOSED);
        break;
    case IPCP_LAYER:
        /* Reset CP state machine for configuration negotiation */
        nppp_reset(lpCall, p_link, IPCP_LAYER, CP_CLOSED);
        break;
    case IPXCP_LAYER:
        /* Reset CP state machine for configuration negotiation */
        nppp_reset(lpCall, p_link, IPXCP_LAYER, CP_CLOSED);
        break;
    case NBFCP_LAYER:
        /* Reset CP state machine for configuration negotiation */
        nppp_reset(lpCall, p_link, NBFCP_LAYER, CP_CLOSED);
```

```
        break;
    case CCP_LAYER:
        /* Reset CP state machine for configuration negotiation */
        nppp_reset(lpCall, p_link, CCP_LAYER, CP_CLOSED);
        break;
    }

/* Unexpected NPPP Link Down, Restarting Link */
}

/*
*   nppp_start -- Initialize layer state machine for config exchange for the
*           specified port.
*/ int
nppp_start(PCALLINFO lpCall, Link_CB_t *p_link,
    PPP_layer_t layer, CP_states_t cpstate)
{
    PPP_CB_t            *p_ncb = &(lpCall->pppp);        /*   NPPP CB     */
    S_CPCTL             *p_ncp = &p_link->a_cpctl[layer];

switch (layer)
    {
    case CHAP_LAYER:
        if (p_ncb->auth_flags & AF_CHAP_PEER)
        {
            /* Start timer against wait for reply to our config request */
            set_nppp_timer(
                (PPP_RESTART_TIMEOUT * PPP_MAX_CFG_COUNTER),
                lpCall, p_link, (u32)layer, PPP_TIMER2);
        }
        break;

case PAP_LAYER:
        if (p_ncb->auth_flags & AF_PAP_PEER)
        {
            /* set new CP state */
            p_ncp->cpstate = CP_REQ_SENT;

return(nppp_sendpapreq(lpCall, p_link));
        }
        break;

default:
        if (p_ncp->cpstate == CP_STOPPED)
        {
            /* Stopped; wait until remote attempts connect */
            /* fall thu to "return 0" */
        }
        else
        {
            /* set new CP state */
            p_ncp->cpstate = CP_REQ_SENT;

/* state should = CLOSED, begin CP configuration negotiation */
            return(nppp_sendreq(lpCall, p_link, layer));
        }
        break;
    } return 0;
}

/*
*   nppp_open -- Transition to OPEN state.
*/ void
nppp_open(PCALLINFO lpCall, Link_CB_t *p_link, PPP_layer_t layer)
{
    PPP_CB_t            *p_ncb = &(lpCall->pppp);        /*   NPPP CB     */
    APPP_CB_t           *p_acb = &(lpCall->apppp);       /*   APPP CB     */
    char                buf[80];
```

```
switch (layer)
{
case LCP_LAYER:
    /* if this is an expanded link, worry only about the Net side */
    if ((lpCall->IscCallData.dwEncapsulation == PPPML_EMULATION) &&
        (IsPrimaryLink(lpCall, p_link) == FALSE))
    {
        /* LCP is open; switch to next phase, */
        /* Startup __CP negotiations */
        /* If Authentication is required, start the appropriate CP */
        if (p_ncb->auth_flags & AF_CHAP_PEER)
            nppp_start(lpCall, p_link, CHAP_LAYER, CP_CLOSED);

if (p_ncb->auth_flags & AF_PAP_PEER)
            nppp_start(lpCall, p_link, PAP_LAYER, CP_CLOSED);

/* If authentication is not required */
        if (!p_ncb->auth_flags)
        {
            /* reset the call retry counter so subsequent expanded */
            /* calls can be placed. */
            p_ncb->call_retry_cnt = 0;

if (p_ncb->protocols & PPP_PROT_BR)
            {
                /* NPPP - Expanded Bridging Link UP */
                p_link->a_cpctl[BRCP_LAYER].cpstate = CP_OPEN;
            }
            if (p_ncb->protocols & PPP_PROT_IP)
            {
                /* NPPP - Expanded IP Link UP */
                p_link->a_cpctl[IPCP_LAYER].cpstate = CP_OPEN;
            }
            if (p_ncb->protocols & PPP_PROT_IPX)
            {
                /* NPPP - Expanded IPX Link */
                p_link->a_cpctl[IPXCP_LAYER].cpstate = CP_OPEN;
            }
            if (p_ncb->protocols & PPP_PROT_NBF)
            {
                /* NPPP - Expanded NetBEUI Link UP */
                p_link->a_cpctl[NBFCP_LAYER].cpstate = CP_OPEN;
            }
            if (p_ncb->protocols & PPP_PROT_CCP)
            {
                /* NPPP - Expanded Compression Link UP */
                p_link->a_cpctl[CCP_LAYER].cpstate = CP_OPEN;
            }
        }
    }
    else  /* This is the first link, bring up the App LCP */
    {
        /* start the App side LCP now that we are up (STEP 2): */
        appp_start(lpCall, LCP_LAYER, CP_CLOSED);
    }
    break;
case CHAP_LAYER:
case PAP_LAYER:
    /* if this is a supplemental MPP channel, do not */
    /* bring up the NCP's for this link; go straight to OPEN */
    if ((lpCall->IscCallData.dwEncapsulation == PPPML_EMULATION) &&
        (IsPrimaryLink(lpCall, p_link) == FALSE))
    {
        /* NPPP - Expanded Authentication Complete */ if (p_ncb->protocols & PPP_PROT_BR)
        {
            /* NPPP - Expanded Bridging Link UP */
            p_link->a_cpctl[BRCP_LAYER].cpstate = CP_OPEN;
        } if (p_ncb->protocols & PPP_PROT_IP)
        {
            /* NPPP - Expanded IP Link UP */
            p_link->a_cpctl[IPCP_LAYER].cpstate = CP_OPEN;
```

```
            {
            *cp++ = MPP_ENDPOINT_ID;
            *cp++ = 9;
            *cp++ = ENDPT_CLASS_MAC;
            *cp++ = p_adapter->macAddress[0];
            *cp++ = p_adapter->macAddress[1];
            *cp++ = p_adapter->macAddress[2];
            *cp++ = p_adapter->macAddress[3];
            *cp++ = p_adapter->macAddress[4];
            *cp++ = p_adapter->macAddress[5];
            opt_cnt += 9;
            }
        }
        else
        {
            /* Maximum Receive Unit */
            if (p_ncb->neg_mru)
            {
                *cp++ = MAX_RCV_UNIT;
                *cp++ = 4;
                *cp++ = p_ncb->lcl_mru >> 8;
                *cp++ = p_ncb->lcl_mru & 0xff;
                opt_cnt += 4;
            }
        }

/* AC Compression */
        if (p_ncb->rx_ac_comp)
        {
            *cp++ = AC_COMPRESS;
            *cp++ = 2;
            opt_cnt += 2;
        }

/* Protocol Compression */
        if (p_ncb->rx_proto_comp)
        {
            *cp++ = PROT_COMPRESS;
            *cp++ = 2;
            opt_cnt += 2;
        }
        break;

case BRCP_LAYER:
        /* MAC Type */
        *cp++ = BR_MAC_TYPE;
        *cp++ = 3;

*cp++ = BRD_MAC_8023;
        opt_cnt += 3;
        break;

case IPCP_LAYER:

/* If the Net is allowing us to exchange IP Addrs and the App gave */
        /* us an IP or requested one, go for it. */
        if (p_ncb->neg_ip_addrs && p_acb->peer_negotiated_ip_addr)
        {
            *cp++ = IP_ADDRS_NEW;
            *cp++ = 6;

/* have to do this in chars or else fields get */
            /* overwritten when they align */
            *cp++ = (p_ncb->my_ip_addr >> 24);
            *cp++ = (p_ncb->my_ip_addr >> 16);
            *cp++ = (p_ncb->my_ip_addr >> 8);
            *cp++ = p_ncb->my_ip_addr;
            opt_cnt += 6;
        }
        break;

case IPXCP_LAYER:
        /* If the Net is allowing us to exchange IPX Net Addrs and the */
        /* App gave us an IPX Net Addr or requested one, go for it. */
        if (p_ncb->neg_ipx_network && p_acb->peer_negotiated_ipxnet_addr)
```

```
        {
            *cp++ = IPX_NET_NUM;
            *cp++ = 6;

/* have to do this in chars or else fields get */
            /* overwritten when they align */
            *cp++ = (p_ncb->my_ipx_network >> 24);
            *cp++ = (p_ncb->my_ipx_network >> 16);
            *cp++ = (p_ncb->my_ipx_network >> 8);
            *cp++ = p_ncb->my_ipx_network;
            opt_cnt += 6;
        }

/* If the Net is allowing us to exchange IPX Node Addrs and the */
        /* App gave us an IPX Node Addr or requested one, go for it. */
        if (p_ncb->neg_ipx_node && p_acb->peer_negotiated_ipxnode_addr)
        {
            *cp++ = IPX_NODE_NUM;
            *cp++ = 8;

memcpy((u8 *)cp, p_ncb->my_ipx_node, SZ_IPX_NODENUM);
            opt_cnt += 8;
        }
        break;

case NBFCP_LAYER:
        if (p_ncb->neg_name_proj)
        {
            /* project 0 NetBios names to remote peer */
            *cp++ = NBF_NAME_PROJ;
            *cp++ = 2;
            opt_cnt += 2;
        }

/* If the Net is allowing us to exchange NBF Names and the App gave */
        /* us a NBF Name, go for it. */
        if (p_ncb->neg_peer_info && p_acb->peer_negotiated_nbname)
        {
            *cp++ = NBF_PEER_INFO;
            p_len = cp;             /* remember where the length is */
            *cp++ = 8;

memcpy(cp, p_acb->nb_peer_clutter, SZ_NBF_CLUTTER);
            cp += SZ_NBF_CLUTTER;
            opt_cnt += 8;

nb_name_len = strlen(p_acb->nb_peer_name);

if (nb_name_len)
            {
                strcpy(cp, p_acb->nb_peer_name);
                cp += nb_name_len;
                *cp++ = 0;          /* NULL term the string and include in count */
                *p_len = *p_len + nb_name_len + 1;
                opt_cnt += nb_name_len + 1;
            }
        }
        break;

case CCP_LAYER:
        /* Compression Type */
        switch(p_ncb->compression.algorithm)
        {
        case COMPRESS_STAC:
            *cp++ = CCP_STAC_COMP;
            *cp++ = p_ncb->ccp_req_len;
            *cp++ = (p_ncb->ccp_num_hists >> 8);
            *cp++ = p_ncb->ccp_num_hists & 0xff;
            *cp++ = p_ncb->stac_check_val;
            break;
        case COMPRESS_MICROSOFT:
            *cp++ = CCP_MS_COMP;
            *cp++ = p_ncb->ccp_req_len;
            *cp++ = 0;
            *cp++ = 0;
```

```
                *cp++ = 0;
                *cp++ = MPPC_NEGOTIATE_COMP;
                break;
            case COMPRESS_ASCEND:
                *cp++ = CCP_STAC_COMP;
                *cp++ = p_ncb->ccp_req_len;
                *cp++ = (p_ncb->ccp_num_hists >> 8);
                *cp++ = p_ncb->ccp_num_hists & 0xff;
                *cp++ = p_ncb->stac_check_val;
                *cp++ = p_ncb->ascend_reset_mode;
                break;
            } opt_cnt += p_ncb->ccp_req_len;
            break;
        } return(opt_cnt);
    }

/*
    *   nppp_sendchapresp -- Build and send CHAP RESPONSE packet.
    */ int
    nppp_sendchapresp(PCALLINFO lpCall, Link_CB_t *p_link,
        u8 *resp_val, u8 id)
    {
        PPP_CB_t         *p_ncb = &(lpCall->ppp);         /*   NPPP CB   */
        GCAPACKET        *p_pkt;
        u8               *p_cfgbase;
        u8               *p_cfgopts;

/* Get packet for CHAP AUTH_ACK/NAK */
        if ((p_pkt = ppp_get_pkt()) == NULL)
            return(-1);

p_cfgbase = p_cfgopts =
            ((u8 *)GET_DATA_PTR(p_pkt)) + PPP_HDRLEN + CNF_HDRLEN;

/* load Auth Request params into buf */
        *p_cfgopts++ = SZ_MD5_DIGEST;                     /* size of value */ memcpy(p_cfgopts, resp_val, SZ_MD5_DIGEST);       /* value */
        p_cfgopts += SZ_MD5_DIGEST;

strcpy(p_cfgopts, lpCall->IscCallData.username);  /* name */
        p_cfgopts += strlen(lpCall->IscCallData.username);

/* determine number of bytes for options data */
        p_pkt->uLength = p_cfgopts - p_cfgbase;

/* Send CHAP RESPONSE to authenticator */
        return(nppp_sendreply(lpCall, p_link, CHAP_LAYER,
            p_pkt, CHAP_RESPONSE, id));
    }

/*
    *   nppp_sendpapreq -- Build and send PAP AUTH_REQ packet.
    */ int
    nppp_sendpapreq(PCALLINFO lpCall, Link_CB_t *p_link)
    {
        PPP_CB_t         *p_ncb = &(lpCall->ppp);         /*   NPPP CB   */
        S_CPCTL          *p_ncp = &p_link->a_cpctl[PAP_LAYER];
        GCAPACKET        *p_pkt;
        u8               *p_cfgbase;
        u8               *p_cfgopts;
        u8               peer_id_len, pwd_len;
        u8               nppp_pwd[MAXSLPASSWDSIZE];
        int              i;

/* Get packet for PAP AUTH_REQ */
        if ((p_pkt = ppp_get_pkt()) == NULL)
```

```
        return(-1);

p_cfgbase = p_cfgopts =
        ((u8 *)GET_DATA_PTR(p_pkt)) + PPP_HDRLEN + CNF_HDRLEN;

/* load Auth Request params into buf */
    peer_id_len = strlen(lpCall->IscCallData.username);
    *p_cfgopts++ = peer_id_len;
    strcpy(p_cfgopts, lpCall->IscCallData.username);
    p_cfgopts += peer_id_len;

ppp_decrypt_pwd(nppp_pwd, lpCall->IscCallData.password);

pwd_len = strlen(nppp_pwd);
    *p_cfgopts++ = pwd_len;
    strcpy(p_cfgopts, nppp_pwd);
    p_cfgopts += pwd_len;

/* determine number of bytes for options data */
    p_pkt->uLength = p_cfgopts - p_cfgbase;

/* Start timer against wait for reply to our config request */
    set_nppp_timer(PPP_RESTART_TIMEOUT, lpCall, p_link,
                   (u32)PAP_LAYER, PPP_TIMER1);

/* Send PAP AUTH_REQ to authenticator */
    return(nppp_sendreply(lpCall, p_link, PAP_LAYER, p_pkt, PAP_REQUEST, 0));
}

/*
 *  nppp_sendreply -- Send a PPP Control packet to the peer
 */
int
nppp_sendreply(PCALLINFO lpCall, Link_CB_t *p_link, PPP_layer_t layer,
    GCAPACKET *p_pkt, u8 code, u8 id)
{
    PPP_CB_t        *p_ncb = &(lpCall->pppl);          /*    NPPP CB    */
    S_CPCTL         *p_ncp = &p_link->a_cpctl[layer];
    S_CNFHDR        *p_cnfhdr;
    u32             *p_magicnum;
    u32             pid;

p_cnfhdr = (S_CNFHDR *)(((u8 *)GET_DATA_PTR(p_pkt)) + PPP_HDRLEN);
    p_magicnum = (u32 *)(((u8 *)p_cnfhdr) + CNF_HDRLEN);

/* Load CP header values */
    p_cnfhdr->code = code;

switch(code)
    {
    case CONFIG_REQ:    /* AKA: CHAP_CHALLENGE & PAP_REQUEST */
    case TERMINATE_REQ:
        /* Save ID field for match against replies from remote host */
        p_ncp->lastid = p_ncb->pppid;
        p_cnfhdr->id = p_ncb->pppid++;
        break;
    case ECHO_REQ:
        if (layer != LCP_LAYER)
            goto reply_default;

/* Save ID field for match against replies from remote host */
        p_ncp->lastid = p_ncb->pppid;
        p_cnfhdr->id = p_ncb->pppid++;
        *p_magicnum = 0;       /* no need to swap32(0) */;
        p_pkt->uLength += sizeof(u32);  /* add magicnum to pktlen */
        break;
    case PROTO_REJ:
        if (layer != LCP_LAYER)
            goto reply_default;
        p_cnfhdr->id = p_ncb->pppid++;
        break;
    case DISCARD_REQ:
        p_cnfhdr->id = p_ncb->pppid++;
        break;
```

```
        case CCP_RESET_REQ:
            if (layer != CCP_LAYER)
                goto reply_default;

/* if this is the first in the series, save off the RESET_REQ ID */
            if (p_ncb->stac_decomp_paused_id == 0)
            {
                if (p_ncb->pppid == 0)
                    p_ncb->pppid++;

p_ncb->stac_decomp_paused_id = p_cnfhdr->id = p_ncb->pppid;
                p_ncb->pppid++;
            }
            else
                p_cnfhdr->id = p_ncb->stac_decomp_paused_id;
            break;
        case CONFIG_ACK:    /* AKA: CHAP_RESPONSE & PAP_ACK */
        case CONFIG_NAK:    /* AKA: CHAP_SUCCESS & PAP_NAK */
        case CONFIG_REJ:    /* AKA: CHAP_FAILURE */
        case TERMINATE_ACK:
        case CODE_REJ:
            p_cnfhdr->id = id;
            break;
        case ECHO_REPLY:
            if (layer != LCP_LAYER)
                goto reply_default;

p_cnfhdr->id = id;
            *p_magicnum = 0;        /* no need to swap32(0) */;
            p_pkt->uLength += sizeof(u32); /* add magicnum to pktlen */
            break;
        case CCP_RESET_ACK:
            if (layer != CCP_LAYER)
                goto reply_default;
            p_cnfhdr->id = id;
            break;
        default:
reply_default:
            /* Shouldn't happen */
            ppp_rls_pkt(p_pkt, 13);
            return(-1);
    } if (layer == LCP_LAYER)
        pid = PPP_LCP_PID;
    else if (layer == CHAP_LAYER)
        pid = PPP_CHAP_PID;
    else if (layer == PAP_LAYER)
        pid = PPP_PAP_PID;
    else if (layer == BRCP_LAYER)
        pid = PPP_BRCP_PID;
    else if (layer == IPCP_LAYER)
        pid = PPP_IPCP_PID;
    else if (layer == IPXCP_LAYER)
        pid = PPP_IPXCP_PID;
    else if (layer == NBFCP_LAYER)
        pid = PPP_NBFCP_PID;
    else if (layer == CCP_LAYER)
        pid = PPP_CCP_PID;
    else    /* must be unsupported protocol */
    {
        ppp_rls_pkt(p_pkt, 14);
        return(-1);
    }

/* framesize = length of options field */
    p_cnfhdr->len = swap16((u16)(CNF_HDRLEN + p_pkt->uLength));

/* update buffer Frame Size (total bytes in pkt) */
    p_pkt->uLength += CNF_HDRLEN;

/* Adjust the packet offsets so that they are aligned with */
    /* all the other methods of getting a packet to nppp_send_pkt. */
    /* Specifically, set the app_data_ptr to start of CNFHDR */
    PUT_DATA_OFF(p_pkt, (GET_DATA_OFF(p_pkt)+PPP_HDRLEN));
```

```
    return(nppp_send_pkt(lpCall, p_link, p_pkt, (u16)pid));
}
/*
*   nppp_sendtermack -- Send a TERMINATE ACK to the peer
*/
void
nppp_sendtermack(PCALLINFO lpCall, Link_CB_t *p_link,
    PPP_layer_t layer, CP_states_t cpstate)
{
    PPP_CB_t            *p_ncb = &(lpCall->ppp);       /*    NPPP CB    */
    S_CPCTL             *p_ncp = &p_link->a_cpctl[layer];
    GCAPACKET           *p_tx_pkt;

/* Get packet for terminate ack */
    if ((p_tx_pkt = ppp_get_pkt()) != NULL)
    {
        /* try to send out TERMINATE_ACK pkt */
        nppp_sendreply(lpCall, p_link, layer, p_tx_pkt, TERMINATE_ACK, 0);
    } p_ncp->cpstate = cpstate;
    return;
}

/*
*   nppp_sendcoderej -- Send a CODE REJECT to the peer
*/
void
nppp_sendcoderej(PCALLINFO lpCall, Link_CB_t *p_link,
    PPP_layer_t layer, GCAPACKET *p_pkt, CP_states_t cpstate)
{
    PPP_CB_t            *p_ncb = &(lpCall->ppp);       /*    NPPP CB    */
    S_CPCTL             *p_ncp = &p_link->a_cpctl[layer];
    S_PPPHDR            *p_ppphdr;
    GCAPACKET           *p_CR_pkt;
    u8                  *p_from;
    u8                  *p_to;
    u32                 i;
    s32                 numbytes;

p_ppphdr = (S_PPPHDR *)(GET_DATA_PTR(p_pkt));

/* Get packet for code reject */
    if ((p_CR_pkt = ppp_get_pkt()) != NULL)
    {
        /* need to copy info field from RX pkt into PROTO_REJ pkt */
        /* make sure it doesn't exceed max negotiated length */
        p_from = (((u8 *)p_ppphdr) + PPP_HDRLEN);
        p_to = (((u8 *)GET_DATA_PTR(p_CR_pkt)) +
                    PPP_HDRLEN + CNF_HDRLEN);

if (p_pkt->uLength < p_ncb->rem_mru)
            numbytes = p_pkt->uLength;
        else
            numbytes = p_ncb->rem_mru;

/* insert rejected-protocol after CNF_HDR */
        *p_to++ = p_ppphdr->pid >> 8;
        *p_to++ = p_ppphdr->pid & 0xff;
        p_CR_pkt->uLength += 2;

/* copy info field */
        for (i = 0; i < numbytes; i++)
            *p_to++ = *p_from;
        p_CR_pkt->uLength += numbytes;

nppp_sendreply(lpCall, p_link, layer, p_CR_pkt, CODE_REJ, 0);
    } p_ncp->cpstate = cpstate;
    return;
```

```c
/*
 * nppp_sendresetreq -- Send a CCP RESET REQ to the peer
 */
void
nppp_sendresetreq(PCALLINFO lpCall, Link_CB_t *p_link, PPP_layer_t layer)
{
    PPP_CB_t        *p_ncb = &(lpCall->ppp);    /*   NPPP CB   */
    GCAPACKET       *p_tx_pkt;
    u16             *p_histnum;

/* Get packet for reset req */
    if ((p_tx_pkt = ppp_get_pkt()) != NULL)
    {
        /* need to fill in data area with history number */
        p_histnum = (((u16 *)GET_DATA_PTR(p_tx_pkt)) +
                    PPP_HDRLEN + CNF_HDRLEN);

/* insert history number that we are resetting */
        *p_histnum++ = swap16(p_ncb->ccp_num_hists);
        p_tx_pkt->uLength += sizeof(u16);

/* try to send out CCP_RESET_REQ pkt */
        nppp_sendreply(lpCall, p_link, layer, p_tx_pkt, CCP_RESET_REQ, 0);
    } return;
}

/*
 * nppp_sendresetack -- Send a CCP RESET ACK to the peer
 */
void
nppp_sendresetack(PCALLINFO lpCall, Link_CB_t *p_link,
    PPP_layer_t layer, GCAPACKET *p_pkt)
{
    PPP_CB_t        *p_ncb = &(lpCall->ppp);    /*   NPPP CB   */
    GCAPACKET       *p_tx_pkt;
    u8              *p_from;
    u8              *p_to;
    u32             i;
    s32             numbytes;

/* Get packet for reset ack */
    if ((p_tx_pkt = ppp_get_pkt()) != NULL)
    {
        /* Copy the data field from the RESET_REQ pkt */
        p_from = (((u8 *)GET_DATA_PTR(p_pkt)) +
                 PPP_HDRLEN + CNF_HDRLEN);
        p_to   = (((u8 *)GET_DATA_PTR(p_tx_pkt)) +
                 PPP_HDRLEN + CNF_HDRLEN);

if ((p_pkt->uLength - CNF_HDRLEN) < p_ncb->rem_mru)
            numbytes = p_pkt->uLength - CNF_HDRLEN;
        else
            numbytes = p_ncb->rem_mru;

/* copy data field */
        for (i = 0; i < numbytes; i++)
            *p_to++ = *p_from;
        p_tx_pkt->uLength += numbytes;

/* try to send out CCP_RESET_ACK pkt */
        nppp_sendreply(lpCall, p_link, layer, p_tx_pkt, CCP_RESET_ACK, 0);
    } return;
}

/*
 * nppp_timeout -- Timeout while waiting for reply from peer.
 */
```

```
void
nppp_timeout(PCALLINFO lpCall, Link_CB_t *p_link,
    PPP_layer_t layer, u32 timer_idx)
{
    PPP_CB_t         *p_ncb = &(lpCall->ppp);       /*    NPPP CB    */
    s_CPCTL          *p_ncp = &p_link->a_cpctl[layer];
    GCAPACKET        *p_tx_pkt;

/* Attempt to get things going again */
    switch(p_ncp->cpstate)
    {
    case CP_INITIAL:    /* Unexpected event */
    case CP_STARTING:
    case CP_CLOSED:
    case CP_STOPPED:
    case CP_OPEN:
        break;

case CP_CLOSING:
        /* Timeout waiting for terminate ACK; send another request */
        if (++p_ncp->ack_retry > PPP_MAX_TERM_COUNTER)
        {
            /* No response to our request; give it up */
            nppp_reset(lpCall, p_link, layer, CP_CLOSED);
        }
        else
        {
            /* Request remote host to close data link */
            set_nppp_timer(PPP_RESTART_TIMEOUT,
                lpCall, p_link, (u32)layer, PPP_TIMER1);

/* Get packet for Terminate Request */
            if ((p_tx_pkt = ppp_get_pkt()) == NULL)
                nppp_reset(lpCall, p_link, layer, CP_CLOSED);
            else
            {
                /* try to send out another TERMINATE_REQ pkt */
                nppp_sendreply(lpCall, p_link, layer, p_tx_pkt,
                    TERMINATE_REQ, 0);
            }
        }
        break;

case CP_STOPPING:
        /* Timeout waiting for terminate ACK; send another request */
        if (++p_ncp->ack_retry > PPP_MAX_TERM_COUNTER)
        {
            /* No response to our request; give it up */
            nppp_reset(lpCall, p_link, layer, CP_STOPPED);
        }
        else
        {
            /* Request remote host to stop data link */
            set_nppp_timer(PPP_RESTART_TIMEOUT,
                lpCall, p_link, (u32)layer, PPP_TIMER1);

/* Get packet for Terminate Request */
            if ((p_tx_pkt = ppp_get_pkt()) == NULL)
                nppp_reset(lpCall, p_link, layer, CP_STOPPED);
            else
            {
                /* try to send out another TERMINATE_REQ pkt */
                nppp_sendreply(lpCall, p_link, layer, p_tx_pkt,
                    TERMINATE_REQ, 0);
            }
        }
        break;

case CP_REQ_SENT:
    case CP_ACK_RCVD:
    case CP_ACK_SENT:
        /* Timeout waiting for ACK to our request, */
        /* or timeout waiting for request from remote host */
        if (++p_ncp->ack_retry > PPP_MAX_CFG_COUNTER)
```

```
        {
            /* Connection Establish Timeout, NPPP link down */

/* terminate link */
            nppp_release_link(lpCall, p_link);
        }
        else
        {
            /* Try to get things going by sending new request */
            nppp_sendreq(lpCall, p_link, layer);

if (p_ncp->cpstate != CP_ACK_SENT)
                p_ncp->cpstate = CP_REQ_SENT;
        }
        break;

default:
        /* ignore */
        break;
    } return;
}

/*
 *  nppp_auth_timeout -- Timeout while waiting for Authentication.
 */ void
nppp_auth_timeout(PCALLINFO lpCall, Link_CB_t *p_link,
    PPP_layer_t layer, u32 timer_idx)
{
    PPP_CB_t        *p_ncb = &(lpCall->pppp);        /*  NPPP CB   */
    S_CPCTL         *p_ncp = &p_link->a_cpctl[layer];

/* Attempt to get things going again */
    if (layer == PAP_LAYER)
    {
        /* if Auth Response timer has gone off, check for re-xmit */
        if (timer_idx == PPP_TIMER1)
        {
            /* Timeout waiting for ACK to our request, */
            /* or timeout waiting for request from remote host */
            if (++p_ncp->ack_retry > PPP_MAX_CFG_COUNTER)
            {
                /* Authenticator has not replied, NPPP link down */

/* terminate link */
                nppp_release_link(lpCall, p_link);
            }
            else
            {
                /* Try to get things going by sending new request */
                nppp_sendpapreq(lpCall, p_link);
            }
        }
        else    /* timer_idx == 2 */
        {
            /* Since we are NOT a PAP Authenticator, this branch is no */
            /* longer valid.... WHOLLY IGNORE THIS */
        }
    }
    else    /* CHAP */
    {
        /* if Auth Response timer has gone off, check for re-xmit */
        if (timer_idx == PPP_TIMER1)
        {
            /* Since we are NOT a CHAP Authenticator, this branch is no */
            /* longer valid.... WHOLLY IGNORE THIS */
        }
        else    /* timer_idx == 2 */
        {
            /* CHAP CHALLENGE Timeout, NPPP link down */

/* terminate link */
```

```
            nppp_release_link(lpCall, p_link);
        }
    }
}

/*
 * nppp_proc -- Process the incoming CP packet
 */
void
nppp_proc(PCALLINFO lpCall, Link_CB_t *p_link,
    PPP_layer_t layer, GCAPACKET *p_pkt)
{
    PPP_CB_t        *p_ncb = &(lpCall->pppl);       /*   NPPP CB   */
    S_CNFHDR        *p_cnfhdr;
    GCAPACKET       *p_tx_pkt;

p_cnfhdr = (S_CNFHDR *)(((u8 *)GET_DATA_PTR(p_pkt)) + PPP_HDRLEN);

/* Process CP packet data */
    switch(p_cnfhdr->code)
    {
    case CONFIG_REQ:            /* Request of remote host */
        nppp_rcvreq(lpCall, p_link, layer, p_pkt);
        break;
    case CONFIG_ACK:            /* Remote accepted our req */
        nppp_rcvack(lpCall, p_link, layer, p_pkt);
        break;
    case CONFIG_NAK:            /* Remote adjusted our req */
        nppp_rcvnak(lpCall, p_link, layer, p_pkt);
        break;
    case CONFIG_REJ:            /* Remote rejected our req */
        nppp_rcvrej(lpCall, p_link, layer, p_pkt);
        break;
    case TERMINATE_REQ:         /* Remote request to close */
        nppp_rcvtermreq(lpCall, p_link, layer);
        break;
    case TERMINATE_ACK:         /* Remote closed on request */
        nppp_rcvtermack(lpCall, p_link, layer);
        break;
    case CODE_REJ:
        nppp_rcvcoderej(lpCall, p_link, layer, p_pkt);
        break;
    case PROTO_REJ:
        nppp_rcvprotorej(lpCall, p_link, layer, p_pkt);
        break;
    case ECHO_REQ:
        if (layer == LCP_LAYER)
        {
            /* Get packet for configuration request */
            if ((p_tx_pkt = ppp_get_pkt()) != NULL)
            {
                /* try to send out ECHO_REPLY pkt */
                nppp_sendreply(lpCall, p_link, LCP_LAYER, p_tx_pkt, ECHO_REPLY,
                    p_cnfhdr->id);
            }
        }
        break;
    case ECHO_REPLY:
        break;
    case DISCARD_REQ:
        /* As per the RFC, Simply drop this pkt */
        break;
    case CCP_RESET_REQ:
        if (layer == CCP_LAYER)
            nppp_rcvresetreq(lpCall, p_link, layer, p_pkt);
        break;
    case CCP_RESET_ACK:
        if (layer == CCP_LAYER)
            nppp_rcvresetack(lpCall, p_link, layer, p_pkt);
        break;
    default:
        nppp_rcvunknown(lpCall, p_link, layer, p_pkt);
        break;
    }
```

```
    ppp_rls_pkt(p_pkt, 15);
    return;
}
/*
*   nppp_chap_proc -- Process the incoming CHAP packet
*/
void
nppp_chap_proc(PCALLINFO lpCall, Link_CB_t *p_link,
    PPP_layer_t layer, GCAPACKET *p_pkt)
{
    PPP_CB_t          *p_ncb = &(lpCall->ppp);       /*   NPPP CB   */
    S_CPCTL           *p_ncp;
    S_CNFHDR          *p_cnfhdr;
    u8                *p_cfgopts;
    u16               val_len, len;
    u8                buf[120];
    unsigned char     digest[SZ_MD5_DIGEST];
    u8                nppp_pwd[MAXSLPASSWDSIZE];

p_cnfhdr = (S_CNFHDR *)(((u8 *)GET_DATA_PTR(p_pkt)) + PPP_HDRLEN);
    p_cfgopts = (((u8 *)p_cnfhdr) + CNF_HDRLEN);

p_ncp = &p_link->a_cpctl[layer];

ppp_decrypt_pwd(nppp_pwd, lpCall->IscCallData.password);

/* Process CHAP packet data */
    switch(p_cnfhdr->code)
    {
    case CHAP_CHALLENGE:          /* Challenge Message */
        /* make sure we have a secret string */
        if (nppp_pwd[0] == 0)
            break;

/* get the size of the challenge value */
        val_len = *p_cfgopts;

/* better to drop the packet than overrun our stack buf[] */
        if (val_len > 80)
            break;

/* concatenate the pkt ID, the "secret", and the Challenge value */
        buf[0] = p_cnfhdr->id;
        len = 1;
        strcpy((char *)&buf[1], nppp_pwd);
        len += strlen(nppp_pwd);
        memcpy((char *)&buf[len], (p_cfgopts+1), val_len);
        len += val_len;

/* we now have the octet string to hash, MD5 it.. */
        MD5_Hash(buf, digest, len);

/* build and send the CHAP Response pkt */
        nppp_sendchapresp(lpCall, p_link, digest, p_cnfhdr->id);
        break;

case CHAP_RESPONSE:           /* Response Message */
        /* Since-I am not a CHAP AUTHENTICATOR, ignore this case */
        break;

case CHAP_SUCCESS:            /* Success Message */
        /* Stop timer against wait for CHAP RESULT CODE */
        if (p_ncp->timer_id2.active)
            clr_nppp_timer(lpCall, p_link, layer, PPP_TIMER2);

p_ncb->auth_compl_flags |= AF_CHAP_PEER_APPROVED;

/* are we all the way up ? */
        if (p_ncb->auth_flags == p_ncb->auth_compl_flags)
        {
            p_ncb->auth_flags |= AF_COMPLETED;
            p_ncb->auth_compl_flags |= AF_COMPLETED;
```

```
            p_ncp->cpstate = CP_OPEN;

/* all authentication complete */
            nppp_open(lpCall, p_link, layer);
        }
        break;

case CHAP_FAILURE:          /* Failure Message */
        /* Stop timer against wait for CHAP RESULT CODE */
        if (p_ncp->timer_id2.active)
            clr_nppp_timer(lpCall, p_link, layer, PPP_TIMER2);

/* NPPP Auth Failed, CHAP Mismatch. NPPP link down */

/* terminate link */
        nppp_release_link(lpCall, p_link);
        break;

default:
        /* Bogus pkt, ignore it. */
        break;
    } ppp_rls_pkt(p_pkt, 16);
    return;
}

/*
 * nppp_pap_proc -- Process the incoming PAP packet
 */
void
nppp_pap_proc(PCALLINFO lpCall, Link_CB_t *p_link,
    PPP_layer_t layer, GCAPACKET *p_pkt)
{
    PPP_CB_t        *p_ncb = &(lpCall->ppp);        /*    NPPP CB    */
    S_CPCTL         *p_ncp;
    S_CNFHDR        *p_cnfhdr;
    u8              *p_cfgopts;
    u8              *p_buf;
    int             i, len;
    u8              nppp_pwd[MAXSLPASSWDSIZE];
    u8              buf[80];

p_cnfhdr = (S_CNFHDR *)(((u8 *)GET_DATA_PTR(p_pkt)) + PPP_HDRLEN);
    p_cfgopts = (((u8 *)p_cnfhdr) + CNF_HDRLEN);

p_ncp = &p_link->a_cpctl[layer];

/* Process PAP packet data */
    switch(p_cnfhdr->code)
    {
    case PAP_REQUEST :      /* Request Message */
        /* Since I am not a PAP AUTHENTICATOR, ignore this case */
        break;
    case PAP_ACK:           /* ACK Message */
        /* Stop timer against wait for PAP auth response */
        if (p_ncp->timer_id1.active)
            clr_nppp_timer(lpCall, p_link, layer, PPP_TIMER1);

p_ncb->auth_compl_flags |= AF_PAP_PEER_APPROVED;

/* are we all the way up ? */
        if (p_ncb->auth_flags == p_ncb->auth_compl_flags)
        {
            p_ncb->auth_flags |= AF_COMPLETED;
            p_ncb->auth_compl_flags |= AF_COMPLETED;

p_ncp->cpstate = CP_OPEN;

/* all authentication complete */
            nppp_open(lpCall, p_link, layer);
        }
        break;
```

```
    case PAP_NAK:              /* NAK Message */
        /* Stop timer against wait for PAP auth response */
        if (p_ncp->timer_idl.active)
            clr_nppp_timer(lpCall, p_link, layer, PPP_TIMER1);

/* NPPP Auth Failed, PAP Mismatch. NPPP link down */

/* terminate link */
        nppp_release_link(lpCall, p_link);
        break;
    default:
        /* Bogus pkt, ignore it. */
        break;
    } ppp_rls_pkt(p_pkt, 17);
    return;
}

/*
 *  nppp_rcvreq -- Process the received CFG_REQ from the peer.
 */ void
nppp_rcvreq(PCALLINFO lpCall, Link_CB_t *p_link,
    PPP_layer_t layer, GCAPACKET *p_pkt)
{
    PPP_CB_t        *p_ncb = &(lpCall->ppp);     /*   NPPP CB    */
    APPP_CB_t       *p_acb = &(lpCall->appp);    /*   APPP CB    */
    S_CPCTL         *p_ncp = &p_link->a_cpctl[layer];

switch(p_ncp->cpstate)
    {
    case CP_INITIAL:    /* Unexpected event */
    case CP_STARTING:   /* Unexpected event */
        if ((layer == CCP_LAYER) && (p_acb->a_emstates[layer] == EM_LISTENING))
        {
            /****
             * For the CCP, we are awaiting the CFG_REQ from the Net side
             * to learn what compression (if any) it is trying to start up.
             ****/ nppp_learnfromreq(lpCall, p_link, layer, p_pkt);
            if (p_ncb->compression.algorithm != COMPRESS_NONE)
            {
                p_acb->a_emstates[layer] = EM_NETCP_STARTED;
                nppp_start(lpCall, p_link, layer, CP_CLOSED);
            }
        }
        break;

case CP_CLOSED:
        nppp_sendtermack(lpCall, p_link, layer, CP_CLOSED);
        break;

case CP_STOPPED:
        /* Send our configuration request */
        nppp_sendreq(lpCall, p_link, layer);
        /* Evaluate configuration request from remote host */
        nppp_chkreq(lpCall, p_link, layer, p_pkt, CP_ACK_SENT, CP_REQ_SENT);
        break;

case CP_CLOSING:
        /* We are attempting to close connection; wait */
        /* for timeout to resend a Terminate Request   */
        break;

case CP_STOPPING:
        /* We are attempting to stop connection; wait */
        /* for timeout to resend a Terminate Request   */
        break;

case CP_REQ_SENT:
    case CP_ACK_SENT:
        /* Evaluate configuration request from remote host */
```

```
            nppp_chkreq(lpCall, p_link, layer, p_pkt, CP_ACK_SENT, CP_REQ_SENT);
            break;

case CP_ACK_RCVD:
            /* Stop timer against wait for config request */
            if (p_ncp->timer_id1.active)
                clr_nppp_timer(lpCall, p_link, layer, PPP_TIMER1);

/* Evaluate configuration request from remote host */
            nppp_chkreq(lpCall, p_link, layer, p_pkt, CP_OPEN, CP_ACK_RCVD);
            break;

case CP_OPEN:       /* Unexpected event */
            /* Something went wrong; restart negotiations */
            nppp_restart(lpCall, p_link, layer);

/* Send our configuration request */
            nppp_sendreq(lpCall, p_link, layer);

/* Evaluate configuration request from remote host */
            nppp_chkreq(lpCall, p_link, layer, p_pkt, CP_ACK_SENT, CP_REQ_SENT);
            break;

default:
            /* ignore */
            break;
        } return;
    }

/*
 *  nppp_chkreq -- Check link control options requested by the peer.
 */ void
nppp_chkreq(PCALLINFO lpCall, Link_CB_t *p_link, PPP_layer_t layer,
    GCAPACKET *p_pkt, u16 ack_cpstate, u16 nak_cpstate)
{
    PPP_CB_t            *p_ncb  = &(lpCall->ppp);        /*    NPPP CB    */
    S_CPCTL             *p_ncp  = &p_link->a_cpctl[layer];
    S_CNFHDR            *p_cnfhdr;
    S_OPTHDR            *p_opthdr;
    u8                  *p_optdata;
    GCAPACKET           *p_ACK_pkt;
    u8                  *p_ACK_buf;
    s16                 i,ilen;
    s16                 alloptslen;
    s16                 optdatalen;
    s8                  opt_accept;                      /* Per option reply */
    s8                  cnf_accept = CONFIG_ACK;         /* Overall reply to req */
    s16                 minoptlen;
    u8                  ms_cmp_enc;
    u8                  nppp_pwd[MAXSLPASSWDSIZE];

p_cnfhdr = (S_CNFHDR *)(((u8 *)GET_DATA_PTR(p_pkt)) + PPP_HDRLEN);
    p_opthdr = (S_OPTHDR *)(((u8 *)p_cnfhdr) + CNF_HDRLEN);

/* Get CFG_ACK packet */
    if ((p_ACK_pkt = ppp_get_pkt()) == NULL)
        return;

/* Set ptr to CFG_ACK buffers option field */
    p_ACK_buf = ((u8 *)GET_DATA_PTR(p_ACK_pkt)) + PPP_HDRLEN + CNF_HDRLEN;

/* Make sure length in CP config header is realistic */
    if (p_pkt->uLength < (DWORD)swap16(p_cnfhdr->len))
        p_cnfhdr->len = swap16((u16)p_pkt->uLength);

alloptslen = swap16(p_cnfhdr->len) - CNF_HDRLEN;

if (layer == CCP_LAYER)
        minoptlen = 5;
    else if (layer == IPCP_LAYER)
        minoptlen = 4;
```

```
else
    minoptlen = 2;
/* Process options requested by remote host */
for (; alloptslen >= minoptlen; alloptslen -= p_opthdr->len,
 p_opthdr = (S_OPTHDR *)((u8 *)p_opthdr + p_opthdr->len))
{
    optdatalen = p_opthdr->len - 2; /* Set curr opts data len */
                    /* Set ptr to option data */
    p_optdata = ((u8 *)p_opthdr) + 2;
    opt_accept = CONFIG_ACK;      /* Assume will accept option */ if (layer == LCP_LAYER)
    {
        u16 i16;

switch(p_opthdr->type)
        {
        case MAX_RCV_UNIT:
            /* Max Receive Unit is a 16bit field */
            ilen = 2;
            if (optdatalen < ilen)
            {
                /* Short option data; reject packet */
                opt_accept = CONFIG_REJ;
                break;
            }

/* Get proposed value from packet */
            i16 = (*p_optdata << 8) | *(p_optdata+1);

/* Check if new value is appropriate */
            if (i16 < MIN_MRU)
            {
                /* Too small, ask for minimum instead */
                opt_accept = CONFIG_NAK;
                *p_optdata = MIN_MRU >> 8;
                *(p_optdata + 1) = MIN_MRU & 0xff;
                i16 = MIN_MRU;
            }
            else
            {
                /* Value is acceptable */
                opt_accept = CONFIG_ACK;
            } p_ncb->rem_mru = i16;
            break;
        case ASYNC_CTL_MAP:      /* Async Control Map */
            /* Async control map is a 32bit field */
            ilen = 4;
            if (optdatalen < ilen)
            {
                /* Short option data; reject packet */
                opt_accept = CONFIG_REJ;
                break;
            }

/* OTHERWISE, BLINDLY ACCEPT BECAUSE WE WILL NOT */
            /* DO ANY MAPPING, BUT WE NEED TO ack THEIR OPTION */
            /* REQUEST */
            opt_accept = CONFIG_ACK;
            break;
        case AUTH_TYPE:
            /* Get proposed value from packet */
            i16 = (*p_optdata << 8) | *(p_optdata+1);

ppp_decrypt_pwd(nppp_pwd, lpCall->lscCallData.password);

/* Check to see if CHAP or PAP is requested */
            if (i16 == PPP_CHAP_PID)
            {
                ilen = 3;

if (optdatalen != ilen)
```

```
            {
                /* wrong option data length; reject packet */
                opt_accept = CONFIG_REJ;
                break;
            }

/* make sure they do MD5 */
            if (*(p_optdata+2) != CHAP_ALG_MD5)
            {
                /* MD5 not supported, ask for PAP */
                /* NOTE: This is mainly for Microsoft since they */
                /*       never converge on different CHAP algs. */
                ilen = 2;
                opt_accept = CONFIG_NAK;
                *p_optdata = (PPP_PAP_PID >> 8);
                *(p_optdata+1) = (PPP_PAP_PID & 0xff);
            }
            else
            {
                /* Value is acceptable */
                opt_accept = CONFIG_ACK;
                p_ncb->auth_flags |= AF_CHAP_PEER;
            }
        }
        else if (ilen == PPP_PAP_PID)
        {
            ilen = 2;

if (optdatalen != ilen)
            {
                /* wrong option data length; reject packet */
                opt_accept = CONFIG_REJ;
                break;
            }

/* We will assume that if they are asking for auth */
            /* that the App will eventually supply us with the */
            /* booty.  Otherwise, we will end up tearing down  */
            /* the call.  Oh woe is me.... EOJ - DRAIN BRAMAGE... */
            opt_accept = CONFIG_ACK;
            p_ncb->auth_flags |= AF_PAP_PEER;
        }
        else
        {
            /* THIS OPTION IS NOT NEGOTIABLE, REJECT */
            ilen = 0;
            opt_accept = CONFIG_REJ;
        }
        break;
    case MAGIC_NUMBER:    /* Magic Number */
        /* Magic Number is a 32bit field */
        ilen = 4;
        if (optdatalen < ilen)
        {
            /* Short option data; reject packet */
            opt_accept = CONFIG_REJ;
            break;
        }

/* OTHERWISE, BLINDLY ACCEPT BECAUSE WE WILL NOT */
        /* DO ANY MAPPING, BUT WE NEED TO ack THEIR OPTION */
        /* REQUEST */
        opt_accept = CONFIG_ACK;
        break;
    case PROT_COMPRESS:
        /* should be 0 opt data bytes left */
        ilen = optdatalen;
        if (ilen)
        {
            opt_accept = CONFIG_REJ;
        }
        else
        {
            p_ncb->tx_proto_comp = TRUE;
            opt_accept = CONFIG_ACK;
```

```
            }
            break;
        case AC_COMPRESS:
            /* should be 0 opt data bytes left */
            ilen = optdatalen;
            if (ilen)
            {
                opt_accept = CONFIG_REJ;
            }
            else
            {
                p_ncb->tx_ac_comp = TRUE;
                opt_accept = CONFIG_ACK;
            }
            break;
        case FCS_32:      /* 32-bit FCS not implemented */
            /*** THIS OPTION IS NOT NEGOTIABLE, REJECT ***/
            ilen = 0;
            opt_accept = CONFIG_REJ;
            break;
        case MPP_MRRU:    /* MPP MRRU */
            /* if only 1 channel, reject MPP */
            if (lpCall->IscCallData.dwEncapsulation != PPPML_EMULATION)
            {
                ilen = 2;
                opt_accept = CONFIG_REJ;
                break;
            }
            else
            {
                /* MPP Max Receive Unit is a 16bit field */
                ilen = 2;
                if (optdatalen < ilen)
                {
                    /* Short option data; reject packet */
                    opt_accept = CONFIG_REJ;
                    break;
                }

/* Get proposed value from packet */
                i16 = (*p_optdata << 8) | *(p_optdata+1);

/* Check if new value is appropriate */
                if (i16 < MIN_MRU)
                {
                    /* Too small, ask for minimum instead */
                    opt_accept = CONFIG_NAK;
                    *p_optdata = MIN_MRU >> 8;
                    *(p_optdata + 1) = MIN_MRU & 0xff;
                    i16 = MIN_MRU;
                }
                else
                {
                    /* Value is acceptable */
                    opt_accept = CONFIG_ACK;
                } p_ncb->rem_mru = i16;
            }
            break;
        case MPP_SHORTSEQNUM:    /* MPP Short Sequence Numbers */
            /* THIS OPTION IS NOT NEGOTIABLE, REJECT */
            ilen = 0;
            opt_accept = CONFIG_REJ;
            break;
        case MPP_ENDPOINT_ID:    /* MPP Endpoint ID */
            ilen = optdatalen;

/* BLINDLY ACCEPT BECAUSE WE WILL NOT DO ANYTHING */
            /* WITH THIS AT THIS TIME */
            opt_accept = CONFIG_ACK;
            break;

default:          /* Unknown option */
            opt_accept = CONFIG_REJ;
```

```c
            /* protect from bogus packet or buffer overrun */
            if ((p_opthdr->len <= 0) || (alloptslen < p_opthdr->len))
            {
                p_opthdr->len = alloptslen;
                ilen = alloptslen-2;
            }
            else
            {
                ilen = optdatalen;
            }
        break;
        }
    }
    else if (layer == IPCP_LAYER)
    {
        u32 reqpeer_ip;

switch(p_opthdr->type)
        {
        case IP_ADDRS_NEW:          /* IP address */
            /* IP Addr is a 32bit field */
            ilen = 4;
            if (optdatalen < ilen)
            {
                /* Short option data; reject packet */
                opt_accept = CONFIG_REJ;
                break;
            }

/* Get proposed value from packet */
            reqpeer_ip = *p_optdata;
            reqpeer_ip = (reqpeer_ip << 8) | *(p_optdata + 1);
            reqpeer_ip = (reqpeer_ip << 8) | *(p_optdata + 2);
            reqpeer_ip = (reqpeer_ip << 8) | *(p_optdata + 3);

/* if the Net is asking for an IP address, Rej it */
            if (reqpeer_ip == 0)
            {
                opt_accept = CONFIG_REJ;
                break;
            }

/* save Net IP addr */
            p_ncb->peer_negotiated_ip_addr = TRUE;
            p_ncb->peer_ip_addr = reqpeer_ip;

opt_accept = CONFIG_ACK;
            break;

case IP_COMPR_TYPE:    /* IP header compression */
            /* THIS OPTION IS NOT NEGOTIABLE, REJECT */
            ilen = 2;
            opt_accept = CONFIG_REJ;
            break;

default:        /* Unknown option */
            opt_accept = CONFIG_REJ;

/* protect from bogus packet or buffer overrun */
            if ((p_opthdr->len <= 0) || (alloptslen < p_opthdr->len))
            {
                p_opthdr->len = alloptslen;
                ilen = alloptslen-2;
            }
            else
            {
                ilen = optdatalen;
            }
            break;
        }
    }
    else if (layer == IPXCP_LAYER)
    {
        u32 reqpeer_ipxnet;
```

```c
switch(p_opthdr->type)
{
case IPX_NET_NUM:            /* IPX Network Number */
    /* IPX Net Addr is a 32bit field */
    ilen = 4;
    if (optdatalen < ilen)
    {
        /* Short option data; reject packet */
        opt_accept = CONFIG_REJ;
        break;
    }

/* Get proposed value from packet */
    reqpeer_ipxnet = *p_optdata;
    reqpeer_ipxnet = (reqpeer_ipxnet << 8) | *(p_optdata + 1);
    reqpeer_ipxnet = (reqpeer_ipxnet << 8) | *(p_optdata + 2);
    reqpeer_ipxnet = (reqpeer_ipxnet << 8) | *(p_optdata + 3);

/* if the Net is asking for an IPX Net address, Rej it */
    if (reqpeer_ipxnet == 0)
    {
        opt_accept = CONFIG_REJ;
        break;
    }

/* save Net IPX Net addr */
    p_ncb->peer_negotiated_ipxnet_addr = TRUE;
    p_ncb->peer_ipx_network = reqpeer_ipxnet;

opt_accept = CONFIG_ACK;
    break;
case IPX_NODE_NUM:           /* IPX Node Number */
    /* IPX Node Addr is a MAC addr */
    ilen = SZ_IPX_NODENUM;
    if (optdatalen < ilen)
    {
        /* Short option data; reject packet */
        opt_accept = CONFIG_REJ;
        break;
    }

/* Get proposed value from packet */
    maccpy(p_ncb->peer_ipx_node, p_optdata);

if (IsMacEmpty(p_ncb->peer_ipx_node))
    {
        opt_accept = CONFIG_REJ;
        break;
    }

/* indicate that Peer IPX Node was supplied */
    p_ncb->peer_negotiated_ipxnode_addr = TRUE;

opt_accept = CONFIG_ACK;
    break;
case IPX_CFG_COMPLETE:       /* IPX Configuration Complete */
    ilen = optdatalen;

/* BLINDLY ACCEPT BECAUSE WE WILL NOT DO ANYTHING */
    /* WITH THIS AT THIS TIME */
    opt_accept = CONFIG_ACK;
    break;
default:          /* Unknown option */
    opt_accept = CONFIG_REJ;

/* protect from bogus packet or buffer overrun */
    if ((p_opthdr->len <= 0) || (alloptslen < p_opthdr->len))
    {
        p_opthdr->len = alloptslen;
        ilen = alloptslen-2;
    }
    else
    {
        ilen = optdatalen;
```

```
                }
                break;
            }
        }
        else if (layer == NBFCP_LAYER)
        {
            switch(p_opthdr->type)
            {
            case NBF_NAME_PROJ:              /* NetBios Name Projection */
                ilen = optdatalen;

/* BLINDLY ACCEPT BECAUSE WE WILL NOT DO ANYTHING */
                /* WITH THIS AT THIS TIME */
                opt_accept = CONFIG_ACK;
                break;
            case NBF_PEER_INFO:              /* NetBios Peer Information */
                /* copy all the clutter (Class and version) */
                memcpy((u8 *)p_ncb->nb_peer_clutter,
                    (u8 *)p_optdata, SZ_NBF_CLUTTER);

/* if the far end has supplied a Peer Name, tuck it away */
                if (optdatalen > 8)
                {
                    /****
                     * The Net side is giving us his NBF Name.  Tuck it away
                     * so that we can reflect it back to the App.
                     *****/ p_ncb->peer_negotiated_nbname = TRUE;
                    memcpy((u8 *)p_ncb->nb_peer_name,
                        ((u8 *)p_optdata+SZ_NBF_CLUTTER), (optdatalen - 8));
                    p_ncb->nb_peer_name[optdatalen - 8] = 0;
                } ilen = optdatalen;
                opt_accept = CONFIG_ACK;
                break;
            case NBF_MULTICAST:              /* NetBios Multicast */
                ilen = optdatalen;

/* BLINDLY ACCEPT BECAUSE WE WILL NOT DO ANYTHING */
                /* WITH THIS AT THIS TIME */
                opt_accept = CONFIG_ACK;
                break;
            case NBF_MAC_REQUIRED:           /* NetBios MAC Required */
                ilen = optdatalen;

/**** THIS OPTION IS NOT NEGOTIABLE, REJECT ***/
                opt_accept = CONFIG_REJ;
                break;
            default:        /* Unknown option */
                opt_accept = CONFIG_REJ;

/* protect from bogus packet or buffer overrun */
                if ((p_opthdr->len <= 0) || (alloptslen < p_opthdr->len))
                {
                    p_opthdr->len = alloptslen;
                    ilen = alloptslen-2;
                }
                else
                {
                    ilen = optdatalen;
                }
                break;
            }
        }
        else if (layer == CCP_LAYER)
        {
            u16 i16;

switch(p_opthdr->type)
            {
            case CCP_STAC_COMP:              /* Stac Compression */
                if (p_ncb->compression.algorithm == COMPRESS_STAC)
                {
```

```
        /* until determined otherwise, default to okay */
        opt_accept = CONFIG_ACK;

ilen = optdatalen;

if (optdatalen != (CCP_STACKER_REQ_LEN - 2))
        {
            /* mismatch option data length; reject packet */
            opt_accept = CONFIG_REJ;
            break;
        }

/* Get proposed history value */
        i16 = (*p_optdata << 8) | *(p_optdata+1);

/* If it is non-zero, NAK it. */
        if (i16 != p_ncb->ccp_num_hists)
        {
            /* see if he accepts our history number */
            opt_accept = CONFIG_NAK;
            *p_optdata = (p_ncb->ccp_num_hists >> 8);
            *(p_optdata + 1) = p_ncb->ccp_num_hists & 0xff;
        }

/* make sure Check Type is something we can handle */
        if (*(p_optdata+2) != p_ncb->stac_check_val)
        {
            /* see if he accepts our check value */
            opt_accept = CONFIG_NAK;
            *(p_optdata+2) = p_ncb->stac_check_val;
        }
    }
    else    /* ASCEND */
    {
        /* until determined otherwise, default to okay */
        opt_accept = CONFIG_ACK;

ilen = optdatalen;

/****
        ** NOTE: check ASCEND parameters of the STAC Compression.
        ** Since the ASCEND version of the STAC Compression is not
        ** intellectual property of USR, we cannot reveal
        ** information pertaining to it in this patent application.
        ****/

/* if big mismatch, REJ the request, */
        /* else if parameters are different but can be */
        /* negotiated, NAK the msg, else ACK it. */
    }
    break;
case CCP_MS_COMP:                  /* Microsoft Compression */
    /* until determined otherwise, default to okay */
    opt_accept = CONFIG_ACK;

ilen = optdatalen;

if (optdatalen != (CCP_MICROSOFT_REQ_LEN - 2))
    {
        /* mismatch option data length; reject packet */
        opt_accept = CONFIG_REJ;
        break;
    }

/* Get proposed compression and encryption values */
    ms_cmp_enc = *(p_optdata+3);

/* If it is non-zero, NAK it. */
    if ((ms_cmp_enc & MPPC_NEGOTIATE_COMP) != MPPC_NEGOTIATE_COMP)
    {
        /* see if he accepts our history number */
        opt_accept = CONFIG_NAK;
        *(p_optdata + 3) = MPPC_NEGOTIATE_COMP;
    }
    break;
```

```
            default:         /* Unknown option */
                opt_accept = CONFIG_REJ;

/* protect from bogus packet or buffer overrun */
                if ((p_opthdr->len <= 0) || (alloptslen < p_opthdr->len))
                {
                    p_opthdr->len = alloptslen;
                    ilen = alloptslen-2;
                }
                else
                {
                    ilen = optdatalen;
                }
                break;
            }
    }
    else    /* assumed to be BRCP_LAYER */
    {
        switch(p_opthdr->type)
        {
        case BR_MAC_TYPE:          /* MAC Type */
            ilen = 1;
            if (optdatalen < ilen)
            {
                /* Short option data; reject packet */
                opt_accept = CONFIG_REJ;
                break;
            } if (*p_optdata != BRD_MAC_8023)
                opt_accept = CONFIG_REJ;
            else
                opt_accept = CONFIG_ACK;    /* Value is acceptable */
            break;
        case BR_REM_RING_ID:       /* Remote Ring ID */
        case BR_LINE_ID:           /* Line ID */
            /* 802.3 does not use this option, it is bogus.. */
            ilen = 2;
            opt_accept = CONFIG_REJ;
            break;
        case BR_TINY_COMPR:        /* Tinygram Compression */
        case BR_LAN_ID:            /* LAN ID */
            /*** THIS OPTION IS NOT NEGOTIABLE, REJECT ***/
            ilen = 1;
            opt_accept = CONFIG_REJ;
            break;
        default:         /* Unknown option */
            opt_accept = CONFIG_REJ;

/* protect from bogus packet or buffer overrun */
            if ((p_opthdr->len <= 0) || (alloptslen < p_opthdr->len))
            {
                p_opthdr->len = alloptslen;
                ilen = alloptslen-2;
            }
            else
            {
                ilen = optdatalen;
            }
            break;
        }
    } if ((opt_accept == CONFIG_ACK) && (cnf_accept != CONFIG_ACK))
    {
        /* This option was good, but a previous    */
        /* option was not. Return only those options */
        /* which are being nacked/rejected.        */
        continue;
    } if (opt_accept == CONFIG_NAK)
    {
        if (cnf_accept == CONFIG_REJ)
        {
```

```c
                    /* Return only those options */
                    /* which are being rejected. */
                    continue;
                } if (cnf_accept == CONFIG_ACK)
                {
                    /* Discard current list of good options */

/* Rest buffer bytecount */
                    p_ACK_pkt->uLength = 0;

/* Reinit ptr to CFG_ACK buffers option field */
                    p_ACK_buf = ((u8 *)GET_DATA_PTR(p_ACK_pkt)) +
                                PPP_HDRLEN + CNF_HDRLEN;

/* Send a list of nacked options */
                    cnf_accept = CONFIG_NAK;
                }
            } if (opt_accept == CONFIG_REJ)
            {
                if (cnf_accept != CONFIG_REJ)
                {
                    /* Discard current list of good options */

/* Rest buffer bytecount */
                    p_ACK_pkt->uLength = 0;

/* Reinit ptr to CFG_ACK buffers option field */
                    p_ACK_buf = ((u8 *)GET_DATA_PTR(p_ACK_pkt)) +
                                PPP_HDRLEN + CNF_HDRLEN;

/* Send a list of rejected options */
                    cnf_accept = CONFIG_REJ;
                }
            }

/* Add option response to the return list */
            *p_ACK_buf++ = p_opthdr->type;
            *p_ACK_buf++ = ilen + OPT_HDRLEN;

for (i = 0; i < ilen; i++)
            {
                *p_ACK_buf++ = *p_optdata++;
            }

/* Bump buffer bytecount by size of REPLY option */
            p_ACK_pkt->uLength += ilen + OPT_HDRLEN;
        }

/* Send ACK/NAK/REJ to remote host */
    if (cnf_accept == CONFIG_ACK)
    {
        /* Accept configuration requested by remote host */
        nppp_sendreply(lpCall, p_link, layer, p_ACK_pkt,
            CONFIG_ACK, p_cnfhdr->id);

p_ncp->cpstate = ack_cpstate;

/* if we just transitioned to OPEN state */
        if (p_ncp->cpstate == CP_OPEN)
        {
            nppp_open(lpCall, p_link, layer);    /* CP link now open */
        }
    }
    else
    {
        /* NAK/REJ config request made by remote host */
        nppp_sendreply(lpCall, p_link, layer, p_ACK_pkt,
            cnf_accept, p_cnfhdr->id);

p_ncp->cpstate = nak_cpstate;
    }
```

```
    return;
}

/*
 * nppp_learnfromreq -- Grab the CCP algorithm from the Net CFG_REQ
 */
void
nppp_learnfromreq(PCALLINFO lpCall, Link_CB_t *p_link,
    PPP_layer_t layer, GCAPACKET *p_pkt)
{
    PPP_CB_t            *p_ncb = &(lpCall->ppp);        /*    NPPP CB    */
    S_CNFHDR            *p_cnfhdr;
    S_OPTHDR            *p_opthdr;
    s16                 optdatalen;

p_cnfhdr = (S_CNFHDR *)(((u8 *)GET_DATA_PTR(p_pkt)) + PPP_HDRLEN);
    p_opthdr = (S_OPTHDR *)(((u8 *)p_cnfhdr) + CNF_HDRLEN);

/* Make sure length in CP config header is realistic */
    if (p_pkt->uLength < (DWORD)swap16(p_cnfhdr->len))
        p_cnfhdr->len = swap16((u16)p_pkt->uLength);

/* Process options requested by remote host */
    optdatalen = p_opthdr->len - 2;          /* Get curr opts data len */ if (p_opthdr->type == CCP_STAC_COMP)
        {
            if (optdatalen == (CCP_STACKER_REQ_LEN - 2))
            {
                p_ncb->compression.algorithm = COMPRESS_STAC;
                p_ncb->ccp_req_len = CCP_STACKER_REQ_LEN;
                p_ncb->ccp_num_hists = 1;          /* see how this goes */
                p_ncb->stac_check_val = CCP_CV_NONE;
            }
            else if (optdatalen == (CCP_ASCEND_REQ_LEN - 2))
            {
                p_ncb->compression.algorithm = COMPRESS_ASCEND;
                p_ncb->ccp_req_len = CCP_ASCEND_REQ_LEN;
                p_ncb->ccp_num_hists = 1;          /* see how this goes */
                p_ncb->stac_check_val = CCP_CV_LCB;
            }
            else
            {
                p_ncb->compression.algorithm = COMPRESS_NONE;

/* since we will never reach the open stage, reflect */
                /* the fact that there will be no compression. */
                lpCall->IscCallData.compression = COMPRESS_NONE;
            }
        }
        else if (p_opthdr->type == CCP_MS_COMP)
        {
            /* Microsoft Compression */
            p_ncb->compression.algorithm = COMPRESS_MICROSOFT;
            p_ncb->ccp_req_len = CCP_MICROSOFT_REQ_LEN;
            p_ncb->ccp_num_hists = 1;          /* see how this goes */
            p_ncb->stac_check_val = CCP_CV_NONE;
        }
        else
        {
            p_ncb->compression.algorithm = COMPRESS_NONE;

/* since we will never reach the open stage, reflect */
            /* the fact that there will be no compression. */
            lpCall->IscCallData.compression = COMPRESS_NONE;
        } p_ncb->mppc_rx_coherency = 0;
    p_ncb->mppc_tx_coherency = 0;
    p_ncb->stac_decomp_paused_id = 0;
    p_ncb->ascend_reset_mode = ASCEND_RESET_SINGLE_HISTORY;
    return;
}
```

```
/*
 *   nppp_rcvack -- Process the received ACK from the peer.
 */
void
nppp_rcvack(PCALLINFO lpCall, Link_CB_t *p_link,
    PPP_layer_t layer, GCAPACKET *p_pkt)
{
    PPP_CB_t         *p_ncb = &(lpCall->ppp);      /*   NPPP CB   */
    S_CPCTL          *p_ncp = &p_link->a_cpctl[layer];

if (p_ncp->timer_idl.active)
        clr_nppp_timer(lpCall, p_link, layer, PPP_TIMER1);

switch(p_ncp->cpstate)
    {
    case CP_INITIAL:    /* Unexpected event */
    case CP_STARTING:   /* Unexpected event */
        break;

case CP_CLOSED:
        nppp_sendtermack(lpCall, p_link, layer, CP_CLOSED);
        break;

case CP_STOPPED:
        nppp_sendtermack(lpCall, p_link, layer, CP_STOPPED);
        break;

case CP_CLOSING:
        /* We are attempting to close connection; wait */
        /* for timeout to resend a Terminate Request   */
        break;

case CP_STOPPING:
        /* We are attempting to stop connection; wait */
        /* for timeout to resend a Terminate Request  */
        break;

case CP_REQ_SENT:
        /* Make sure ACK is proper */
        if (nppp_chkack(lpCall, p_link, layer, p_pkt) != -1)
            p_ncp->cpstate = CP_ACK_RCVD;    /* Remote host accepted our req */

/* Still need to settle request from remote host */
        set_nppp_timer(PPP_RESTART_TIMEOUT, lpCall,
               p_link, (u32)layer, PPP_TIMER1);
        break;

case CP_ACK_RCVD:
        nppp_sendreq(lpCall, p_link, layer);
        p_ncp->cpstate = CP_REQ_SENT;
        break;

case CP_ACK_SENT:
        /* Make sure ACK is proper */
        if (nppp_chkack(lpCall, p_link, layer, p_pkt) == -1)
        {
            /* Error in ACK from remote host */
            /* Wait for another ACK, then send another request */
            set_nppp_timer(PPP_RESTART_TIMEOUT,
                lpCall, p_link, (u32)layer, PPP_TIMER1);
        }
        else
        {
            p_ncp->cpstate = CP_OPEN;

/* CP negotiation complete */
            nppp_open(lpCall, p_link, layer);
        }
        break;

case CP_OPEN:
        /* Something went wrong; restart negotiations */
        nppp_restart(lpCall, p_link, layer);
```

```
        /* Send our configuration request */
        nppp_sendreq(lpCall, p_link, layer);

p_ncp->cpstate = CP_REQ_SENT;
        break;

default:
        /* ignore */
        break;
    } return;
}

/*
 * nppp_chkack -- Check the received ACK from the peer.
 */
int
nppp_chkack(PCALLINFO lpCall, Link_CB_t *p_link,
    PPP_layer_t layer, GCAPACKET *p_pkt)
{
    PPP_CB_t        *p_ncb = &(lpCall->ppp);        /*   NPPP CB   */
    S_CPCTL         *p_ncp = &p_link->a_cpctl[layer];
    S_CNFHDR        *p_ACK_cnfhdr;
    S_OPTHDR        *p_ACK_opthdr;
    GCAPACKET       *p_REQ_pkt;
    S_OPTHDR        *p_REQ_opthdr;
    s16             ACK_optslen, REQ_optslen;
    u8              *p_ACK_optdata;
    u8              *p_REQ_optdata;
    s16             ackerr = 0;
    u16             reqi16, acki16;
    u8              reqi8, acki8;
    u32             reqmy_ip, ackmy_ip;
    u32             reqipx_net, ackipx_net;
    s16             minoptlen;
    int             i;

p_ACK_cnfhdr = (S_CNFHDR *)(((u8 *)GET_DATA_PTR(p_pkt)) + PPP_HDRLEN);
    p_ACK_opthdr = (S_OPTHDR *)(((u8 *)p_ACK_cnfhdr) + CNF_HDRLEN);

/* CP ID field must match last request we sent */
    if (p_ACK_cnfhdr->id != p_ncp->lastid)
        return -1;

/* Get packet for REQ to ACK comparison check */
    if ((p_REQ_pkt = ppp_get_pkt()) == NULL)
        return(-1);

/* Set ptr to REQ option header */
    p_REQ_opthdr = (S_OPTHDR *)(((u8 *)GET_DATA_PTR(p_REQ_pkt)) +
                        PPP_HDRLEN + CNF_HDRLEN);

/* Get a copy of last request we sent */
    p_REQ_pkt->uLength =
        nppp_makereq(lpCall, p_link, layer, (u8 *)p_REQ_opthdr);

/* Get size of REQ and ACK options field */
    ACK_optslen = swap16(p_ACK_cnfhdr->len) - CNF_HDRLEN;
    REQ_optslen = p_REQ_pkt->uLength;

/* Overall buffer length should match */
    if (ACK_optslen != REQ_optslen)
        ackerr = 1;

if (layer == CCP_LAYER)
        minoptlen = 5;
    else if (layer == IPCP_LAYER)
        minoptlen = 4;
    else
        minoptlen = 2;

/* ACK must echo all options we requested in the order requested */
    for (; (REQ_optslen >= minoptlen) && (!ackerr);
```

```
REQ_optslen -= p_REQ_opthdr->len, p_REQ_opthdr =
(S_OPTHDR *)((u8 *)p_REQ_opthdr + p_REQ_opthdr->len),
ACK_optslen -= p_ACK_opthdr->len, p_ACK_opthdr =
(S_OPTHDR *)((u8 *)p_ACK_opthdr + p_ACK_opthdr->len))
{
    /* Must have as many acked options as requested */
    if (ACK_optslen < minoptlen)
    {
        ackerr = 1;
        break;
    }

/* Set ptr to current REQ option data field */
    p_REQ_optdata = ((u8 *)p_REQ_opthdr) + 2;

/* Set ptr to current ACK option data field */
    p_ACK_optdata = ((u8 *)p_ACK_opthdr) + 2;

/* Config option headers must match */
    if ((p_ACK_opthdr->type != p_REQ_opthdr->type) ||
        (p_ACK_opthdr->len != p_REQ_opthdr->len))
    {
        ackerr = 1;
        break;
    } if (layer == LCP_LAYER)
    {
        /* Config option values must match */
        switch(p_REQ_opthdr->type)
        {
        case MAX_RCV_UNIT:      /* Maximum Receive Unit */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
            {
                ackerr = 1;
            }
            break;

case AUTH_TYPE:         /* Auth Protocol Type not implemented */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
            {
                ackerr = 1;
            } if (reqi16 == PPP_CHAP_PID)
            {
                /* make sure the algoritm is what we requested */
                if (*(p_ACK_optdata+2) != *(p_REQ_optdata+2))
                    ackerr = 1;
            }
            break;

case MPP_MRRU:          /* MPP MRRU */
            acki16 = (*p_ACK_optdata << 8) | *(p_ACK_optdata+1);
            reqi16 = (*p_REQ_optdata << 8) | *(p_REQ_optdata+1);
            if (acki16 != reqi16)
            {
                ackerr = 1;
            }
            break;

case MPP_ENDPOINT_ID:   /* MPP Endpoint ID */
            for (i = 0; i < 7; i++)
            {
                acki8 = *p_ACK_optdata++;
                reqi8 = *p_REQ_optdata++;
                if (acki8 != reqi8)
                {
                    ackerr = 1;
                    break;
                }
            }
```

```
            }
            break;
        case PROT_COMPRESS:   /* Protocol Compression */
        case AC_COMPRESS:     /* Addr/Control Compression */
            /* its now okay */
            break;

default:              /* Shouldnt happen */
            ackerr = 1;
            break;
        }
    }
    else if (layer == IPCP_LAYER)
    {
        /* Config option values must match */
        switch(p_REQ_opthdr->type)
        {
        case IP_ADDRS_NEW:    /* IP address */
            /* Echoed values must match our request */
            reqmy_ip = *p_REQ_optdata++;
            reqmy_ip = (reqmy_ip << 8) | *p_REQ_optdata++;
            reqmy_ip = (reqmy_ip << 8) | *p_REQ_optdata++;
            reqmy_ip = (reqmy_ip << 8) | *p_REQ_optdata++;

ackmy_ip = *p_ACK_optdata++;
            ackmy_ip = (ackmy_ip << 8) | *p_ACK_optdata++;
            ackmy_ip = (ackmy_ip << 8) | *p_ACK_optdata++;
            ackmy_ip = (ackmy_ip << 8) | *p_ACK_optdata++;

if (ackmy_ip != reqmy_ip)
                ackerr = 1;
            break;
        case IP_COMPR_TYPE:   /* IP header compr */
            /* Echoed values must match our request */
            reqi16 = *p_REQ_optdata++;
            reqi16 = (reqi16 << 8) | *p_REQ_optdata;
            acki16 = *p_ACK_optdata++;
            acki16 = (acki16 << 8) | *p_ACK_optdata;

if (reqi16 != acki16)
                ackerr = 1;
            break;
        default:              /* Shouldnt happen */
            ackerr = 1;
            break;
        }
    }
    else if (layer == IPXCP_LAYER)
    {
        /* Config option values must match */
        switch(p_REQ_opthdr->type)
        {
        case IPX_NET_NUM:     /* IPX Network Number */
            /* Echoed values must match our request */
            reqipx_net = *p_REQ_optdata++;
            reqipx_net = (reqipx_net << 8) | *p_REQ_optdata++;
            reqipx_net = (reqipx_net << 8) | *p_REQ_optdata++;
            reqipx_net = (reqipx_net << 8) | *p_REQ_optdata++;

ackipx_net = *p_ACK_optdata++;
            ackipx_net = (ackipx_net << 8) | *p_ACK_optdata++;
            ackipx_net = (ackipx_net << 8) | *p_ACK_optdata++;
            ackipx_net = (ackipx_net << 8) | *p_ACK_optdata++;

if (ackipx_net != reqipx_net)
                ackerr = 1;
            break;
        case IPX_NODE_NUM:    /* IPX Node Number */
            for (i = 0; i < SZ_IPX_NODENUM; i++)
            {
                if (*p_ACK_optdata++ != *p_REQ_optdata++)
                {
                    ackerr = 1;
                    break;
```

```
                }
            break;
        default:         /* We didn't send ANY CFG OPTIONS for IPX */
            ackerr = 1;
            break;
        }
    }
    else if (layer == NBFCP_LAYER)
    {
        /* Config option values must match */
        switch(p_REQ_opthdr->type)
        {
        case NBF_NAME_PROJ:        /* Empty Name Projection */
            /* assume its okay */
            break;
        case NBF_PEER_INFO:        /* NetBios Peer Information */
            /* Echoed values must match our request */
            if ((*p_REQ_optdata != *p_ACK_optdata) ||
                (*(p_REQ_optdata + 1) != *(p_ACK_optdata + 1)))
                ackerr = 1;
            break;
        default:        /* We didn't send any other NBF CFG OPTIONS */
            ackerr = 1;
            break;
        }
    }
    else if (layer == CCP_LAYER)
    {
        /* Config option values must match */
        switch(p_REQ_opthdr->type)
        {
        case CCP_STAC_COMP:            /* Stac Compression */
            /* Echoed values must match our request */
            if (p_ncb->compression.algorithm == COMPRESS_STAC)
            {
                /* Echoed values must match our request */
                if (p_ncb->ccp_req_len == CCP_STACKER_REQ_LEN)
                {
                    if ((*p_REQ_optdata != *p_ACK_optdata) ||
                        (*(p_REQ_optdata + 1) != *(p_ACK_optdata + 1)) ||
                        (*(p_REQ_optdata + 2) != *(p_ACK_optdata + 2)))
                    {
                        ackerr = 1;
                    }
                }
                else
                {
                    ackerr = 1;
                }
            }
            else    /* ASCEND */
            {
                /* Echoed values must match our request */
                if (p_ncb->ccp_req_len == CCP_ASCEND_REQ_LEN)
                {
                    if ((*p_REQ_optdata != *p_ACK_optdata) ||
                        (*(p_REQ_optdata + 1) != *(p_ACK_optdata + 1)) ||
                        (*(p_REQ_optdata + 2) != *(p_ACK_optdata + 2)) ||
                        (*(p_REQ_optdata + 3) != *(p_ACK_optdata + 3)))
                    {
                        ackerr = 1;
                    }
                }
                else
                {
                    ackerr = 1;
                }
            }
            break;
        case CCP_MS_COMP:            /* Microsoft Compression */
            /* Echoed values must match our request */
            if (p_ncb->ccp_req_len == CCP_MICROSOFT_REQ_LEN)
            {
                if ((*p_REQ_optdata != *p_ACK_optdata) ||
```

```
                        (*(p_REQ_optdata + 1) != *(p_ACK_optdata + 1)) ||
                        (*(p_REQ_optdata + 2) != *(p_ACK_optdata + 2)) ||
                        (*(p_REQ_optdata + 3) != *(p_ACK_optdata + 3)))
                    {
                        ackerr = 1;
                    }
                }
                else
                {
                    ackerr = 1;
                }
                break;
            default:         /* We didn't send any other CCP CFG OPTIONS */
                ackerr = 1;
                break;
            }
        }
        else   /* assumed to be BRCP_LAYER */
        {
            /* Config option values must match */
            switch(p_REQ_opthdr->type)
            {
            case BR_MAC_TYPE:        /* MAC Type */
                /* MAC Types MUST match */
                if (*p_ACK_optdata != *p_REQ_optdata)
                    ackerr = 1;
                break;
            default:
                ackerr = 1;
                break;
            }
        }
    } ppp_rls_pkt(p_REQ_pkt, 18);

if (ackerr)
        return -1;

/* ACK matches last request we made */
    return 0;
}

/*
 *  nppp_rcvnak -- Process the received NAK from the peer.
 */
void
nppp_rcvnak(PCALLINFO lpCall, Link_CB_t *p_link,
    PPP_layer_t layer, GCAPACKET *p_pkt)
{
    PPP_CB_t        *p_ncb = &(lpCall->ppp);       /*   NPPP CB    */
    S_CPCTL         *p_ncp = &p_link->a_cpctl(layer);

if (p_ncp->timer_ldl.active)
        clr_nppp_timer(lpCall, p_link, layer, PPP_TIMER1);

switch(p_ncp->cpstate)
    {
    case CP_INITIAL:    /* Unexpected event */
    case CP_STARTING:   /* Unexpected event */
        break;

case CP_CLOSED:
        nppp_sendtermack(lpCall, p_link, layer, CP_CLOSED);
        break;

case CP_STOPPED:
        nppp_sendtermack(lpCall, p_link, layer, CP_STOPPED);
        break;

case CP_CLOSING:
        /* We are attempting to close connection; wait */
        /* for timeout to resend a Terminate Request   */
        break;
```

```
        case CP_STOPPING:
            /* We are attempting to stop connection; wait */
            /* for timeout to resend a Terminate Request   */
            break;

case CP_REQ_SENT:
        case CP_ACK_SENT:
            /* Update our config request to reflect NAKed options */
            if (nppp_chknak(lpCall, p_link, layer, p_pkt) == -1)
            {
                /* Bad NAK packet */
                /* Wait for another; resend request on timeout */
                set_nppp_timer(PPP_RESTART_TIMEOUT, lpCall, p_link,
                        (u32)layer, PPP_TIMER1);
            }
            else
            {
                /* Send updated config request */
                nppp_sendreq(lpCall, p_link, layer);
            }
            break;

case CP_ACK_RCVD:
            /* Send our configuration request */
            nppp_sendreq(lpCall, p_link, layer);
            p_ncp->cpstate = CP_REQ_SENT;
            break;

case CP_OPEN:
            /* Something went wrong; restart negotiations */
            nppp_restart(lpCall, p_link, layer);

/* Send our configuration request */
            nppp_sendreq(lpCall, p_link, layer);

p_ncp->cpstate = CP_REQ_SENT;
            break;

default:
            break;      /* ignore */
    } return;
}

/*
 *  nppp_chknak -- Check the received NAK from the peer.
 */
int
nppp_chknak(PCALLINFO lpCall, Link_CB_t *p_link,
    PPP_layer_t layer, GCAPACKET *p_pkt)
{
    PPP_CB_t        *p_ncb = &(lpCall->ppp);        /*   NPPP CB     */
    S_CPCTL         *p_ncp = &p_link->a_cpctl[layer];
    S_CNFHDR        *p_NAK_cnfhdr;
    S_OPTHDR        *p_NAK_opthdr;
    GCAPACKET       *p_REQ_pkt;
    S_OPTHDR        *p_REQ_opthdr;
    s16             NAK_optslen, REQ_optslen;
    u8              *p_NAK_optdata;
    s16             nakerr = 0;
    u16             nakil6;
    u32             nakmy_ip;
    u32             nak_ipx_netnum;
    s16             minoptlen;
    u8              ms_cmp_enc;

p_NAK_cnfhdr = (S_CNFHDR *)(((u8 *)GET_DATA_PTR(p_pkt)) + PPP_HDRLEN);
    p_NAK_opthdr = (S_OPTHDR *)(((u8 *)p_NAK_cnfhdr) + CNF_HDRLEN);

/* CP ID field must match last request we sent */
    if (p_NAK_cnfhdr->id != p_ncp->lastid)
        return -1;
```

```
/* Get packet for REQ to NAK comparison check */
if ((p_REQ_pkt = ppp_get_pkt()) == NULL)
    return(-1);

/* Set ptr to REQ option header */
p_REQ_opthdr = (S_OPTHDR *)(((u8 *)GET_DATA_PTR(p_REQ_pkt)) +
                            PPP_HDRLEN + CNF_HDRLEN);

/* Get a copy of last request we sent */
p_REQ_pkt->uLength =
    nppp_makereq(lpCall, p_link, layer, (u8 *)p_REQ_opthdr);

/* Get size of REQ and NAK options field */
NAK_optslen = swap16(p_NAK_cnfhdr->len) - CNF_HDRLEN;
REQ_optslen = p_REQ_pkt->uLength;

/* Check overall buffer length */
if (NAK_optslen > REQ_optslen)
    nakerr = 1;

if (layer == CCP_LAYER)
    minoptlen = 5;
else if (layer == IPCP_LAYER)
    minoptlen = 4;
else
    minoptlen = 2;

/* NAKed options must be same order as our original request */
for (; (NAK_optslen >= minoptlen) && (!nakerr);
 REQ_optslen -= p_REQ_opthdr->len, p_REQ_opthdr =
  (S_OPTHDR *)((u8 *)p_REQ_opthdr + p_REQ_opthdr->len),
 NAK_optslen -= p_NAK_opthdr->len, p_NAK_opthdr =
  (S_OPTHDR *)((u8 *)p_NAK_opthdr + p_NAK_opthdr->len))
{
    /* Must find match to each NAKed option */
    if (REQ_optslen < minoptlen)
    {
        nakerr = 1;
        break;
    }

/* Maybe not all options were NAKed; look */
    /* for matching option in our request     */
    while (p_REQ_opthdr->type != p_NAK_opthdr->type)
    {
        /* This option not NAKed; eat rest    */
        /* of option from the request packet */
        REQ_optslen -= p_REQ_opthdr->len;
        p_REQ_opthdr = (S_OPTHDR *)((u8 *)p_REQ_opthdr +
            p_REQ_opthdr->len);

/* Must find match to each NAKed option */
        if (REQ_optslen < minoptlen)
        {
            p_REQ_opthdr->type = 0;
            nakerr = 1;
            break;
        }
    }

/* Config option headers must match */
    if ((p_NAK_opthdr->type != p_REQ_opthdr->type) ||
        (p_NAK_opthdr->len != p_REQ_opthdr->len))
    {
        nakerr = 1;
        break;
    }

/* Set ptr to current NAK option field to compare */
    p_NAK_optdata = ((u8 *)p_NAK_opthdr) + 2;

if (layer == LCP_LAYER)
    {
        /* Remote host replaced our request with new suggestion */
```

```
        switch(p_REQ_opthdr->type)
        {
        case MAX_RCV_UNIT:    /* Maximum Receive Unit */
            /* Get suggested MRU */
            naki16 = (*p_NAK_optdata << 8) | *(p_NAK_optdata+1);

/* Save new request value */
            p_ncb->lcl_mru = naki16;
            break;

case MPP_MRRU:    /* MPP MRRU */
            /* Get suggested MRU */
            naki16 = (*p_NAK_optdata << 8) | *(p_NAK_optdata+1);

if ((naki16 < MIN_MRU) || (naki16 > p_ncb->lcl_mru))
                naki16 = p_ncb->lcl_mru;

/* Save new request value */
            p_ncb->lcl_mru = naki16;
            break;

case MPP_ENDPOINT_ID:    /* MPP Endpoint ID */
            p_ncb->send_endpt = FALSE;
            break;

default:        /* Shouldnt happen */
            nakerr = 1;
            break;
        }
    }
    else if (layer == IPCP_LAYER)
    {
        /* Remote host replaced our request with new suggestion */
        switch(p_REQ_opthdr->type)
        {
        case IP_ADDRS_NEW:      /* IP address */
            /* Get replacement value from NAK packet */
            nakmy_ip = *p_NAK_optdata++;
            nakmy_ip = (nakmy_ip << 8) | *p_NAK_optdata++;
            nakmy_ip = (nakmy_ip << 8) | *p_NAK_optdata++;
            nakmy_ip = (nakmy_ip << 8) | *p_NAK_optdata++;

/* Check My IP address */
            if (!p_ncb->my_ip_addr && nakmy_ip)
                p_ncb->my_ip_addr = nakmy_ip;    /* save my_ip_addr */
            break;
        default:        /* Shouldnt happen */
            nakerr = 1;
            break;
        }
    }
    else if (layer == IPXCP_LAYER)
    {
        /* Config option values must match */
        switch(p_REQ_opthdr->type)
        {
        case IPX_NET_NUM:       /* IPX Network Number */
            /* Get replacement value from NAK packet */
            nak_ipx_netnum = *p_NAK_optdata++;
            nak_ipx_netnum = (nak_ipx_netnum << 8) | *p_NAK_optdata++;
            nak_ipx_netnum = (nak_ipx_netnum << 8) | *p_NAK_optdata++;
            nak_ipx_netnum = (nak_ipx_netnum << 8) | *p_NAK_optdata++;

/* Update My IPX Network Number ? */
            if (!p_ncb->my_ipx_network && nak_ipx_netnum)
                p_ncb->my_ipx_network = nak_ipx_netnum;
            break;
        case IPX_NODE_NUM:      /* IPX Node Number */
            /* Update My IPX Node Number ? */
            if (IsMacEmpty(p_ncb->my_ipx_node) &&
                !(IsMacEmpty(p_NAK_optdata)))
            {
                maccpy(p_ncb->my_ipx_node, p_NAK_optdata);
            }
            break;
```

```
        default:         /* We didn't send ANY CFG OPTIONS for IPX */
            nakerr = 1;
            break;
        }
    }
    else if (layer == NBFCP_LAYER)
    {
        /* Remote host replaced our request with new suggestion. */
        /* Except that we didn't send ANY NetBios CFGs THAT CAN BE NAKed */
        switch(p_REQ_opthdr->type)
        {
        default:
            nakerr = 1;
            break;
        }
    }
    else if (layer == CCP_LAYER)
    {
        u16 hist_buf;
        u8 check_mode, reset_mode;

/* Config option values must match */
        switch(p_REQ_opthdr->type)
        {
        case CCP_STAC_COMP:             /* Stac Compression */
            if (p_ncb->compression.algorithm == COMPRESS_STAC)
            {
                if (p_ncb->ccp_req_len == CCP_STACKER_REQ_LEN)
                {
                    /* Get the NAKed values from the NAK pkt */
                    hist_buf = *p_NAK_optdata++;
                    hist_buf = (hist_buf << 8) | *p_NAK_optdata++;

check_mode = *p_NAK_optdata++;
                }
                else
                {
                    nakerr = 1;
                    break;
                }

/* Check to see if num hists has changed */
                if (p_ncb->ccp_num_hists != hist_buf)
                {
                    if ((hist_buf == 0) || (hist_buf == 1))
                    {
                        p_ncb->ccp_num_hists = hist_buf;
                    }
                    else
                    {
                        nakerr = 1;
                        break;
                    }
                }

/* Check to see if the check val has changed */
                if (p_ncb->stac_check_val != check_mode)
                {
                    if (check_mode == CCP_CV_NONE)
                    {
                        p_ncb->stac_check_val = check_mode;
                    }
                    else
                    {
                        nakerr = 1;
                        break;
                    }
                }
            }
            else    /* ASCEND */
            {
                /****
                ** NOTE: check ASCEND parameters of the STAC Compression.
                **
                **
```

```
                    ** information pertaining to it in this patent application.
                    ****/
                    /* make sure that the values of the parameters the far */
                    /* end is are values we support (else nakerr it). */
                }
                break;
            case CCP_MS_COMP:               /* Microsoft Compression */
                if (p_ncb->ccp_req_len == CCP_MICROSOFT_REQ_LEN)
                {
                    /* Get proposed compression and encryption values */
                    ms_cmp_enc = *(p_NAK_optdata+3);

/* If it is non-zero, NAK it. */
                    if ((ms_cmp_enc & MPPC_NEGOTIATE_COMP) == 0)
                    {
                        /* turn down attempting to bring up CCP */
                        p_ncb->protocols &= ~PPP_PROT_CCP;
                        nppp_reset(lpCall, p_link, CCP_LAYER, CP_INITIAL);

/* Peer NPPP Does NOT have Compression enabled, */
                        /* DISABLING compression. */
                    }
                }
                else
                    nakerr = 1;
                break;
            default:        /* We didn't send any other CCP CFG OPTIONS */
                nakerr = 1;
                break;
            }
        }
        else    /* assumed to be BRCP_LAYER */
        {
            /* Remote host replaced our request with new suggestion */
            switch(p_REQ_opthdr->type)
            {
            default:
                nakerr = 1;
                break;
            }
        }
    } ppp_rls_pkt(p_REQ_pkt, 19);

if (nakerr)
        return -1;

/* NAK matches last request we made */
    return 0;
}

/*
 * nppp_rcvrej -- Process the received REJECT from the peer.
 */ void
nppp_rcvrej(PCALLINFO lpCall, Link_CB_t *p_link,
    PPP_layer_t layer, GCAPACKET *p_pkt)
{
    PPP_CB_t        *p_ncb = &(lpCall->ppp);        /*    NPPP CB    */
    S_CPCTL         *p_ncp = &p_link->a_cpctl[layer];

if (p_ncp->timer_id1.active)
        clr_nppp_timer(lpCall, p_link, layer, PPP_TIMER1);

switch(p_ncp->cpstate)
    {
    case CP_INITIAL:    /* Unexpected event */
    case CP_STARTING:   /* Unexpected event */
        break;

case CP_CLOSED:
        nppp_sendtermack(lpCall, p_link, layer, CP_CLOSED);
```

```c
        break;

case CP_STOPPED:
        nppp_sendtermack(lpCall, p_link, layer, CP_STOPPED);
        break;

case CP_CLOSING:
        /* We are attempting to close connection; wait */
        /* for timeout to resend a Terminate Request   */
        break;

case CP_STOPPING:
        /* We are attempting to stop connection; wait */
        /* for timeout to resend a Terminate Request   */
        break;

case CP_REQ_SENT:
    case CP_ACK_SENT:
        /* Update our config request to reflect NAKed options */
        if (nppp_chkrej(lpCall, p_link, layer, p_pkt) == -1)
        {
            /* Bad reject packet */
            /* Wait for another; resend request on timeout */
            set_nppp_timer(PPP_RESTART_TIMEOUT, lpCall, p_link,
                    (u32)layer, PPP_TIMER1);
        }
        else
        {
            /* Send updated config request */
            nppp_sendreq(lpCall, p_link, layer);
        }
        break;

case CP_ACK_RCVD:
        /* Send our configuration request */
        nppp_sendreq(lpCall, p_link, layer);

p_ncp->cpstate = CP_REQ_SENT;
        break;

case CP_OPEN:
        /* Something went wrong; restart negotiations */
        nppp_restart(lpCall, p_link, layer);

/* Send our configuration request */
        nppp_sendreq(lpCall, p_link, layer);

p_ncp->cpstate = CP_REQ_SENT;
        break;

default:
        /* ignore */
        break;
    } return;
}

/*
 *  nppp_chkrej -- Check the received REJECT from the peer.
 */
int
nppp_chkrej(PCALLINFO lpCall, Link_CB_t *p_link,
    PPP_layer_t layer, GCAPACKET *p_pkt)
{
    PPP_CB_t        *p_ncb = &(lpCall->ppp);    /* NPPP CB */
    S_CPCTL         *p_ncp = &p_link->a_cpctl[layer];
    S_CNFHDR        *p_REJ_cnfhdr;
    S_OPTHDR        *p_REJ_opthdr;
    GCAPACKET       *p_REQ_pkt;
    S_OPTHDR        *p_REQ_opthdr;
    s16             REJ_optslen, REQ_optslen;
    s16             rejerr = 0;
    s16             minoptlen;
```

```
p_REJ_cnfhdr = (S_CNFHDR *)(((u8 *)GET_DATA_PTR(p_pkt)) + PPP_HDRLEN);
p_REJ_opthdr = (S_OPTHDR *)(((u8 *)p_REJ_cnfhdr) + CNF_HDRLEN);

/* CP ID field must match last request we sent */
if (p_REJ_cnfhdr->id != p_ncp->lastid)
    return -1;

/* Get packet for REQ to REJ comparison check */
if ((p_REQ_pkt = ppp_get_pkt()) == NULL)
    return(-1);

/* Set ptr to REQ option header */
p_REQ_opthdr = (S_OPTHDR *)(((u8 *)GET_DATA_PTR(p_REQ_pkt)) +
                PPP_HDRLEN + CNF_HDRLEN);

/* Get a copy of last request we sent */
p_REQ_pkt->uLength =
    nppp_makereq(lpCall, p_link, layer, (u8 *)p_REQ_opthdr);

/* Get size of REQ and REJ options field */
REJ_optslen = swap16(p_REJ_cnfhdr->len) - CNF_HDRLEN;
REQ_optslen = p_REQ_pkt->uLength;

/* Check overall buffer length */
if (REJ_optslen > REQ_optslen)
{
    /* Remote cant REJ more options than we requested */
    rejerr = 1;
} if (layer == CCP_LAYER)
    minoptlen = 5;
else if (layer == IPCP_LAYER)
    minoptlen = 4;
else
    minoptlen = 2;

/* Rejected options must be same order as our original request */
for (; (REJ_optslen >= minoptlen) && (!rejerr);
 REQ_optslen -= p_REQ_opthdr->len, p_REQ_opthdr =
 (S_OPTHDR *)((u8 *)p_REQ_opthdr + p_REQ_opthdr->len),
 REJ_optslen -= p_REJ_opthdr->len, p_REJ_opthdr =
 (S_OPTHDR *)((u8 *)p_REJ_opthdr + p_REJ_opthdr->len))
{
    /* Must find match to each Rejected option */
    if (REQ_optslen < minoptlen)
    {
        rejerr = 1;
        break;
    }

/* Maybe not all options were Rejected; look */
    /* for matching option in our request */
    while (p_REQ_opthdr->type != p_REJ_opthdr->type)
    {
        /* This option not REJed; eat rest  */
        /* of option from the request packet */
        REQ_optslen -= p_REQ_opthdr->len;
        p_REQ_opthdr = (S_OPTHDR *)((u8 *)p_REQ_opthdr +
         p_REQ_opthdr->len);

/* Must find match to each REJed option */
        if (REQ_optslen < minoptlen)
        {
            p_REQ_opthdr->type = 0;
            rejerr = 1;
            break;
        }
    }

/* Config option headers must match */
    if ((p_REJ_opthdr->type != p_REQ_opthdr->type) ||
        (p_REJ_opthdr->len != p_REQ_opthdr->len))
    {
```

```c
        rejerr = 1;
        break;
    } if (layer == LCP_LAYER)
{
    /* Remote host wont negotiate this option */
    switch(p_REQ_opthdr->type)
    {
        case MAX_RCV_UNIT:      /* Maximum Receive Unit */
            /* Dont attempt to negotiate MRU */
            p_ncb->neg_mru = 0;
            p_ncb->lcl_mru = MAX_FRAME_LENGTH + sizeof(S_PPPHDR);
            break;
        case MPP_MRRU:          /* MPP MRRU */
            /* Don't attempt to negotiate MPP, use PPP */
            if (lpCall->IscCallData.dwEncapsulation == PPPML_EMULATION)
                lpCall->IscCallData.dwEncapsulation = PPP_EMULATION;

p_ncb->neg_mru = 1;
            p_ncb->lcl_mru = MAX_FRAME_LENGTH + sizeof(S_PPPHDR);
            break;
        case MPP_ENDPOINT_ID:   /* MPP Endpoint ID */
            p_ncb->send_endpt = FALSE;
            break;
        case PROT_COMPRESS:     /* Protocol Compression */
            p_ncb->rx_proto_comp = FALSE;
            break;
        case AC_COMPRESS:       /* Addr/Ctl Compression */
            p_ncb->rx_ac_comp = FALSE;
            break;
        default:                /* Shouldnt happen */
            rejerr = 1;
            break;
    }
}
else if (layer == IPCP_LAYER)
{
    /* Remote host won't negotiate this option */
    switch(p_REQ_opthdr->type)
    {
        case IP_ADDRS_NEW:      /* IP address */
            /* Abandon attempt to negotiate IP addrs */
            p_ncb->neg_ip_addrs = 0;

/* Reflect that link is being established */
            /* with NO IP ADDRS assigned */
            break;
        default:                /* Shouldnt happen */
            rejerr = 1;
            break;
    }
}
else if (layer == IPXCP_LAYER)
{
    /* Remote host won't negotiate this option */
    switch(p_REQ_opthdr->type)
    {
        case IPX_NET_NUM:       /* IPX Network number */
            /* Abandon attempt to negotiate IPX Network number */
            p_ncb->neg_ipx_network = 0;

/* Reflect that link is being established */
            /* with NO IPX Network number assigned */
            break;
        case IPX_NODE_NUM:      /* IPX Node number */
            /* Abandon attempt to negotiate IPX Node number */
            p_ncb->neg_ipx_node = 0;
            break;
        default:                /* We didn't send ANY CFG OPTIONS for IPX */
            rejerr = 1;
            break;
    }
}
else if (layer == NBFCP_LAYER)
```

```
        {
            /* Remote host replaced our request with new suggestion, */
            /* Except that we didn't send ANY NetBios CFGs THAT CAN BE NAKed */
            switch(p_REQ_opthdr->type)
            {
            case NBF_NAME_PROJ:
                /* Abandon attempt to indicate to far end any name projection */
                p_ncb->neg_name_proj = 0;
                break;
            case NBF_PEER_INFO:
                /* Abandon attempt to indicate to far end our peer info */
                p_ncb->neg_peer_info = 0;
                break;
            default:
                rejerr = 1;
                break;
            }
        }
        else if (layer == CCP_LAYER)
        {
            /* Config option values must match */
            switch(p_REQ_opthdr->type)
            {
            case CCP_STAC_COMP:          /* Stac and Ascend Compression */
            case CCP_MS_COMP:            /* Microsoft Compression */
                /* If we got rejected for anything in this option, then */
                /* just forget compression altogether */

/* turn down attempting to bring up CCP */
                p_ncb->protocols &= ~PPP_PROT_CCP;
                nppp_reset(lpCall, p_link, CCP_LAYER, CP_INITIAL);

/* Peer NPPP Does NOT support compression, DISABLING.\r\n", */
                break;
            default:
                rejerr = 1;
                break;
            }
        }
        else    /* assumed to be BRCP_LAYER */
        {
            /* Remote host replaced our request with new suggestion */
            switch(p_REQ_opthdr->type)
            {
            default:
                rejerr = 1;
                break;
            }
        }
    } ppp_rls_pkt(p_REQ_pkt, 20);

if (rejerr)
        return -1;

/* Reject matches last request we made */
    return 0;
}

/*
 *  nppp_rcvtermreq -- Process the received TERMINATE REQUEST from the peer.
 */ void
nppp_rcvtermreq(PCALLINFO lpCall, Link_CB_t *p_link, PPP_layer_t layer)
{
    PPP_CB_t    *p_ncb = &(lpCall->ppp);           /*  NPPP CB   */
    S_CPCTL     *p_ncp = &p_link->a_cpctl[layer];

switch(p_ncp->cpstate)
    {
    case CP_INITIAL:    /* Unexpected event */
    case CP_STARTING:   /* Unexpected event */
        break;
```

```
    case CP_CLOSED:
    case CP_STOPPED:
    case CP_CLOSING:
    case CP_STOPPING:
    case CP_REQ_SENT:
        nppp_sendtermack(lpCall, p_link, layer, p_ncp->cpstate);
        break;

case CP_ACK_RCVD:
    case CP_ACK_SENT:
        nppp_sendtermack(lpCall, p_link, layer, CP_REQ_SENT);
        break;

case CP_OPEN:
        /* Something went wrong; restart negotiations */
        nppp_restart(lpCall, p_link, layer);

/* Send terminate ack */
        nppp_sendtermack(lpCall, p_link, layer, CP_STOPPED);
        break;

default:
        /* ignore */
        break;
    } return;
}

/*
 * nppp_rcvtermack -- Process the received TERMINATE ACK from the peer.
 */
void
nppp_rcvtermack(PCALLINFO lpCall, Link_CB_t *p_link, PPP_layer_t layer)
{
    PPP_CB_t        *p_ncb = &(lpCall->ppp);       /*  NPPP CB  */
    S_CPCTL         *p_ncp = &p_link->a_cpctl[layer];

switch(p_ncp->cpstate)
    {
    case CP_INITIAL:    /* Unexpected event */
    case CP_STARTING:   /* Unexpected event */
        break;

case CP_CLOSED:
    case CP_STOPPED:
    case CP_REQ_SENT:
    case CP_ACK_SENT:
        /* stay in same state */
        break;

case CP_CLOSING:
        /* completes transition to down state, indicate this fact */
        nppp_restart(lpCall, p_link, layer);
        break;

case CP_STOPPING:
        /* completes transition to down state, indicate this fact */
        nppp_restart(lpCall, p_link, layer);
        break;

case CP_ACK_RCVD:
        p_ncp->cpstate = CP_REQ_SENT;
        break;

case CP_OPEN:
        /* Something went wrong; restart negotiations */
        nppp_restart(lpCall, p_link, layer);

/* Send our configuration request */
        nppp_sendreq(lpCall, p_link, layer);

p_ncp->cpstate = CP_REQ_SENT;
```

```
        break;

default:
        /* ignore */
        break;
    } return;
}

/*
 * nppp_rcvcoderej -- Process the received CODE REJ from the peer.
 */
void
nppp_rcvcoderej(PCALLINFO lpCall, Link_CB_t *p_link,
    PPP_layer_t layer, GCAPACKET *p_pkt)
{
    PPP_CB_t        *p_ncb = &(lpCall->ppp);       /*   NPPP CB   */
    S_CPCTL         *p_ncp = &p_link->a_cpctl[layer];

/* catastrophic code error */
    switch(p_ncp->cpstate)
    {
    case CP_INITIAL:    /* Unexpected event */
    case CP_STARTING:   /* Unexpected event */
        break;

case CP_CLOSED:
    case CP_CLOSING:
        p_ncp->cpstate = CP_CLOSED;
        break;

case CP_STOPPED:
    case CP_STOPPING:
    case CP_REQ_SENT:
    case CP_ACK_RCVD:
    case CP_ACK_SENT:
        p_ncp->cpstate = CP_STOPPED;
        break;

case CP_OPEN:
        nppp_close(lpCall, p_link, layer, CP_STOPPING, CP_CLOSED);
        break;

default:
        /* ignore */
        break;
    } return;
}

/*
 * nppp_rcvprotorej -- Process the received PROTO REJ from the peer.
 */
void
nppp_rcvprotorej(PCALLINFO lpCall, Link_CB_t *p_link,
    PPP_layer_t layer, GCAPACKET *p_pkt)
{
    PPP_CB_t        *p_ncb = &(lpCall->ppp);       /*   NPPP CB   */
    S_CPCTL         *p_ncp = &p_link->a_cpctl[layer];
    S_CNFHDR        *p_cnfhdr;
    u16             rej_proto;

p_cnfhdr = (S_CNFHDR *)(((u8 *)GET_DATA_PTR(p_pkt)) + PPP_HDRLEN);
    rej_proto = *(u16 *)(((u8 *)p_cnfhdr) + CNF_HDRLEN);

/* check the proto the remote chocked on */
    if (rej_proto == swap16(PPP_LCP_PID))
    {
        /* catastrophic code error */
        switch(p_ncp->cpstate)
        {
```

```
        case CP_INITIAL:    /* Unexpected event */
        case CP_STARTING:   /* Unexpected event */
            break;

case CP_CLOSED:
        case CP_CLOSING:
            p_ncp->cpstate = CP_CLOSED;
            break;

case CP_STOPPED:
        case CP_STOPPING:
        case CP_REQ_SENT:
        case CP_ACK_RCVD:
        case CP_ACK_SENT:
            p_ncp->cpstate = CP_STOPPED;
            break;

case CP_OPEN:
            nppp_close(lpCall, p_link, layer, CP_STOPPING, CP_CLOSED);
            break;

default:
            /* ignore */
            break;
        }
    }
    else if ((rej_proto == PPP_BRCP_PID) || (rej_proto == PPP_BR_PID))
    {
        /* turn down attempting to bring up BRCP */
        p_ncb->protocols &= ~PPP_PROT_BR;
        nppp_reset(lpCall, p_link, BRCP_LAYER, CP_INITIAL);

/* Peer NPPP Does NOT support Bridging, DISABLING. */
    }
    else if ((rej_proto == swap16(PPP_IPCP_PID)) ||
             (rej_proto == swap16(PPP_IP_PID)))
    {
        /* turn down attempting to bring up IPCP */
        p_ncb->protocols &= ~PPP_PROT_IP;
        nppp_reset(lpCall, p_link, IPCP_LAYER, CP_INITIAL);

/* Peer NPPP Does NOT support IP, DISABLING. */
    }
    else if ((rej_proto == swap16(PPP_IPXCP_PID)) ||
             (rej_proto == swap16(PPP_IPX_PID)))
    {
        /* turn down attempting to bring up IPXCP */
        p_ncb->protocols &= ~PPP_PROT_IPX;
        nppp_reset(lpCall, p_link, IPXCP_LAYER, CP_INITIAL);

/* Peer NPPP Does NOT support IPX, DISABLING. */
    }
    else if ((rej_proto == swap16(PPP_NBFCP_PID)) ||
             (rej_proto == swap16(PPP_NBF_PID)))
    {
        /* turn down attempting to bring up NBFCP */
        p_ncb->protocols &= ~PPP_PROT_NBF;
        nppp_reset(lpCall, p_link, NBFCP_LAYER, CP_INITIAL);

/* Peer NPPP Does NOT support NetBEUI, DISABLING. */
    }
    else if ((rej_proto == swap16(PPP_CCP_PID)) ||
             (rej_proto == swap16(PPP_C_PID)))
    {
        /* turn down attempting to bring up CCP */
        p_ncb->protocols &= ~PPP_PROT_CCP;
        nppp_reset(lpCall, p_link, CCP_LAYER, CP_INITIAL);

/* Peer NPPP Does NOT support Compression, DISABLING. */
    } return;
}

/*
```

```
*   nppp_rcvresetreq -- Process the received CCP RESET REQUEST from the peer.
*/
void
nppp_rcvresetreq(PCALLINFO lpCall, Link_CB_t *p_link,
    PPP_layer_t layer, GCAPACKET *p_pkt)
{
    PPP_CB_t        *p_ncb = &(lpCall->ppp);        /*    NPPP CB    */
    S_CPCTL         *p_ncp = &p_link->a_cpctl[layer];

if (p_ncp->cpstate == CP_OPEN)
    {
        nppp_comp_reset(lpCall);        /* reset compression dictionary */ if (p_ncb->compression.algorithm == COMPRESS_STAC)
            nppp_sendresetack(lpCall, p_link, layer, p_pkt);
        else if (p_ncb->compression.algorithm == COMPRESS_MICROSOFT)
            p_ncb->mppc_tx_coherency |= CCP_A_FLUSHED;
        else
        {
            /* COMPRESS_ASCEND - do nothing */
        }
    } return;
}

/*
*   nppp_rcvresetack -- Process the received CCP RESET ACK from the peer.
*/
void
nppp_rcvresetack(PCALLINFO lpCall, Link_CB_t *p_link,
    PPP_layer_t layer, GCAPACKET *p_pkt)
{
    PPP_CB_t        *p_ncb = &(lpCall->ppp);        /*    NPPP CB    */
    S_CPCTL         *p_ncp = &p_link->a_cpctl[layer];

if (p_ncp->cpstate == CP_OPEN)
    {
        nppp_comp_reset(lpCall);        /* reset compression dictionary */
        p_ncb->stac_decomp_paused_id = 0;   /* clear the decomp paused ID */
    } return;
}

/*
*   nppp_rcvunknown -- Process the received pkt with an UNKNOWN CODE the peer.
*/
void
nppp_rcvunknown(PCALLINFO lpCall, Link_CB_t *p_link,
    PPP_layer_t layer, GCAPACKET *p_pkt)
{
    PPP_CB_t        *p_ncb = &(lpCall->ppp);        /*    NPPP CB    */
    S_CPCTL         *p_ncp = &p_link->a_cpctl[layer];

switch(p_ncp->cpstate)
    {
    case CP_INITIAL:    /* Unexpected event */
    case CP_STARTING:   /* Unexpected event */
        break;

case CP_CLOSED:
    case CP_STOPPED:
    case CP_CLOSING:
    case CP_STOPPING:
    case CP_REQ_SENT:
    case CP_ACK_RCVD:
    case CP_ACK_SENT:
        nppp_sendcoderej(lpCall, p_link, layer, p_pkt, p_ncp->cpstate);
        break;

case CP_OPEN:
```

```
        /* Before declaring down, send out code reject pkt */
        nppp_sendcoderej(lpCall, p_link, layer, p_pkt, CP_CLOSED);

/* Something went wrong; restart negotiations */
        nppp_restart(lpCall, p_link, layer);

/* Send our configuration request */
        nppp_sendreq(lpCall, p_link, layer);

p_ncp->cpstate = CP_REQ_SENT;
        break;

default:
        /* ignore */
        break;
    } return;
}

/*
 *  nppp_comp_init -- Initialize the compression session.
 */ void
nppp_comp_init(PCALLINFO lpCall, Link_CB_t *p_link)
{
    PPP_CB_t        *p_ncb = &(lpCall->ppp);        /*    NPPP CB    */
    unsigned short  stac_cmp_return = 0;
    u16             local_mode;

switch(p_ncb->compression.algorithm)
    {
    case COMPRESS_STAC:
    case COMPRESS_ASCEND:
        if (p_ncb->compression.algorithm == COMPRESS_ASCEND)
            local_mode = COMPRESS_MODE_N_TO_N;
        else
        {
            if (p_ncb->ccp_num_hists)
                local_mode = COMPRESS_MODE_1_TO_1;
            else
                local_mode = COMPRESS_MODE_N_TO_N;
        }

/****
        ** NOTE: call function to initialize the histories (contexts) for
        ** STAC Compression algorithm.  Since the STAC Compression
        ** scheme is not intellectual property of USR, we cannot reveal
        ** information pertaining to it in this patent application.
        ****/

/* ... INSERT FUNCTION CALL HERE ... */
        /* (stac_cmp_return = initialize the STAC histories) */ if (stac_cmp_return == COMPRESS_OKAY)
        {
            /* finally, indicate that send_frames can compress outgoing pkts */
            p_ncb->compression.compressing = TRUE;
        }
        else
        {
            /* NPPP - Compression Link DOWN */
        }
        break;
    case COMPRESS_MICROSOFT:
        /****
        ** NOTE: call function to initialize the histories (contexts) for
        ** Microsoft Compression algorithm.  Since the Microsoft Compression
        ** scheme is not intellectual property of USR, we cannot reveal
        ** information pertaining to it in this patent application.
        ****/

/* ... INSERT FUNCTION CALL HERE ... */
```

```c
        /* finally, indicate that send_frames can compress outgoing pkts */
        p_ncb->compression.compressing = TRUE;
        break;
    }
}

/*
*   nppp_comp_close -- Close the compression session.
*/ void
nppp_comp_close(PCALLINFO lpCall)
{
    /****
    ** NOTE: call function to close the histories (contexts) for
    ** STAC Compression algorithm.  Since the STAC Compression
    ** scheme is not intellectual property of USR, we cannot reveal
    ** information pertaining to it in this patent application.
    ****/

/* ... INSERT FUNCTION CALL HERE ... */
}

/*
*   nppp_comp_reset -- Reset (clear) the compression histories.
*/ void
nppp_comp_reset(PCALLINFO lpCall)
{
    PPP_CB_t         *p_ncb = &(lpCall->ppp);      /*   NPPP CB    */ if (p_ncb->compression.algorithm == COMPRESS_MICROSOFT)
    {
        /****
        ** NOTE: call function to reset the Microsoft Compression
        ** TX context.  Since the Microsoft Compression scheme is not
        ** intellectual property of USR, we cannot reveal it in this
        ** patent application.
        ****/

/* ... INSERT FUNCTION CALL HERE ... */
    }
    else
    {
        /****
        ** NOTE: call function to reset the STAC Compression
        ** TX context.  Since the STAC Compression scheme is not
        ** intellectual property of USR, we cannot reveal it in this
        ** patent application.
        ****/

/* ... INSERT FUNCTION CALL HERE ... */
    }
}

/*
*    nppp_release_link - Stop the specified link
*/ void
nppp_release_link(PCALLINFO lpCall, Link_CB_t *p_link)
{
    int       i;

nppp_init_all_layers(lpCall, p_link, CP_INITIAL);

/* Now that PPP has settled down its activity for this link, bring */
    /* the link down. */
    fsm_lk_execute(LK_EVENT_STOP, lpCall, (void *) p_link, 0);
}

/*
*    nppp_check_bw - Should the Bandwidth be adjusted
*/
```

```c
void
nppp_check_bw(PCALLINFO lpCall)
{
    PPP_CB_t    *p_ncb = &lpCall->ppp;          /* PPP CB */
    Link_CB_t   *p_link;
    u32         secondary_link;

p_link = GetPrimaryLink(lpCall);

/* Do not expand a call if MultiLink is not enabled */
    /* In fact, do not restart the timer to check. */
    if (lpCall->lscCallData.dwEncapsulation != PPPML_EMULATION)
        return;

/* Do not expand a call unless we originated it */
    /* and that we have not exhausted or retry count */
    /* In fact, do not restart the timer to check. */
    if (((lpCall->dwOrigin == LINECALLORIGIN_EXTERNAL) ||
         (lpCall->dwOrigin == LINECALLORIGIN_INBOUND)) ||
        (p_ncb->call_retry_cnt == MAX_CALL_RETRIES))
    {
        return;
    }

/* Restart the timer before carrying on.  This will ensure that we */
    /* will return to check this. */
    set_nppp_timer(PPP_CHECKBW_TIMEOUT, lpCall, NULL, 0, PPP_TIMER3);

/* Do not expand a call if there are NO available channels */
    /* If no channels are available, restart timer and check again */
    /* on the next timer expiration */
    if (lpCall->num_links > 1)
        return;

if (GetPrimaryLinkIdx(lpCall, p_link))
    {
        secondary_link = 0;
    }
    else
    {
        secondary_link = 1;
    } p_ncb->call_retry_cnt++;        /* bump the retry count */

/* kick off the second call */
    fsm_lk_execute(LK_EVENT_START, lpCall,
        (void *) &lpCall->link[secondary_link],
        (void *) &lpCall->link[secondary_link].distant_addr);
}

/*
 *   mpp_is_greater_than    - Find out which value is greater, return BOOL.
 */
BOOL
mpp_is_greater_than(u32 a, u32 b)
{
    if (a == b)
        return FALSE;

if ((a ^ b) & 0x800000)
    {
        /* wrap case */
        if (a < b)
            return TRUE;
        else
            return FALSE;
    }
    else
    {
        if (a < b)
            return FALSE;
        else
```

```
                return TRUE;
        }
}

/*
 *      ppp_is_between -  Compare sequence numbers
 */
BOOL
ppp_is_between(u32 a, u32 b, u32 c)
{
    if (((a <= b) && (b < c)) || ((c < a) && (a <= b)) || ((b < c) && (c < a)))
        return(TRUE);
    else
        return(FALSE);
}
```

We claim:

1. Apparatus for linking a local endpoint application running at a source of digital data with an application running at a network endpoint application at a receiver of said digital data, said local and network endpoint applications capable of communication over a communication channel, comprising, in combination:

- a proxy engine placed at said source of digital data for conducting simultaneous communication sessions between said source and said destination over said communication channel,
- said proxy engine comprising at least one software routine for determining whether a security protocol, multiple channel protocol, data compression protocol, link control protocol or network control protocol is supported by the network endpoint application but not the local endpoint application;
- said proxy engine further comprising at least one software routine for implementing for said local endpoint application at least one security protocol, multiple channel protocol, data compression protocol, link control protocol or network control protocol that is supported by the network endpoint application but not the local endpoint application protocol feature to thereby permit said local and network endpoint applications to communicate in accordance with said implemented protocol; and
- communications hardware responsive to said proxy engine and interfacing with said communication channel for placing said digital data from said local endpoint application onto said communication channel for transmission to said receiver,
- whereby bilateral digital communication between said local and network endpoint applications is improved.

2. The apparatus of claim 1, wherein said communication channel comprises a digital telephone line.

3. The apparatus of claim 2, wherein said digital communication line comprises an ISDN line.

4. The apparatus of claim 1, wherein said multiple channel protocol comprises PPPML.

5. The apparatus of claim 1, wherein said authentication protocol comprises CHAP.

6. The apparatus of claim 1, wherein said authentication protocol comprises PAP.

7. The apparatus of claim 1, wherein said data compression feature is selected from the group consisting of STAC Electronics LZS and Microsoft Corp. PPC data compression protocol.

8. The apparatus of claim 1, wherein said link control protocol is selected from the group consisting of ECHO-REQUEST, ECHO_REPLIES, call back and endpoint identification.

9. In a system comprising a source of data, a receiver of data and a communication channel linking the source to the receiver, a method for setting up a data transmission session between a local endpoint application at said source and a network endpoint application at said receiver with a proxy engine in a transparent manner, comprising the steps of:

(1) determining the link control protocols that are supported by the network endpoint application;

(2) determining the link control protocols that are supported by the local endpoint application;

(3) enabling the link control protocols that are supported by both the network endpoint application and the combination of the proxy engine and the local endpoint application, and thereafter (4) transmitting data between the local endpoint application and the network endpoint application, whereby data is able to be transmitted from the source of the data to the receiver of the data over the communication channel.

* * * * *